United States Patent
Moshir et al.

(10) Patent No.: US 9,680,803 B2
(45) Date of Patent: Jun. 13, 2017

(54) SYSTEMS AND METHODS FOR SECURE SHORT MESSAGING SERVICE AND MULTIMEDIA MESSAGING SERVICE

(75) Inventors: Kevin K Moshir, Scottsdale, AZ (US); Sean S Moshir, Scottsdale, AZ (US); Houman Shafiezadeh, Rancho Palos Verdes, CA (US)

(73) Assignee: CellTrust Corporation, Scottsdale, AZ (US)

( * ) Notice: Subject to any disclaimer, the term of this patent is extended or adjusted under 35 U.S.C. 154(b) by 0 days.

(21) Appl. No.: 13/031,495

(22) Filed: Feb. 21, 2011

(65) Prior Publication Data

US 2011/0145564 A1 Jun. 16, 2011

Related U.S. Application Data

(63) Continuation of application No. 12/414,355, filed on Mar. 30, 2009, now abandoned, which is a continuation-in-part of application No. 11/807,024, filed on May 25, 2007, now Pat. No. 7,920,851.

(60) Provisional application No. 61/040,526, filed on Mar. 28, 2008, provisional application No. 60/920,603, filed on Mar. 29, 2007, provisional application No. 60/809,052, filed on May 25, 2006.

(51) Int. Cl.
| | |
|---|---|
| *H04W 4/14* | (2009.01) |
| *H04W 12/02* | (2009.01) |
| *H04L 29/06* | (2006.01) |
| *H04W 4/12* | (2009.01) |
| *H04W 88/02* | (2009.01) |
| *H04W 88/16* | (2009.01) |

(52) U.S. Cl.
CPC .......... *H04L 63/0464* (2013.01); *H04W 4/12* (2013.01); *H04W 4/14* (2013.01); *H04W 12/02* (2013.01); *H04W 88/02* (2013.01); *H04W 88/16* (2013.01)

(58) Field of Classification Search
CPC ......... H04W 4/12; H04W 4/14; H04W 12/02; H04W 88/02; H04W 88/16; H04L 63/0464
USPC .................................................. 713/153, 154
See application file for complete search history.

(56) References Cited

U.S. PATENT DOCUMENTS

| | | | |
|---|---|---|---|
| 3,833,885 A | | 9/1974 | Gentile |
| 5,436,960 A | | 7/1995 | Campana, Jr. et al. |
| 5,625,670 A | | 4/1997 | Campana, Jr. et al. |
| 5,668,880 A | * | 9/1997 | Alajajian ...................... 370/342 |
| 5,812,671 A | * | 9/1998 | Ross, Jr. ....................... 713/153 |
| 5,819,172 A | | 10/1998 | Campana, Jr. et al. |

(Continued)

FOREIGN PATENT DOCUMENTS

| | | | |
|---|---|---|---|
| EP | 1569482 | 8/2005 | |
| EP | 1569482 A1 * | 8/2005 | ............... H04Q 7/38 |

(Continued)

OTHER PUBLICATIONS

Office Action dated May 12, 2010 for U.S. Appl. No. 11/807,024.

(Continued)

*Primary Examiner* — Theodore C Parsons
(74) *Attorney, Agent, or Firm* — Richard E. Oney; Tiffany & Bosco, P.A.

(57) ABSTRACT

Systems and methods for managing (for example, creating, transmitting, delivering, encrypting, storing, and the like) secure SMS (short message service) and secure MMS (multimedia messaging service) communications are disclosed.

31 Claims, 13 Drawing Sheets

(56) References Cited

U.S. PATENT DOCUMENTS

| | | | |
|---|---|---|---|
| 6,041,123 A * | 3/2000 | Colvin, Sr. | 713/153 |
| 6,067,451 A | 5/2000 | Campana, Jr. et al. | |
| 6,081,601 A * | 6/2000 | Raivisto | 380/270 |
| 6,259,909 B1 | 7/2001 | Ratayczak | |
| 6,317,592 B1 | 11/2001 | Campana, Jr. et al. | |
| 6,493,758 B1 | 12/2002 | McLain | |
| 6,510,325 B1 | 1/2003 | Mack, II et al. | |
| 6,769,607 B1 | 8/2004 | Pitroda et al. | |
| 6,871,063 B1 | 3/2005 | Schiffer | |
| 6,925,568 B1 | 8/2005 | Heinonen | |
| 6,970,095 B1 | 11/2005 | Lee | |
| 6,988,657 B1 | 1/2006 | Singer et al. | |
| 7,012,503 B2 | 3/2006 | Nielsen | |
| 7,039,708 B1 | 5/2006 | Knobl | |
| 7,050,945 B2 | 5/2006 | Oba et al. | |
| 7,073,200 B2 | 7/2006 | Maliszewski | |
| 7,248,895 B2 | 7/2007 | Shiraogawa et al. | |
| 7,286,818 B2 | 10/2007 | Rosenberg | |
| 7,299,263 B2 * | 11/2007 | Claudatos et al. | 709/206 |
| 7,308,477 B1 * | 12/2007 | Gress et al. | 709/206 |
| 7,394,761 B2 * | 7/2008 | Foster et al. | 370/227 |
| 7,437,146 B2 | 10/2008 | Dudley et al. | |
| 7,537,152 B2 | 5/2009 | Chakiris | |
| 7,565,577 B2 * | 7/2009 | Adams et al. | 714/27 |
| 7,643,821 B2 | 1/2010 | O'Hanlon | |
| 7,649,998 B2 * | 1/2010 | Harran et al. | 380/283 |
| 7,702,898 B2 * | 4/2010 | Tan | 713/150 |
| 7,996,673 B2 | 8/2011 | Ivanov | |
| 8,037,297 B2 | 10/2011 | Pekkala | |
| 8,233,901 B2 | 7/2012 | Lee | |
| 8,320,944 B1 | 11/2012 | Gibson et al. | |
| 8,407,780 B2 | 3/2013 | Bandini et al. | |
| 8,463,296 B2 | 6/2013 | Huber et al. | |
| 8,631,227 B2 | 1/2014 | Olechowski et al. | |
| 2001/0003203 A1 * | 6/2001 | Mache | 713/201 |
| 2001/0011250 A1 | 8/2001 | Paltenghe | |
| 2002/0016175 A1 | 2/2002 | Marce et al. | |
| 2002/0086656 A1 | 7/2002 | Mattisson | |
| 2002/0088853 A1 | 7/2002 | Itoh et al. | |
| 2002/0107745 A1 | 8/2002 | Loeser | |
| 2002/0116345 A1 | 8/2002 | Harrison | |
| 2002/0133557 A1 | 9/2002 | Winarski | |
| 2002/0161476 A1 | 10/2002 | Panofsky et al. | |
| 2002/0165926 A1 | 11/2002 | Rensin et al. | |
| 2002/0186845 A1 | 12/2002 | Dutta et al. | |
| 2003/0022655 A1 | 1/2003 | Bogat | |
| 2003/0043036 A1 | 3/2003 | Merrem | |
| 2003/0109271 A1 | 6/2003 | Lewis et al. | |
| 2003/0115288 A1 | 6/2003 | Ljubicich et al. | |
| 2003/0120957 A1 * | 6/2003 | Pathiyal | 713/202 |
| 2003/0144793 A1 | 7/2003 | Melaku et al. | |
| 2003/0153302 A1 | 8/2003 | Lewis et al. | |
| 2003/0169151 A1 * | 9/2003 | Ebling et al. | 340/7.58 |
| 2003/0182559 A1 * | 9/2003 | Curry et al. | 713/189 |
| 2003/0204720 A1 * | 10/2003 | Schoen et al. | 713/153 |
| 2003/0224766 A1 | 12/2003 | Stockhammer | |
| 2003/0233409 A1 * | 12/2003 | Awada et al. | 709/206 |
| 2004/0075594 A1 | 4/2004 | Kuo | |
| 2004/0117262 A1 | 6/2004 | Berger et al. | |
| 2004/0124966 A1 | 7/2004 | Forrest | |
| 2004/0127256 A1 | 7/2004 | Goldthwaite et al. | |
| 2004/0147270 A1 | 7/2004 | Petrovich | |
| 2004/0192274 A1 | 9/2004 | Vuori | |
| 2004/0204041 A1 | 10/2004 | Fillebrown | |
| 2004/0225565 A1 | 11/2004 | Selman | |
| 2005/0015451 A1 | 1/2005 | Sheldon | |
| 2005/0055578 A1 * | 3/2005 | Wright et al. | 713/201 |
| 2005/0064814 A1 | 3/2005 | Matsuo et al. | |
| 2005/0086261 A1 | 4/2005 | Mammone | |
| 2005/0096117 A1 | 5/2005 | Katz | |
| 2005/0114671 A1 | 5/2005 | Little | |
| 2005/0120230 A1 * | 6/2005 | Waterson | 713/188 |
| 2005/0160062 A1 | 7/2005 | Howard et al. | |
| 2005/0187873 A1 | 8/2005 | Labrou et al. | |
| 2005/0187882 A1 | 8/2005 | Sovio et al. | |
| 2005/0192008 A1 | 9/2005 | Desai | |
| 2005/0221792 A1 | 10/2005 | Mattisson | |
| 2005/0221800 A1 * | 10/2005 | Jackson et al. | 455/411 |
| 2005/0222961 A1 | 10/2005 | Staib et al. | |
| 2005/0238149 A1 | 10/2005 | De Leon | |
| 2005/0250538 A1 | 11/2005 | Narasimhan et al. | |
| 2005/0280546 A1 | 12/2005 | Ganley et al. | |
| 2005/0282521 A1 * | 12/2005 | Hermann et al. | 455/410 |
| 2006/0009234 A1 | 1/2006 | Freer | |
| 2006/0031328 A1 | 2/2006 | Malik | |
| 2006/0043201 A1 | 3/2006 | Vesikivi et al. | |
| 2006/0052055 A1 | 3/2006 | Rowse et al. | |
| 2006/0080232 A1 | 4/2006 | Epps | |
| 2006/0098805 A1 | 5/2006 | Tischer | |
| 2006/0099976 A1 * | 5/2006 | Coskun et al. | 455/466 |
| 2006/0117104 A1 * | 6/2006 | Taniguchi et al. | 709/225 |
| 2006/0120348 A1 | 6/2006 | Croak et al. | |
| 2006/0168657 A1 * | 7/2006 | Baentsch et al. | 726/21 |
| 2006/0180660 A1 | 8/2006 | Gray | |
| 2006/0190729 A1 * | 8/2006 | Uchida | 713/168 |
| 2006/0194572 A1 | 8/2006 | Fresonke et al. | |
| 2006/0199598 A1 * | 9/2006 | Lee et al. | 455/466 |
| 2006/0223530 A1 | 10/2006 | Bumiller | |
| 2006/0240806 A1 | 10/2006 | Demirbasa et al. | |
| 2006/0240809 A1 | 10/2006 | Yu | |
| 2006/0258289 A1 | 11/2006 | Dua | |
| 2007/0032225 A1 | 2/2007 | Konicek et al. | |
| 2007/0046477 A1 | 3/2007 | Kolo et al. | |
| 2007/0129113 A1 | 6/2007 | Klicpera et al. | |
| 2007/0129144 A1 | 6/2007 | Katz | |
| 2007/0130476 A1 | 6/2007 | Mohanty | |
| 2007/0202806 A1 | 8/2007 | Kim | |
| 2007/0202897 A1 * | 8/2007 | Smith | 455/466 |
| 2007/0208942 A1 * | 9/2007 | May | 713/171 |
| 2007/0224980 A1 | 9/2007 | Wakefield | |
| 2007/0232332 A1 | 10/2007 | Holur | |
| 2007/0249375 A1 * | 10/2007 | Zapata et al. | 455/466 |
| 2007/0255620 A1 | 11/2007 | Tumminaro | |
| 2007/0262862 A1 | 11/2007 | Barrett et al. | |
| 2008/0014869 A1 | 1/2008 | Demirbasa et al. | |
| 2008/0019530 A1 * | 1/2008 | Eldridge et al. | 380/286 |
| 2008/0022418 A1 * | 1/2008 | Wei | 726/35 |
| 2008/0058057 A1 | 3/2008 | Lau | |
| 2008/0085728 A1 * | 4/2008 | Reding et al. | 455/466 |
| 2008/0094230 A1 | 4/2008 | Mock et al. | |
| 2008/0096590 A1 * | 4/2008 | Celik et al. | 455/466 |
| 2008/0148042 A1 * | 6/2008 | Brown et al. | 713/154 |
| 2008/0171536 A1 | 7/2008 | Katz | |
| 2008/0178300 A1 * | 7/2008 | Brown et al. | 726/29 |
| 2008/0292101 A1 * | 11/2008 | Macchi | 380/270 |
| 2008/0300024 A1 | 12/2008 | Sweeney | |
| 2009/0021350 A1 | 1/2009 | Hatta et al. | |
| 2009/0060198 A1 * | 3/2009 | Little | 380/278 |
| 2009/0075630 A1 * | 3/2009 | McLean | 455/411 |
| 2009/0113543 A1 * | 4/2009 | Adams et al. | 726/18 |
| 2009/0163140 A1 | 6/2009 | Packham | |
| 2009/0187980 A1 * | 7/2009 | Tung | H04W 12/06 726/6 |
| 2009/0257593 A1 * | 10/2009 | Losovsky | 380/259 |
| 2009/0265552 A1 | 10/2009 | Moshir et al. | |
| 2010/0002685 A1 | 1/2010 | Shaham et al. | |
| 2010/0002686 A1 | 1/2010 | Rosenberg et al. | |
| 2010/0017593 A1 * | 1/2010 | Putz | 713/150 |
| 2010/0070448 A1 * | 3/2010 | Omoigui | 706/47 |
| 2010/0128857 A1 | 5/2010 | Logan | |
| 2010/0159962 A1 * | 6/2010 | Cai et al. | 455/466 |
| 2010/0197326 A1 * | 8/2010 | Ngo | 455/466 |
| 2010/0217979 A1 * | 8/2010 | Yaghmour | 713/168 |
| 2011/0070898 A1 | 3/2011 | Sanjeev et al. | |
| 2011/0222688 A1 | 9/2011 | Graham et al. | |

FOREIGN PATENT DOCUMENTS

| | | |
|---|---|---|
| EP | 1657944 | 5/2006 |
| FR | 2863811 | 6/2005 |
| GB | 2399670 | 9/2004 |
| JP | 2002-279320 | 9/2002 |
| JP | 2002279320 | 9/2002 |
| WO | WO 99/35784 | 7/1999 |

(56) References Cited

FOREIGN PATENT DOCUMENTS

| WO | WO 01/78491 | 10/2001 | |
|---|---|---|---|
| WO | WO2004075594 | 9/2004 | |
| WO | WO2006007879 | 1/2006 | |
| WO | WO 2006007879 A1 * | 1/2006 | ............... H04Q 7/38 |

OTHER PUBLICATIONS

IPRP dated Sep. 28, 2010 for International Application No. PCT/US2009/038706.
ISR and WO dated Sep. 4, 2009 for International Application No. PCT/US2009/038706.
Celltrust: "CellTrust Corporation Launches Worldwide Availability of SecureSMS Gateway at Mobile World Congress 2008" Press Release, Feb. 6, 2008.
Hassinen, M., "SafeSMS—end-to-end encryption for SMS" Telecommunications 2005. Contel 2005. Proceedings of the 9th Internet Ional Conference on Zagreb, Croatiz Jun. 15-17, 2005, Piscataway, NJ, IEEE vol. 2, Jun. 15, 2005, pp. 359-365.
Hassinen, M., "Java based Public Key Infrastructure for SMS Messaging" [online] Apr. 28, 2006.
Circletech: "Security of SMS Communication" [online] Jul. 4, 2007.
Toorani, M., et al., "A Secure SMS Messaging Protocol for the M-Payment Systems," Department of Electrical Engineering Iran University of Science and Technology, IEEE 2008, Retrieved online Feb. 10, 2009.
Invitation to Pay Additional Fees with Partial International Search from corresponding International Application No. PCT/US09/038706 dated Jul. 3, 2009.
Sharp, Duncan Scott, "Adapting Ad Hoc Network Concepts to Land Mobile Radio Systems." Masters Thesis submitted to Simon Fraser University. Published Dec. 2002. [retrieved on May 16, 2008]. Retrieved from the internet: <URL: http://www.ensc.sfu.ca/~ljllja/cnl/pdf/duncan.pdf>.
ISR & WO dated Jun. 26, 2008 for International Application No. PCT/US08/55494.
ISR & WO dated Feb. 15, 2008 for International Application No. PCT/US07/12436.
Phonefactor News, Two-Factor Authentication Without Tokens: Positive Networks Debuts PhoneFactorTM, May 22, 2007, http://www.phonefactor.com/news/tow-factor-authentication-without-tokens-positive-networks, p. 1-4, Overland, Park, KS.
Realwire From Webitpr, Clickatell Partners with RSA, The Security Division of EMC, to Provide Global Enterprise Customers with On-Demand Authentication using Cell Phones, May 27, 2008, http://www.webitpr.com/release_detail.asp?ReleaseID=8755, p. 1, Redwood City, CA.
Lauri Giesen, "Near-Field Dreams," http://www.digitaltransactions.net/files/Cover0306.doc.
Chen et al., "Short-range Wireless Technologies with Mobile Payments Systems," http://doi.acm.org/10.1145/1052220.1052302.
Noll et al., "Business Through Mobile Phone Initiated Near Field Communication," http://jnoll.homelinux.org/jnoll/ref/200505NUf-NFC-Mobile-Noll-Calvet.pdf.
James Lee, "NFC (Near Field Communication) technology + mobile phones = Interesting potential uses," http://jnoll.homelinux.org/jnoll/ref/200505NUf-Mobile-Noll-Calvet.pdf.
Cellit Mobile Management, "House4Cell," http://www.house4cell.com, p. 1-2.
Cellsigns, Inc., "Cellsigns get mobile," http://www.cellsigns.com, p. 1-4.
Cellsigns, Inc., "Mobile Agent—Mobile Search for Real Estate," http://www.cellsigns.com/mobileagent/index.shtml, p. 1-2.
3GPP Organizational Partners: "3rd Generation Partnership Project, Technical Realization of the Shortm Message Service (SMS)," 3GPP TS 23.010 Release 7.0.0, 2007, pp. 1-7 and 69-107.
Toorani, M, et al.: "Review Of Security Of Short Message Service," College Of Electrical Engineering, University of Alem O Saanat Of Iran and Apadana Research and Lab, Educational Paper, 2008, pp. 1-16.

* cited by examiner

SYSTEMS AND METHODS FOR SECURE SHORT MESSAGING SERVICE AND MULTIMEDIA MESSAGING SERVICE

CROSS-REFERENCE TO RELATED APPLICATIONS

This application is a continuation of U.S. Ser. No. 12/414,355 filed on Mar. 30, 2009 and entitled "SYSTEMS AND METHODS FOR SECURE SHORT MESSAGING SERVICE AND MULTIMEDIA MESSAGING SERVICE". U.S. Ser. No. 12/414,355 is a non-provisional of U.S. Provisional No. 61/040,526 filed on Mar. 28, 2008 and entitled "SECURE SHORT MESSAGING SERVICE AND MULTIMEDIA MESSAGING SERVICE SYSTEMS AND METHODS".

This application is also a continuation-in-part of U.S. Ser. No. 11/807,024 filed on May 25, 2007 and entitled "SECURE MOBILE INFORMATION MANAGEMENT SYSTEM AND METHOD". U.S. Ser. No. 11/807,024 is a non-provisional of U.S. Provisional No. 60/920,603 filed on Mar. 29, 2007 and entitled "SECURE MOBILE INFORMATION MANAGEMENT SYSTEM AND METHOD". U.S. Ser. No. 11/807,024 is also a non-provisional of U.S. Provisional No. 60/809,052 filed on May 25, 2006 and entitled "MOBILE INFORMATION MANAGEMENT SYSTEM AND METHOD". The entire contents of all of the foregoing applications are hereby incorporated by reference.

TECHNICAL FIELD

The present disclosure relates to systems and methods for managing short messaging service (SMS) messages and multimedia messaging service (MMS) messages in an encrypted and secure manner.

BACKGROUND

Creation, transmission, and delivery of SMS and MMS messages have greatly increased, as supporting mobile devices and networks have proliferated. However, messages are typically unencrypted during at least a portion of transmission and delivery (i.e., messages are not typically encrypted end-to-end), and are thus vulnerable to interception or other undesired access. Additionally, a mobile device may be lost or misplaced and messages and/or other information stored thereon may be accessed or otherwise revealed.

Moreover, in the past, people have carried many different items in their wallets or purses, for example. Certain of these items store personal information, provide identification for various purposes, allow the person to make purchases, provide proof of particular facts, or a combination thereof. Certain items that have been carried in wallets include credit cards, bank cards, debit cards, check books, bank books, bank account records, credit card records, bills, identification cards, licenses such as a driver's license, CDL, pilot's license, etc., social security cards, voter registration cards, passports, visas, immigration cards, loyalty cards, e.g., for grocery stores such as SAFEWAY™, and ALBERTSONS™, retail stores such as GAP™, and STARBUCKS™, membership cards such as COSTCO™, REI™, gyms, and country clubs, frequent flyer program cards or numbers, rewards programs, video clubs, library cards, insurance cards, such as health, auto, home, and life insurance, login and password information, elevator cards, parking structure cards, room keys, phone numbers, e-mail and street addresses, calendars, calling cards, medical information such as medical history, drugs being taken, immunization records, living wills, medical power of attorney, emergency contact information, personal photographs, personal memorabilia, receipts, proof of warranties and warranty information, tax records, proof of professional credentials, proof of authority, and business cards, as examples.

In the past, people have also carried mobile phones, which, besides being used to place and receive calls and send, receive, and store short messaging service (SMS) messages and multimedia messaging service (MMS) messages, have contained information such as phone numbers and calendars, and some of which have had Internet access. Mobile phones typically include processors, digital storage, displays, and software, among other things, and many hold and display photographs, provide for purchases on the Internet, include a global positioning system (GPS) or a combination thereof. Further, systems and methods have been developed to manage various information and activities including personal information. Various such systems and methods are computer implemented, involve computer software, utilize computer storage databases, are network or Internet based, or a combination thereof, as examples. Still further, bar codes, near field communication (NFC) and Bluetooth communication, among other technologies, have been used to communicate with electronic devices of certain types. Even further, personal digital assistants (PDAs) and smart phones, such as the BLACKBERRY™ have been used to send and receive e-mails, as well as placing and receiving telephone calls, although, in the past, users of PDAs, smart phones, and the like have typically had to sort through a large number of e-mails to find particular information that they needed or desired.

Furthermore, needs and potential for benefit, exist for a person to be able to use the Internet, or otherwise provide for efficient communication, entering of data, and transferring of data, but needs also exist that an acceptable level of data security be maintained with such systems and methods. Further needs and areas for potential for improvement include improving the availability of information from a number of different sources, reducing duplication in the entering of information, organizing information and providing information in a more-usable form, more effectively transferring information between a storage device and another device, and providing more information, more up-to-date information, or both, to a user. Further needs and areas for potential for improvement include updating information, for example, in a timely manner or in real time, and providing notifications or alarms, at least for particularly important information.

In specific examples, needs and potential for benefit exist in the areas of methods and systems for managing information for a number of users, using the Internet and mobile phones of the users. Particular needs and potential for benefit exist for such systems and methods that allow users to send, receive, and store SMS and MMS messages that are encrypted during transmission and/or that are large in size. Particular needs and potential for benefit exist for such systems and methods that receive information from users, that include a criteria for alarming, that receive information from one or more third parties, that select a fraction of the information from third parties, that transmit this fraction of the information to the mobile phones of the users, where the information is organized in a manner that it is accessible to the users. Additional needs and potential for benefit exist for certain processes to be repeated, and for alarms to be provided to the users when certain information satisfies one or more criteria, for example, that the users have identified. Further needs and potential for benefit exist for software modules operating on servers and on mobile phones that provide for secure storage of information, that select, send, and receive nuggets of personal information, and that store the nuggets for access by the user, for example, without sorting through a number of e-mails.

In addition, in the past, various systems and methods for authorizing actions and authenticating access have existed. For example, locks and keys have been used to control physical access to spaces (e.g., locked doors on buildings, electronic keys for hotel rooms, etc.). However, people had to carry such keys to obtain access. Passwords and pass codes have been used to authorize access to controlled spaces, and to grant computer access to electronically stored data. However, users must remember these passwords or pass codes. Systems and methods have also existed for authorizing other actions. For example, cards have also been used to authorize financial transactions, such as payment at the point of sale for the purchase of goods or for the provision of services. Besides requiring the presence of the card, transactions have been authorized using bank card networks, which verified that the cards were authorized. Signatures have also been used to authorize transactions. However, users needed to carry the cards, and signatures have been forged.

Needs and potential for benefit exist for other or better systems and methods for authorizing such actions, or other actions, that do not require the users to carry additional cards or keys, remember additional passwords, codes, or information, that use items already carried by the users, that use items that are frequently used and controlled by the user, that are more convenient, that offer alternatives, that are easily trackable, that provide an ability to authorize a variety of different actions, that cannot easily be forged, or a combination thereof.

SUMMARY

Disclosed are systems and methods configured for managing (i.e., creating, editing, viewing, compressing, decompressing, disassembling, reassembling, queuing, routing, encrypting, decrypting, sending, receiving, replying, forwarding, storing, and/or the like) communications (for example, short messaging service (SMS) messages, multimedia messaging service (MMS) messages, and other information transmission, and/or the like) in a secure manner (e.g., in an encrypted or otherwise secured manner). In an embodiment, a secure short messaging service (SMS) system comprises a software module configured for use on a device, such as a mobile device. The software module is configured to encrypt an SMS or MMS message via a first encryption. A gateway is configured to communicate with the mobile device. The gateway is configured to receive the encrypted SMS message from the mobile device.

In another embodiment, a user composes a SMS or MMS message on a mobile device and the message is encrypted thereon. The user sends the encrypted message to a gateway or server. The gateway or server decrypts the encrypted message. The gateway determines the message destination (e.g., another user or a third party). Depending on the message destination (and whether further encryption is desired), the gateway may re-encrypt the decrypted message (often using a different encryption) and send the re-encrypted message to the destination (e.g., another user or a third party). The mobile device of the receiving party receives the re-encrypted message and decrypts the message. The receiving party's mobile device may send delivery acknowledgement, open acknowledgement, error, or other desired messages to the gateway. These message status indicators may further be sent by the gateway to the originator of the message.

In another embodiment, a method of securely delivering a message to a mobile device comprises dividing the message into at least two sub-messages. The sub-messages are configured according to a short messaging service (SMS) protocol. The sub-messages are encrypted, and transmitted to a mobile device according to an SMS protocol. At the mobile device, the at least two encrypted sub-messages are decrypted and combined to form the message.

In another embodiment, a method of securely delivering a message to a mobile device comprises encrypting the message and dividing the encrypted message into at least two sub-messages. The at least two sub-messages are transmitted to a mobile device according to at least one of an SMS protocol or an MMS protocol. At the mobile device, the at least two sub-messages are combined to form an encrypted message; and the encrypted message is decrypted at the mobile device.

In yet another embodiment, a method of deleting information on a mobile device, comprises transmitting, to a mobile device, a secure message comprising a wipe instruction. At the mobile device, at least one item of information is deleted responsive to the wipe instruction.

The contents of this summary section are provided only as a simplified introduction to the disclosure, and are not intended to be used to limit the scope of the appended claims.

Figure 1:
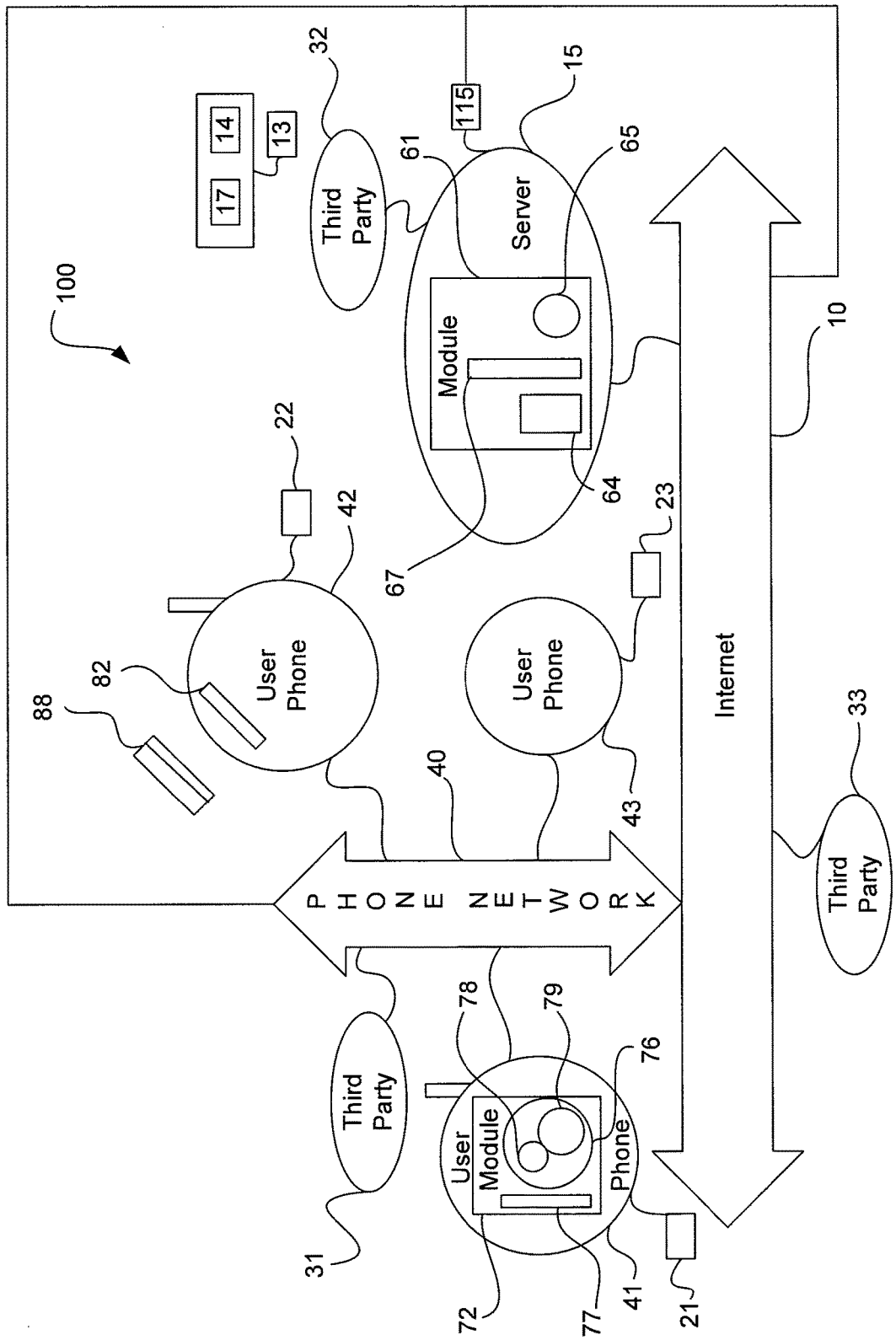
FIG. 1 is a block diagram illustrating, among other things, an example of an environment in which various embodiments may operate and various examples of systems of managing information and/or messages for a number of users.

The drawings illustrate, among other things, various particular examples of embodiments, and certain examples of characteristics thereof. Different embodiments include various combinations of elements or acts shown in the drawings, described herein, known in the art, or a combination thereof.

DETAILED DESCRIPTION

The present disclosure provides, among other things, a number of embodiments of systems and methods for managing short messaging service (SMS) messages and multimedia messaging service (MMS) messages in a secure manner. While various embodiments are described in sufficient detail to enable those skilled in the art to practice the invention, it should be understood that other embodiments may be realized and that various changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical and/or electronic couplings between the various elements. It should be noted that many alternative or additional functional relationships or physical connections may be present in a practical system.

As used herein, a "mobile device" may be any device configured for transmitting and receiving electronic communications, for example a cellular phone, a satellite phone, a Palm Pilot™ device, personal digital assistant (PDA), BlackBerry™ device, iPhone™, smartphone, desktop computer, laptop computer, tablet computer, netbook, portable device for communication, or the like. Throughout various exemplary embodiments illustrated or discussed in this disclosure, a mobile device may be referred to herein as a "phone" or "mobile phone", but it should be understood that it may have other functionality or be any other type of mobile device.

Particular embodiments include methods for authorizing actions using mobile phones. Embodiments may include acts such as receiving from a person having authority to authorize the action, an identification of a phone number for obtaining authorization for the action, and receiving from a person seeking the action a request for authorization of the action. Certain embodiments also include acts such as sending a first message through a mobile phone network to the mobile phone, including a description of the action for which authorization is requested, and receiving, from the first mobile phone, a second message, which authorizes the action. Actions that are authorized, in different embodiments, include computer access, physical access, and financial transactions, as examples. In various embodiments, the phone number may be received through the mobile phone network, through the Internet, through a local signal, or directly from the user, as examples.

In some embodiments, a user may be able to enter information into a website, or may authorize entry of information into the website by others, which may be transmitted to the phone automatically for storage. In addition, in some embodiments, users may be able to enter information through their phone for transfer to the website server. In various embodiments, third parties, such as airlines, financial institutions such as banks, and the like, may provide information to the website, some or all of which may be transferred to the phone. Further, in some embodiments, certain such information may provide an alert or alarm to the user, for example, regarding important information such as notification of large deposits or withdrawals, changes in flight information, location of children, and the like. In various embodiments, a user may be able to view other information on the phone, on the website, or both, such as, for example, bank account balances, transaction histories, frequent flier miles, credit card bills, automatic deposits and withdrawals, insurance information, warranties, service contracts, and the like.

In various embodiments, FIGS. 1 through 8 illustrate an example of an environment in which various embodiments may operate, and also illustrates various examples of systems, including systems of managing SMS messages in a secure manner. Various embodiments described herein are illustrated for use with a short messaging service (SMS) protocol. However, other protocols, for example, a multimedia messaging service (MMS) protocol, an Unstructured Supplementary Service Data (USSD) protocol, or other messaging protocol, and/or the like may suitably be employed. Moreover, various embodiments described herein are suitable for use when a messaging protocol is utilized for at least a portion of the communication. System 100 is, among other things, an example of a network-based system configured for managing information that is transferred to, transferred from, and/or stored on a mobile device, which is accomplished in many embodiments while maintaining an acceptable level of data security. In the example of system 100, users 21, 22, and 23 own, use, control, or have access to mobile phones 41, 42, and 43 respectively, which are serviced through a network, for example mobile phone network 40. Although one mobile phone network 40 is shown, some embodiments may include or use a number of mobile phone networks 40, which may be interconnected, for example. As used herein, unless specifically stated otherwise, a "mobile phone network" may be a cellular network, a satellite network, a WiFi network, a WiMAX network, a wireless network, or any other suitable network for transmission of information to mobile phones and/or other mobile devices. Moreover, a mobile device may connect to a network in any suitable manner, for example via a GSM modem, a CDMA modem, and the like. Additionally, a mobile device may connect to multiple networks simultaneously, for example to a GSM network of a first carrier via a GSM modem, and to a CDMA network of a second carrier via a CDMA modem. Further, the three users 21 to 23 and mobile phones 41 to 43 shown may serve as examples of a larger number of users and mobile phones. Many users of system 100 may have access to the Internet 10. For example, in various embodiments, user 23 has access to the Internet 10 through personal computer 13. Further, in certain embodiment, mobile phone network 40 is in communication with the Internet 10, or information is capable of being communicated (e.g., in one or both directions) between mobile phone network 40 and the Internet 10. In various embodiments, mobile phone network 40 may be connected to one or more additional mobile phone networks 40 or other networks in any suitable manner, for example via the Internet 10, via a public switched telephone network (PSTN), and/or the like.

Moreover, system 100 may be a public system (e.g., a system wherein any number of users may utilize system resources) or a private/closed system (e.g. a limited-access system with a "circle of trust" such that a user must be authorized to utilize particular system resources and/or send and receive communications with other members of the circle of trust). In various embodiments, system 100 may be configured to allow communication only between users (for example, users 21, 22, and 23) who are members of a particular trusted group. In this manner, system 100 may be particularly suitable for businesses, military, law enforcement, governments, and the like, who wish to exchange highly sensitive and confidential information via system 100. For example, system 100 may be configured to enable communication only between members of a pre-defined trusted group, such as FBI agents, ATF agents, Army personnel, and the like.

In various embodiments, server 15 is in communication with the Internet 10. However, server 15 may be in communication with a wireless carrier, a private network, a mobile phone, another server, and/or the like, via a wireless network or other means such that server 15 does not need to be in communication with the Internet 10.

In various embodiments, server 15 is part of system 100, and server 15 is configured as a trusted gateway configured to manage encrypted messages. Server 15 may provide any desired functionality to system 100, for example managing client software installed on one or more mobile devices, updating client software installed on one or more mobile devices, issuing commands to client software, tracking messages sent and received by client software, and the like. Server 15 may also manage encryption keys for client software, generate new encryption keys, communicate with a hardware security module (for example, a module located on another server 15 coupled to the instant server 15), and provide resiliency to increase the reliability of message delivery.

System 100 further comprises, on server 15, (at least one) first software module 61. Although shown just on server 15, in some embodiments, module 61 may be installed on or operating on more than one server. For example, server 15 may include multiple servers, such as one or more of a firewall server, a database server, an SMS gateway server, a web server, a domain server, or any other server. In certain embodiments, software module 61 may form at least one website 65. In certain embodiments, multiple users (e.g., 21 to 23) may access or visit website 65 (for example, through the Internet 10) and elect to send, receive, forward, reply, view, sort, and generate reports, including compliancy reports, through system 100 using their mobile devices or other communications devices. Moreover, one or more users may access or visit website 65 via any suitable protocol, for example WAP, https, and the like.

In certain embodiments, a user (for example, user 23) who does not have a module 201 (as described below) installed on his mobile device, may access website 65 in order to view a secure message via an anonymous retrieval method as follows: (1) the mobile device may receive a first standard (unencrypted) SMS message containing first unique hyperlink to a first website; (2) the user follows the hyperlink to the first website in order to create a password and receive a unique personal identification (PIN) number; (3) the user replies to the first SMS message with the unique PIN number in order to receive a second standard SMS message containing a second unique hyperlink to a second website; (4) the user follows the hyperlink to the second website and may view the secure message after inputting the password. In other embodiments, user 23 may access website 65 through computer 13 and internet 10. In different embodiments, computer 13 may be a desk top personal computer, a laptop or notebook computer, a PDA, and the like. In some embodiments, users may access website 65 on server 15 through their phones (e.g., 41 to 43), through mobile phone network 40, or both, as examples.

In many embodiments, first software module 61 or module 201 (described below) provide secure storage 64 for each user's (e.g., 21 to 23) personal information, for example, information received from the user, contents of sent and received SMS messages, and the like. In a number of embodiments, storage 64 may also be used to store personal information about the users that has been received by module 61, module 501, or server 15 from at least one third party, which may be acting on behalf of the user to provide information to the user. In certain embodiments, third party 33 may provide such information to module 61 or module 201 through the Internet 10, and third party 31 may provide such information to module 61 or module 201 through mobile telephone network 40 and the Internet 10. In some embodiments, information that is communicated through mobile telephone network 40 may also, or instead, be communicated through a traditional phone network, for example, that provides direct wired phone service for a number of users. Moreover, third parties 31, 32, and 33 can choose to deploy gateway 115 at their respective data center behind their firewall. This provides each third party with another layer of security. Each third party can manage all access to server 15 according to their internal security policy. All communication between gateway 115 and mobile phone network 40 (e.g., carriers) can be direct.

Module 201 may be self-updating (e.g., when a new software update is available, gateway 115 may send a message to module 201 informing module 201 of the available update). The user's (or third party's) phone is informed of the update (e.g., via a SMS or MMS message (e.g., formatted with a command)) and asked for permission to update module 201. For example, the message (e.g., formatted with a command) queries the user as to whether the user would like to receive the update. If the user accepts to receive the update, then module 201 terminates itself, starts a browser to access server 15 or gateway 115, and downloads the latest version of module 201 from server 15 or gateway 115. Thus, once permission is given to update module 201, the new version of module 201 is downloaded to the user's (or third party's) phone and installed over the old version of module 201. A message confirming installation of module 201 may be sent to gateway 115. Moreover, module 201 may be configured to communicate with and/or utilize multiple gateways 115.

In various embodiments, customized versions of module 201 may be provided in order to make module 201 operative and/or available for use on varying hardware, for example various mobile phones and/or computing platforms (e.g., Google Android, Java 2 Mobile Edition, Windows Mobile, Linux, Microsoft Windows, Mac OS, Unix, and the like). Moreover, access to module 201 may be controlled via a password, a biometric, and the like. Additionally, module 201 may contain and/or be associated with information configured to identify a third party (e.g., a reseller, a referrer, a corporation, and the like), in order to provide customized services and/or tracking. For example, a reseller may receive a commission based on the number of secure SMS messages transmitted by module(s) 201 associated with the reseller.

Moreover, module 201 may be configured to utilize registration with a gateway, for example gateway 115. In various embodiments, registration may comprise a user taking affirmative steps, for example inputting a secure identification provided by a gateway administrator; inputting a short code, a long code, or a phone number (for example, a number associated with a cellular modem) to facilitate routing of one or more messages. Furthermore, registration may comprise exchanging encryption keys between a mobile device and a gateway. For example, a server public key may be utilized to securely send the encryption key of module 201 to a mobile device.

In certain embodiments, module 201 is registered on gateway 115 in order to facilitate communications between module 201 and gateway 115. For example, registration may be accomplished through use of a default server public key, a unique module 201 public key, a short code, and a unique secure identification code. In this manner, a module 201 may know how to contact gateway 115 in order to register. Module 201 encrypts the unique secure identification code and the newly generated module 201 public key with the default server public key and sends the result in an SMS message to the short code. Gateway 115 decrypts the SMS message using a default server private key. Gateway 115 verifies the unique secure identification code and the phone number associated with module 201. If the result is not verified, an error message is returned to module 201. If the result is verified, gateway 115 transmits a new server public key to module 201.

Gateway 115 then creates a unique AES key and sends this key, together with registration information, to module 201 via a registration message encrypted with the module 201 public key. Module 201 decrypts the registration message using module 201 private key. Module 201 then transmits a registration acknowledgement message, encrypted with a unique AES key associated with module 201, to gateway 115. Upon receipt of the registration acknowledgement message at gateway 115, module 201 is registered with gateway 115.

In addition, module 201 may be configured to support methods for determining unauthorized access to module 201 (i.e., intrusion detection, and the like). For example, if the correct password to gain access to module 201 is not provided for three (3) consecutive times (or any desired value chosen by a user or a gateway administrator), data stored by module 201 and/or module 201 itself may be deleted.

Additionally, a module 201 on a mobile device may be registered with multiple gateways 115 simultaneously. For example, a module 201 may be registered with a first gateway 115 associated with a GSM network of a first carrier, and communications between module 201 and the first gateway 115 may be transmitted via a GSM modem. The same module 201 may also be registered with a second gateway 115 associated with a CDMA network of a second carrier, and communications between module 201 and the second gateway 115 may be transmitted via a CDMA modem. Module 201 may be registered with any suitable number of gateways 115 in order to facilitate communications with various intended message recipients. Similarly, a gateway 115 may be configured to communicate with a first group of modules 201 associated with a first carrier via a first GSM modem, configured to communicate with a second group of modules 201 associated with a second carrier via a second GSM modem, configured to communicate with a third group of modules 201 via a dedicated short code, and so on. In this manner, gateway 115 may communicate with multiple modules 201 via a cellular modem and/or other communications device appropriate for each particular module 201 (e.g., based on particular mobile phone hardware, for example).

In certain embodiments, gateway 115 may be configured to allow an SMS message from a module 201 to be delivered only to other modules 201 who are in a common circle of trust with the message sender. Stated another way, in various embodiments, a module 201 may only be permitted to communicate with other members of a predefined group. For example, a module 201 utilized by a sensitive government agency may be permitted to communicate only with other members of the same agency. Moreover, gateway 115 may also be configured to allow an SMS message from a module 201 to be delivered only to other modules 201 who are in a common circle of trust with each other, but not with the message sender. In this manner, gateway 115 may be further secured, as unintended and/or undesired communications outside a particular circle of trust or other group may be reduced and/or eliminated. Further, gateway 115 may be configured to allow an SMS message from a module 201 to be delivered to any other module 201. Moreover, gateway 115 may be configured to contact another gateway 115 for information regarding a module 201 registered with the other gateway 115. Gateway 115 may also be configured to route at least one message of module 201 to another gateway 115.

In various embodiments, gateway 115 may be configured with a "whitelist" comprising a list of approved modules 201 and/or mobile devices which may be authorized to be registered with gateway 115. For example, a user 21 may desire to enroll in mobile banking services offered by third party 31. User 21 communicates the desire to third party 31, who approves the request. The module 201 associated with user 21 may then be added to a whitelist on gateway 115 associated with third party 31. User 21 may then register their module 201 with gateway 115. In this manner, a pre-approved, trusted set of modules 201 may be defined and/or registered such that communications between members of the whitelist and/or one or more third parties may be facilitated. Moreover, each module 201 and/or mobile device in a whitelist may be configured with a unique identification code. The unique verification code may be valid for a limited period of time, for example six hours. In this manner, security may be improved, as a module 201 may be required to both be a member of a whitelist and provide a unique identification code in order to register with gateway 115 and/or to communicate with other modules 201 via gateway 115.

In certain embodiments, third party 32 also provides information to module 61 or module 201 on server 15 through a communication means other than the Internet 10. Such a communication means may be, for example, a private network, a local area network (LAN), a wide area network (WAN), a telephone network, a financial or bank card network, etc. Third parties 31, 32, and 33 are examples of data providers, or personal data providers. Third parties 31 to 33 may be, for example, lottery organizers or operators (e.g., a government agency, a state, or a gambling organization), brokers for lottery organizers (e.g., resellers, convenience stores, or server 15), distributors for lottery organizers (e.g., resellers, convenience stores, or server 15), financial institutions, airlines, bank card providers, merchants, an employer or employee of the user, news providers, health care providers, insurance companies, stock brokers, governmental agencies, non-governmental organizations, etc., or any of these that may be functional on-line.

Module 201, server 15, and/or gateway 115 or other components utilizing encryption may utilize any suitable encryption techniques and/or security models to encrypt, decrypt, compress, decompress, or otherwise manipulate and/or process information, for example symmetric key, asymmetric key, AES, block cipher, and the like. Moreover, module 201, server 15, gateway 115, and/or other components may update, revise, expand, replace or otherwise modify the security model and/or encryption technique utilized, as desired.

Module 201 can be configured to store a set number of messages on server 15, gateway 115, or the user's phone. Module 201 can be configured to store the latest specified number of messages (set by the user, server 15, or gateway 115). Older messages may be deleted to make room for new messages (although permanent means of storage can also be used). Users can mark messages that should be exempt from this deletion process. Such marked messages may be stored until manually deleted by the user, server 15, or gateway 115.

Third parties 31, 32, and 33 or user 21, 22, and 23 can set a specific notification, for example a ringtone, to a message. The ringtone can be one or more ringtone sounds, vibrations with custom duration, light flashing, or other means of notification. This ringtone is played on the user's phone 41, 42, or 43 when the message is received at phone 41, 42, or 43. For example, a university can create an alarm ringtone to identify messages that may require immediate action (versus a notification ringtone that identifies messages that are more informational or not urgent). For example, the header of the message can include an identification to identify the priority of the message (e.g., which can be set by a third party 31, 32, or 33 or a user 21, 22, or 23).

Third parties 31, 32, and 33 can send special secure SMS messages to users 21, 22, and 23. Once these secure SMS messages are received by module 201 on the user's phones 41, 42, or 43, the messages can be converted to one or more bar codes or graphics that can be used at third party Point-of-Sale (POS) terminals or websites to get discounts, coupons including electronic coupons, loyalty points/rewards, airline boarding passes, or other considerations.

Module 201 can be customized to provide users 21, 22, and 23 with an easy to use menu system (e.g., with menu driven options), in order to facilitate communications with another user or third party. For example, a user can click on a "get my balance" menu option on its phone 41, 42, or 43 and select an account from a list of accounts on the menu (rather than having to remember a list of commands such as "bal account1"). Moreover, module 201 may be configured with any suitable menus, options, interfaces and/or commands to facilitate desired functionality for module 201 and/or ease of use for a user. In various embodiments, module 201 may be configured to support various communications via SMS messages, for example: mobile banking, requesting and/or receiving a credit score, requesting and/or receiving funds for a prepaid phone, requesting access to and/or granting access to a physical location; requesting and/or receiving medical records, and the like. Module 201 and/or associated menus and interfaces may be updated and/or revised in order to provide new functionality as appropriate.

In an embodiment, module 201 may be configured to support a mobile banking application. For example, a user may purchase prepaid mobile phone credits (e.g. minutes, and the like) from a vendor. The credits may be associated with a carrier for a mobile device having module 201 operative thereon. The user may then send an SMS message to the carrier via module 201, instructing the carrier to deposit a selected amount of credit with a banking institution. The carrier may then deposit an amount of money corresponding to the credits into the requested bank account, and then deduct the deposited credits from the carrier account associated with the mobile device. In this manner, a user may move money into a bank account. Similarly, a user may move money out of a bank account by sending an SMS message to the bank, requesting an amount of money be provided to a carrier in exchange for prepaid mobile phone credits. A user may also send an SMS message to a carrier, instructing the carrier to transfer a selected number of minutes to another user. In like manner, users may send prepaid phone credits and/or money to and/or from a retailer, and the like, and/or any combination to and from various users, vendors, carriers, banks, and so forth. Transfers of credits may incur a fee, for example a fee charged by a carrier, a fee charged by a banking institution, and the like.

In certain embodiments, users 21, 22, and 23 can send a SMS or MMS message to multiple recipients (e.g., other users or third parties). Recipients of the message can reply to all recipients (including the sender) at one time. Module 201 creates and encrypts messages uniquely for each recipient. In addition to the message contents, messages may include a list of recipients, so that each recipient can reply to one or more of the recipients (including the sender). Users can also add more and different recipients to the list of original recipients. In certain embodiments, users 21, 22 and 23 can create a group consisting of a list of recipients. In other embodiments, a group is created by an administrator and the information for the group is sent to module 201 by one or more SMS messages. In these embodiments, users 21, 22 and 23 can send or forward messages to a group predefined by an administrator.

Moreover, in various embodiments the administrator can define a profile on gateway 115 consisting of predefined configuration settings. The administrator may then apply the profile to at least one module 201 by sending one or more SMS messages to a module 201. Responsive to the at least one SMS message, the configuration settings on module 201 may be changed to match the predefined configuration settings of the profile. In some embodiments, the profile may prevent users 21, 22 and 23 from overriding the settings changed by the predefined profile. In other embodiments, users 21, 22 and 23 can override the predefined profile settings to further customize module 201.

In a number of embodiments, one or more software modules (for example, second software module 72 (described below)) may be loaded on users' mobile phones to facilitate the sending, receiving, and storing of SMS messages and MMS messages in an encrypted and secure manner. In some embodiments, second software module 72 that is used on the mobile phones may be downloaded to the mobile phones through the mobile phone network, through the Internet, or both, as examples. In other embodiments, second software module 72 may be loaded onto the phone by the manufacturer of the phone, or by the mobile phone service provider, for example, where the phone is sold to the user or serviced. In some embodiments, module 72 may be loaded on a phone using a memory card, for example a MicroSD card, other flash memory card, and/or the like. In other embodiments, module 72 may be loaded on a phone from a computer using a data cable or other suitable wired connection. Moreover, module 72 may be loaded on a phone via a wireless protocol, for example Bluetooth and the like. Moreover, software module 72, software module 61, module 201, and/or various other components may be configured to support a particular application and/or user group, for example mobile banking, entry of health care information, domain registration, airline check-in, intra- and inter-government agency communication, enterprise communication, and the like.

In some embodiments, managing SMS messages and/or MMS messages or other communications may be done using a device other than a mobile phone, or that has more functionality or features than are typically found in a mobile phone. Such a device may be a personal digital assistant (PDA), a smartphone, a Blackberry, a laptop computer, a netbook, and the like.

Figure 12:
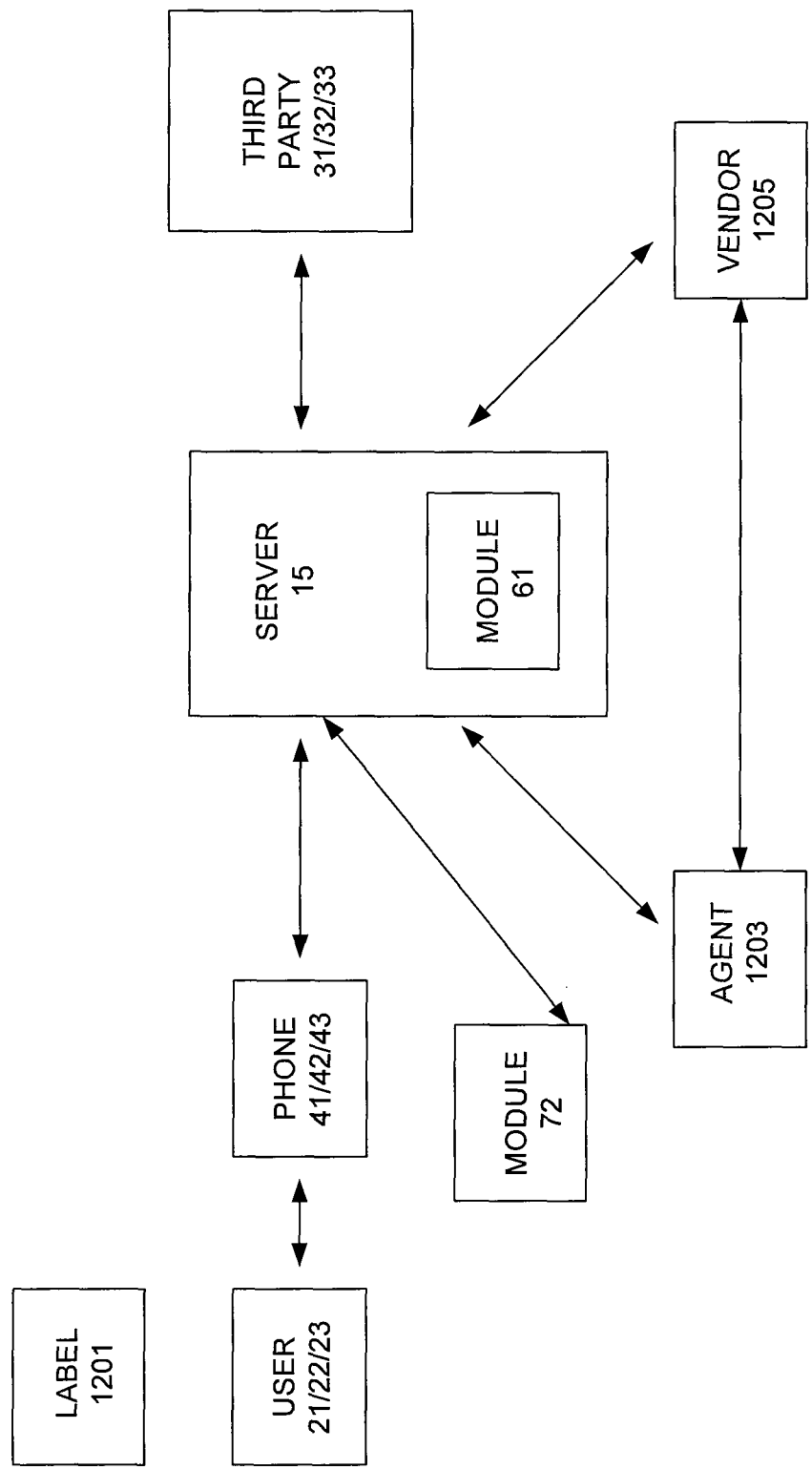
FIG. 12 is a block diagram illustrating an environment where server 15 manages and disseminates information to users 21, 22, and 23.

With reference now to FIGS. 1 and 12, in various embodiments, server 15 communicates with one or more third parties 31, 32, and 33 and/or users 21, 22, and 23 to send, receive, and store short messaging service (SMS) messages and multimedia messaging service (MMS) messages in a secure manner on phones 41, 42, and 43, and disseminate information to users 21, 22, and 23. Communication between module 201 and server 15 and/or gateway 115 can be through SMS, MMS, data services, and the like. Module 201 can be configured to use any of these protocols in a specified sequence until the data transmission to server 15 and/or gateway 115 or to module 201 is complete. Moreover, module 201 may be configured to send, receive, and store messages and information both in a secure and an unencrypted manner, as desired. Stated another way, a user may utilize module 201 to send both secure messages and unencrypted messages, reducing and/or eliminating the need for multiple messaging applications on the user's mobile device.

In certain embodiments, users 21, 22, and 23 may communicate with each other through SMS messages or other messages in a secure manner. For example, module 201 or a second software module 72 (described below) on the mobile phone of user 21 may send an SMS message intended for delivery to a mobile phone of user 22. Module 201 is accessed and installed onto the user's mobile phone much like module 61 or module 72 are accessed and installed onto the user's mobile phone. In many embodiments, a text message, large text file, or other information desired to be transmitted may need to be in a particular format in order to be able to transmit it using one or more SMS messages (e.g., due to the limitation of the number of characters that can be transmitted in an SMS message). In one example, numerous text messages are sent from server 15 (or phone 41 of user 21) to phone 42 of user 22, the text messages are compiled at phone 42 of user 22, and user 22 reviews one large text file (or text message) on phone 42. In this example, the transmission of one text message or multiple text messages is seamless to user 22 (e.g., user 22 receives one large text file or text message (instead of multiple text messages)). This format can be useful in sending information using text messages without the limitation of the number of characters typically found in text messaging. Stated another way, when the size of a particular piece of desired information exceeds a message size threshold, multiple messages may be utilized to convey such desired information to and/or from a mobile device.

Figure 3:
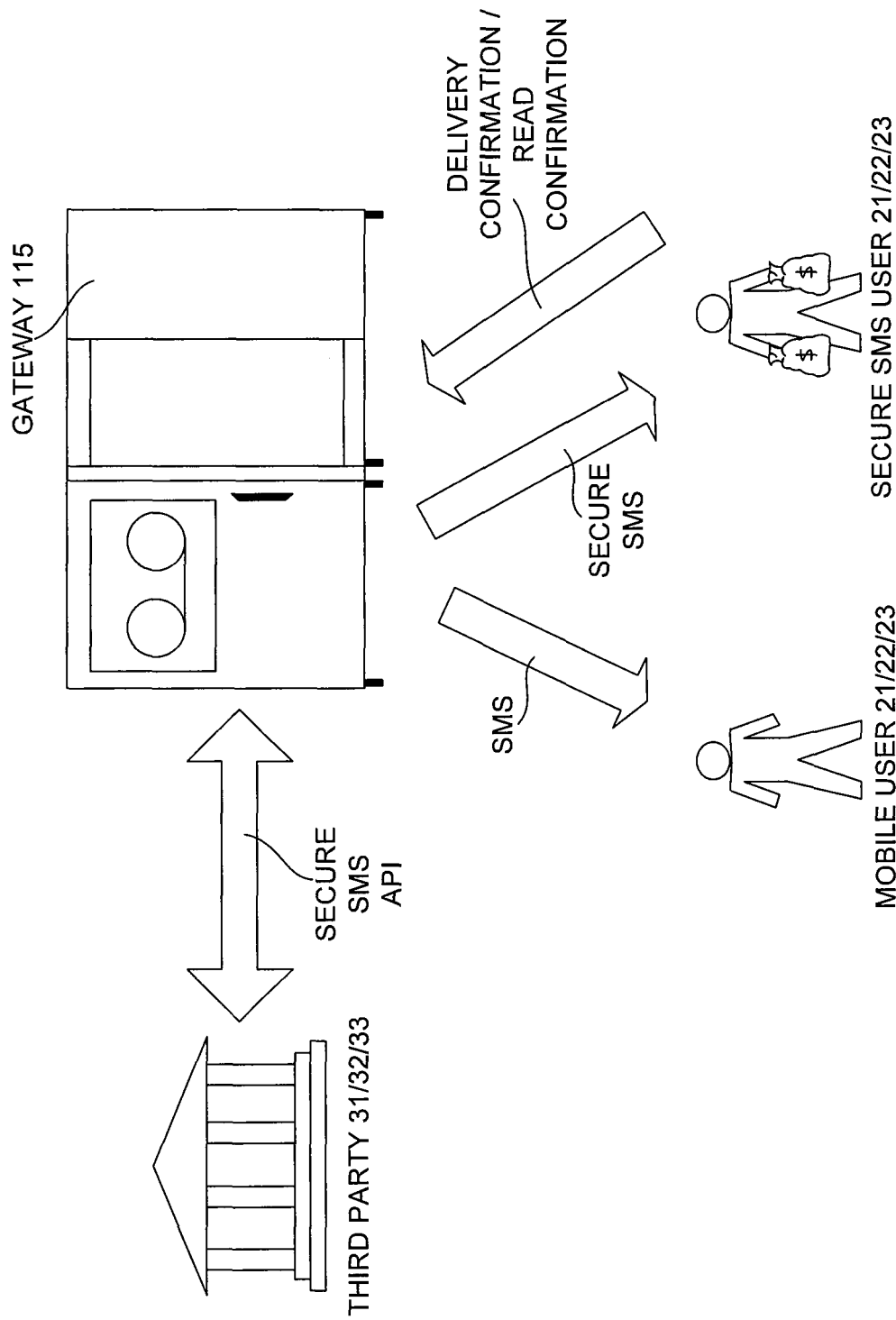
FIG. 3 illustrates communication between mobile users and/or third parties via a gateway 115 in order to create, send, receive, and/or store short messaging service (SMS) messages and multimedia messaging service (MMS) messages in a secure manner.
Figure 4:
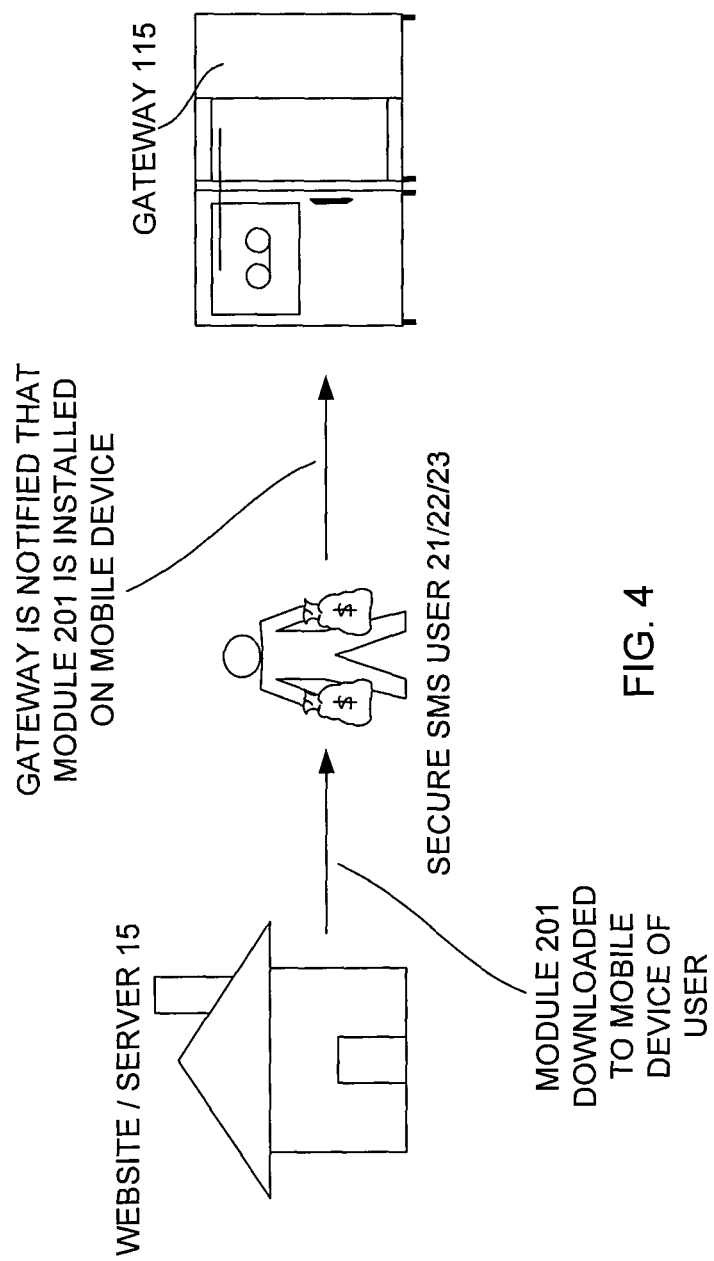
FIG. 4 illustrates installation and registration of a software module on a mobile device.
Figure 5:
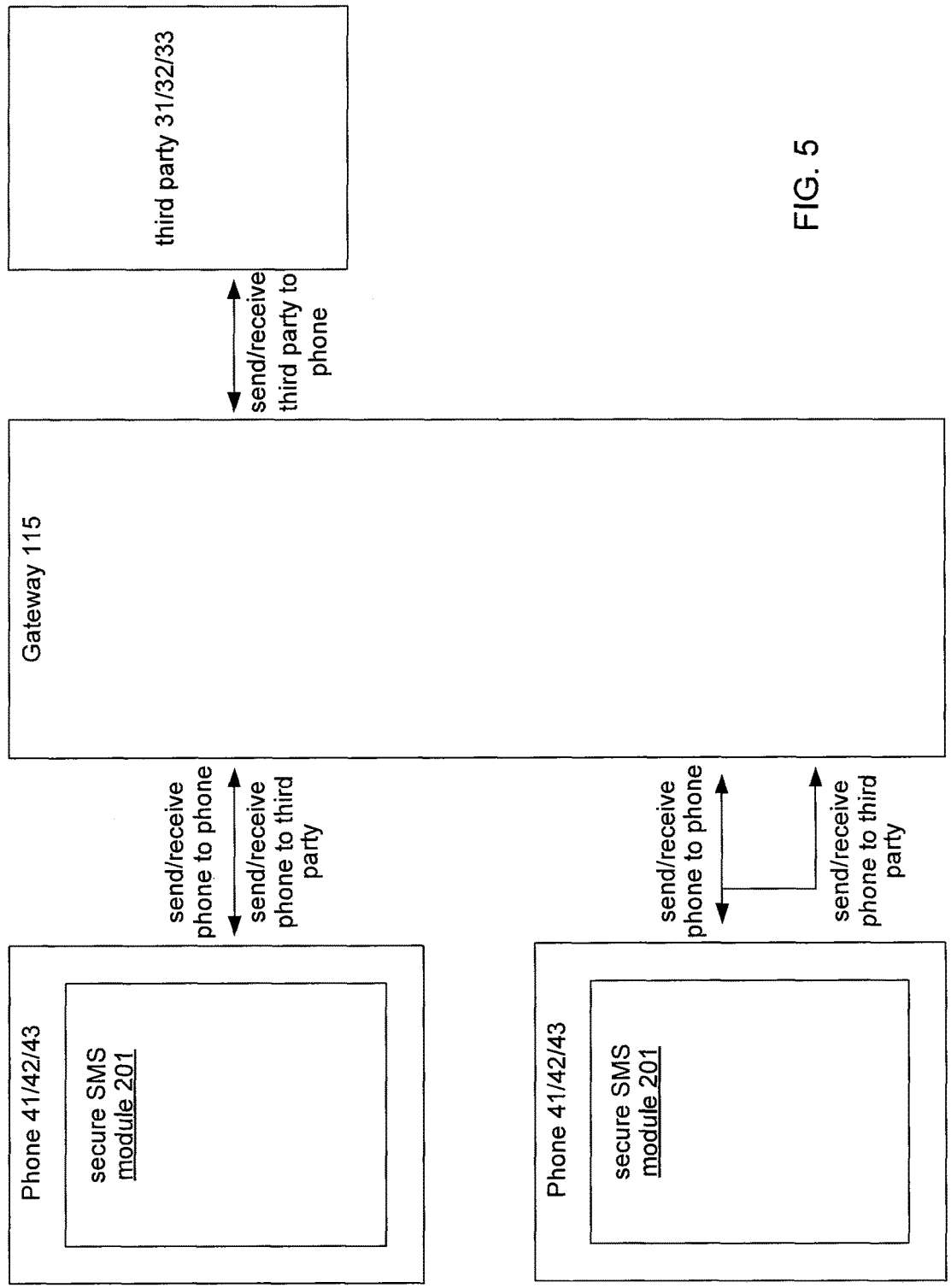
FIG. 5 further illustrates communication between mobile users and/or third parties via a gateway 115.

With reference now to FIGS. 3, 4, and 5 and in various embodiments, communications between one or more users 21/22/23 and/or third parties 31/32/33 can be routed through a trusted gateway 115. In this manner, system security may be improved. Gateway 115 communicates with one or more third parties 31/32/33 and/or users 21/22/23 (for example, via mobile phones 41/42/43) to send, receive, and store short messaging service (SMS) messages and multimedia messaging service (MMS) messages in a secure manner. Gateway 115 may also communicate with users 21/22/23 in a conventional (unsecured) manner, if desired. Moreover, users 21/22/23 and/or phones 41/42/43 may download software (e.g., secure SMS module 201) from a server 15. Gateway 115 may be notified of such installation and be configured to communicate with module 201 accordingly.

In an embodiment, gateway 115 may be configured as Software as a Service (SaaS). Gateway 115 may be accessed by third parties authorized to utilize the SaaS via a secure network connection, such as HTTPS. Performance of gateway 115 may be scaled, for example through use of load-balanced server farms. Moreover, gateway 115 may be connected to wireless carrier networks via multiple redundant connections. In this manner, gateway 115 may be configured to support a scalable number of users.

In another embodiment, gateway 115 may be configured as an on-site enterprise server. Gateway 115 may thus be accessed by an organization's internal resources, for example via a dedicated short code hosted with any supported aggregator or carrier. Moreover, gateway 115 may be configured to support a limited-access "circle of trust" allowing communication only between certain authorized users. Gateway 115 may also be configured with a customizable encryption scheme, message storage and/or archiving functionality and other features as desired by a particular organization deploying gateway 115 on-site.

In another embodiment, gateway 115 may be configured as a wireless carrier managed service. Gateway 115 may thus be partially or fully integrated into a wireless carrier's gateway, for example a wireless carrier's short messaging service center (SMSC). Alternatively, gateway 115 may operate as a stand-alone system. For example, gateway 115 may communicate with a SMSC of a first wireless carrier and with a SMSC of a second wireless carrier. Moreover, a gateway 115 may be associated with and/or coupled to any number of SMSCs. Similarly, one SMSC may associated with an/or coupled to any number of gateways 115. In this manner, gateway 115 may be configured to support a scalable number of users in a wireless carrier environment, and gateway 115 may facilitate secure delivery of messages across various networks.

Figure 6:
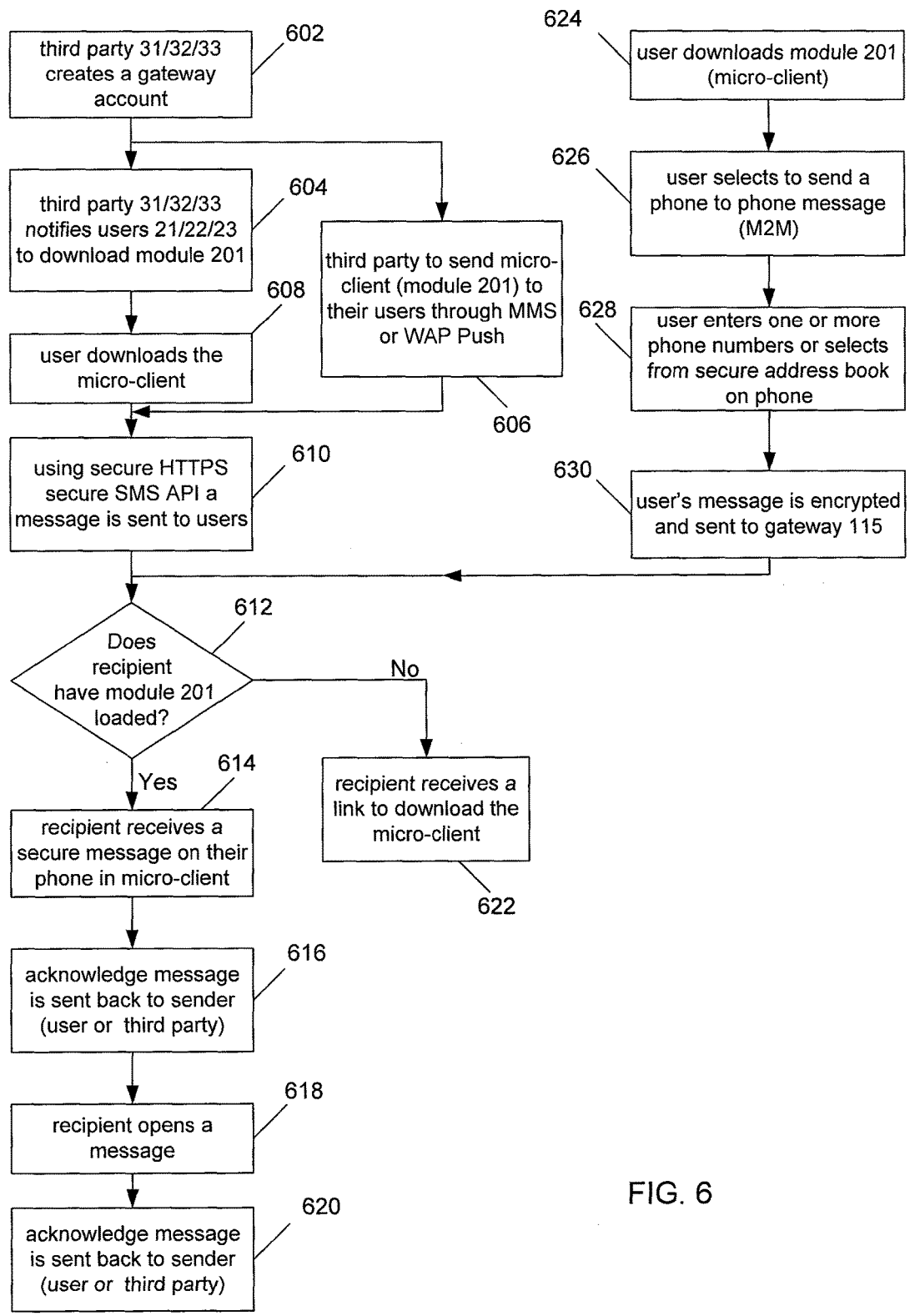
FIG. 6 is a flowchart illustrating a method for securely transmitting a message.

With reference now to FIG. 6 and in various embodiments, one or more of third parties 31, 32, and 33 can create an account associated with gateway 115 (step 602). Third parties 31, 32, and 33 notify users 21, 22, and 23 to download module 201 onto phones 41, 42, and 43 (step 604). Alternately, third parties 31, 32, and 33 can send module 201 to users 21, 22, and 23 through a MMS (Multimedia Messaging Service) or WAP (Wireless Application Protocol) push (step 606). The user downloads the module 201 (step 608). One or more APIs (Application Programming Interfaces) and https (Hypertext Transfer Protocol over Secure Socket Layer) or http (Hypertext Transfer Protocol) can be used between server 15 or gateway 115 and third parties 31, 32, and 33 or users 21, 22, and 23. Moreover, server 15, gateway 115, third parties 31, 32, and 33, and/or users 21, 22, and 23 may communicate via any suitable protocol, method, or means. Accordingly, the methods of the present disclosure are suitable for use on Global System for Mobile Communications (GSM) networks, code division multiple access (CDMA) networks, time division multiple access (TDMA) networks, frequency division multiple access (FDMA) networks, transmission control protocol/internet protocol (TCP/IP) networks, satellite communications networks, and/or the like, and/or any combination of the same.

A secure SMS API is used by third parties 31-33 to send a SMS or MMS message to gateway 115 or server 15 (step 610). A secure SMS API may utilize HTTPS, Web Services, Java API, and/or any other suitable protocols. A determination is made as to whether the user has module 201 loaded on their phone 41, 42, or 43 (step 612). If the user has module 201 loaded on its phone, then the user receives a secure SMS or MMS message on their phone in module 201 (step 614). An acknowledgement message may be sent back to the sender of the message (e.g., user 21, 22, or 23 or third party 31, 32, or 33) (step 616). Once the receiving user opens the message it received (step 618), another acknowledgement message may be sent to the sender via server 15 or gateway 115 confirming that the user opened the message (step 620). If the user does not have module 201 loaded on their phone, then the user may receive a link to download module 201 onto their phone (step 622), the message may be sent in clear text, the message may be skipped, an anonymous message retrieval method (as discussed above) may be utilized, and/or the like.

In various embodiments, with continued reference to FIG. 6, a user downloads module 201 (step 624). When the user elects to send a message from its phone to the phone of another user or third party (step 626), the user enters one or more phone numbers to send a message to in its phone (alternatively, the user may select from a secure address book on the user's phone) (step 628). For example, using a secure address book, the user can import their general address book content (from their phone) into their secure SMS address book (e.g., located in a database created by module 201). The information in the secure SMS address book is encrypted and stored on the phone. In this manner, if the phone is lost or stolen, those with access to the phone may be prevented from extracting personal contact information (or other sensitive information) from the phone.

The user's message is encrypted and sent to gateway 115 (step 630). As previously discussed, a determination is made as to whether the receiving user has module 201 loaded on its phone (step 612). If the user has module 201 loaded on its phone, then the user receives a secure SMS or MMS message on their phone in module 201 (step 614). An acknowledgement (for example, a delivery confirmation) is sent back to the sender of the message (step 616). Once the receiving user opens the message it received (step 618), then another acknowledgement (for example, a read confirmation) is sent to the sender via server 15 or gateway 115 confirming that the user opened the message (step 620). In certain embodiments, when a user replies to or forwards a message, a message identification is included in the message to enable tracking of which message was replied to, forwarded, and the like. In some embodiments, additional information may be embedded into the message, for example a total number of messages, a number representing the sub-message in the message chain, and the like. In this manner, a "thread" of related messages may be managed.

In various embodiments, the sender could log into a website associated with server 15 or gateway 115 to determine if the message has been delivered and opened. In another example, when the receiving user opens the message, module 201 automatically deletes the message within a predetermined period of time after the message is opened.

In another example, when the receiving user opens and closes the message, module 201 automatically deletes the message (either immediately or within a predetermined period of time after the message is closed). Server 15, gateway 115, or module 201 can create such an automatic deletion process by including a field in the header of the message (or in the body of the message) with a command to delete the message upon one of the exemplary events (or other defined event, time period, and the like). Users and third parties can view the status of every message. For sent messages, users and third parties can tell when each message was sent, when each message was delivered, and when each message was opened (e.g., via time, date, and status information about the message). For example, one or more icons may be provided (e.g. within module 201, via a web browser, and the like) in order to indicate the status of a particular message (e.g., sent, delivered, read, replied to, forwarded, deleted, and the like).

Figure 7:
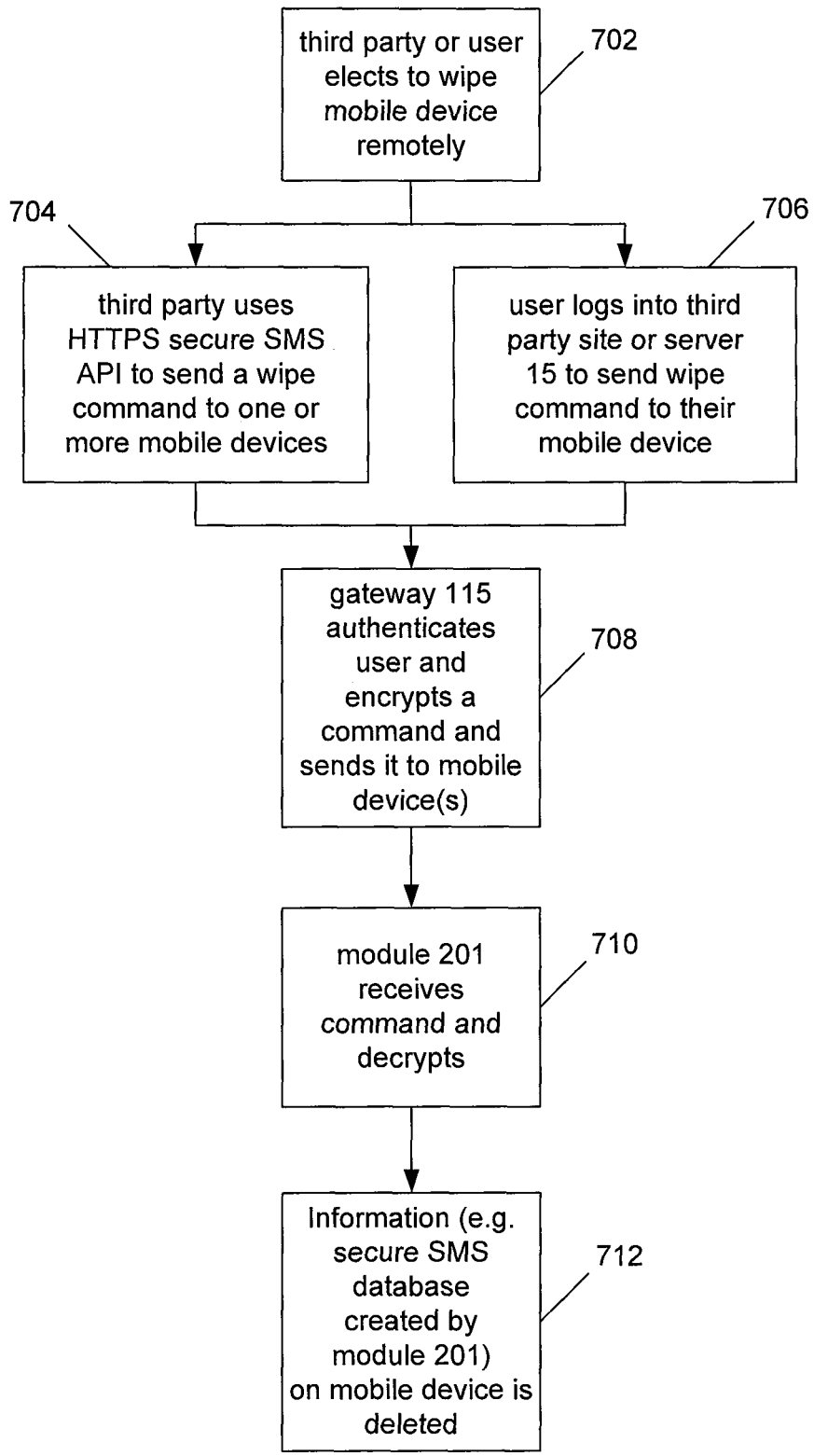
FIG. 7 is a flowchart illustrating a method for wiping a mobile device.

With reference now to FIG. 7 and in some embodiments, third parties 31, 32, and 33, and/or users 21, 22, and 23 can elect to wipe their phone (e.g., delete one or more items of information or data) remotely (step 702). For example, if a phone is lost, misplaced, or no longer being used, wiping the phone of any personal information, messages, or other information may be desired. Third parties 31, 32, or 33, and/or users 21, 22, or 23 may utilize a secure SMS API or other method to send a wipe command to one or more phones (step 704). In one example, the user can access the third party's website or server 15 in order to send a wipe command to the user's phone (step 706). Gateway 115 authenticates the user, encrypts a wipe command, and sends the encrypted wipe command to the user's phone via a SMS or MMS message, or via other suitable method (e.g., within the body of a message, in the header of a message, and the like) (step 708). Module 201 on the user's phone receives the encrypted wipe command and decrypts the encrypted wipe command (step 710). A secure SMS database (created by module 201) on the user's phone is deleted based on the decrypted wipe command (step 712). Moreover, a wipe command may also result in deletion of data other than or in addition to a secure SMS database. For example, via a wipe command, the memory contents of a phone or data for other applications may be at least partially and/or entirely wiped, deleted, reset, and the like. Additionally, module 201 may be configured to automatically wipe a secure SMS database and/or an entire phone memory responsive to repeated failed local authorization attempts or other reasons as desired. In this manner, security of data located on a phone may be enhanced.

Moreover, in various embodiments, one or more components of system 100 may be configured to log, record, or otherwise monitor communications between a phone and a server, for example, to detect attempts to "spoof" or otherwise impersonate a phone or other telecommunications device, or otherwise misrepresent the origination or other attributes of one or more messages. System 100 may also inform a user, a system administrator, a third party, and the like, of the contents of such records, for example, attempts to spoof a user's identity or to send messages purporting to come from a particular user or a particular mobile device.

Figure 8:
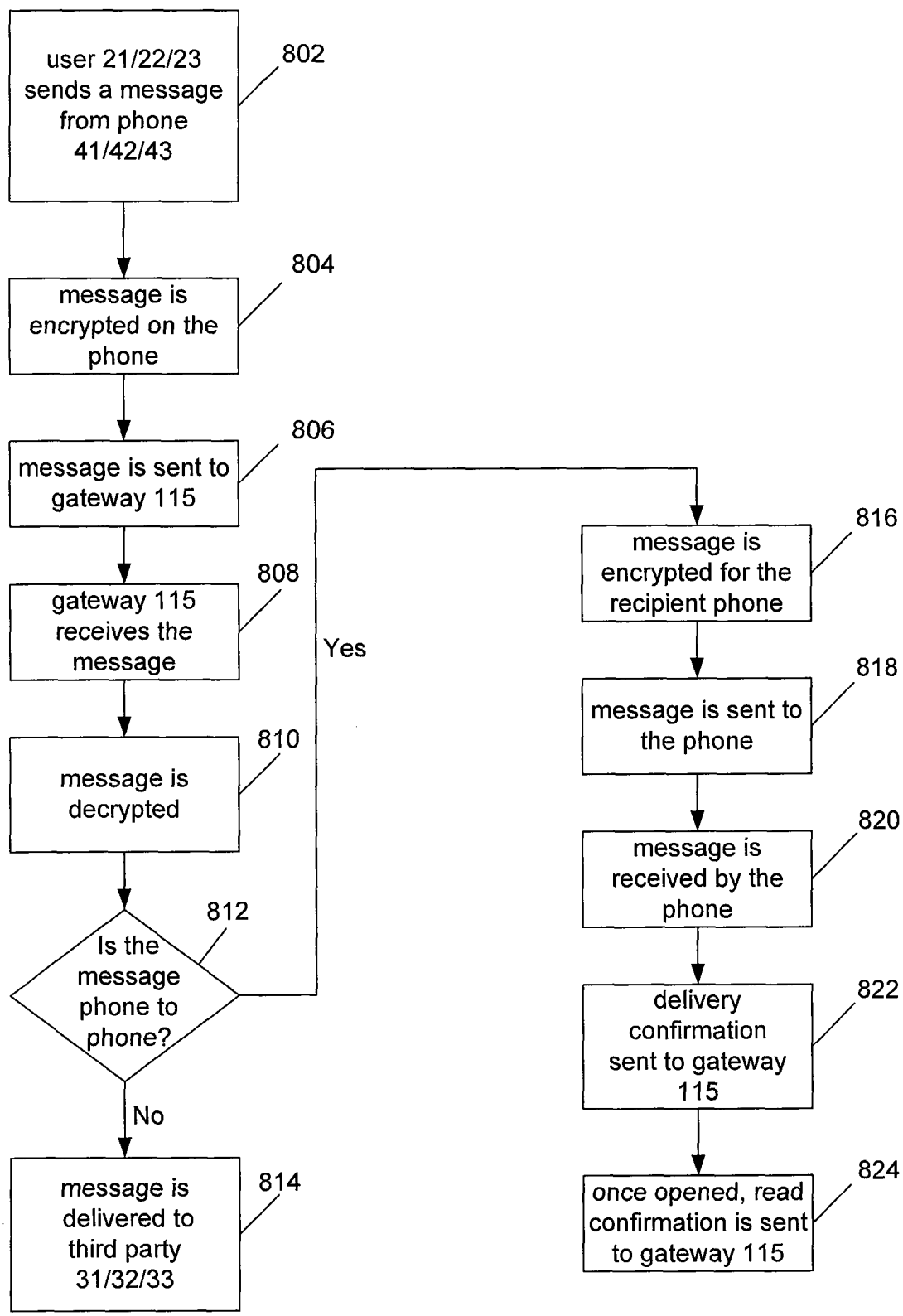
FIG. 8 is a flowchart illustrating another method for securely transmitting a message.

Turning now to FIG. 8, in some embodiments, a user sends a message from one phone to another (e.g., from phone 41, 42, or 43 to phone 41, 42, or 43) in a secure manner (step 802). Prior to sending the message, the message is encrypted on the first phone (e.g., using a first encryption key) (step 804). The encrypted message is sent to gateway 115 (or server 15) (step 806) and gateway 115 (or server 15) receives the encrypted message (step 808). The encrypted message is decrypted at gateway 115 (or server 15) (e.g., using the first encryption key) (step 810). A determination is made as to whether the message is from one phone to another of a user (step 812). If the message is not from one phone to another of a user (e.g., from a user phone to a third party), then the message is sent to the third parties server, for example using Web Services, Java remote method invocation (RMI), HTTP/S Post, and the like (step 814). A delivery confirmation may then be sent to the phone. If the message is from one phone to another of a user, then the message is encrypted (e.g., using a second encryption key) at gateway 115 (or server 15) for the recipient user (step 816). The encrypted message is sent to the receiving user's phone (step 818). The receiving user's phone receives the encrypted message. (step 820). A delivery confirmation is sent to gateway 115 (or server 15) that the message was delivered to the receiving user's phone (step 822). The encrypted message is decrypted (e.g., using the second encryption key) at the receiving user's phone and opened. A delivery confirmation may be displayed on the sender's phone by changing the icon associated with the sent message, or may be shown on a status page. Once the receiving user opens the decrypted message, an open acknowledgement or other suitable read confirmation is sent to gateway 115 (or server 15) (step 824). Gateway 115 or server 15 may forward the open acknowledgement to the sender's phone. The open acknowledgement may be displayed on the sender's phone by changing the icon associated with the sent message, may be shown on a status page, and/or the like.

In various embodiments, the original message sent is encrypted differently than the message finally received, so that only users or third parties who have the relevant encrypted key can decrypt, open, and read the message. Each user or third party can have their own unique key, so that one user or third party cannot access, open, or read another user or third party's message. Each unique key can also be changed as desired, for example periodically, for additional security. Moreover, a user may modify its own encryption key manually or at a specific time interval. This key change made by the user is communicated to gateway 115 to keep module 201 in synchronization with gateway 115. Moreover, the encryption key associated with a particular mobile device may be stored off the mobile device for additional security.

In certain embodiments, an encryption key associated with a particular module 201 may be updated. Gateway 115 is configured with two encryption keys per module 201, a current key and a new key. Module 201 is configured to use the current key. Responsive to a predetermined interval, a key change request from module 201, and/or a key change instruction from gateway 115, module 201 is configured to replace the current key with the new key. The current key is kept active on gateway 115, and a new key is generated. A key change command, including the new key, is sent to module 201. The status of module 201 is changed to from "current" to "pending". Messages to and from module 201 are held in a queue on gateway 115 until the status of module 201 returns to "current".

When the key change command is received by module 201, module 201 stores the new key in place of the current key, and transmits a key change acknowledgement to gateway 115 using the new key. When gateway 115 receives the key change acknowledgement from module 201, the new key is copied to the current key, and the new key is set to a blank value. The status of module 201 is changed to "current". Messages in the queue for module 201 may then be processed utilizing the current key (which was formerly the new key), and messages sent and/or received using the old key (formerly the current key) will fail and may be logged.

In the event module 201 does not return a key change acknowledgement after a key change command is sent to module 201, gateway 115 may re-send the key change command to module 201 one or more times. If a key change acknowledgement is not received from module 201, for example within a predetermined time period, in response to a predetermined number of transmitted key change commands, and the like, the status of module 201 may be changed to "suspended". Moreover, gateway 115 may be configured to periodically check all pending key change requests, resend key change commands, and/or disable one or more modules 201, as appropriate.

If module 201 is suspended responsive to an uncompleted key change, or disabled by an administrator associated with gateway 115, module 201 may be required to re-register with gateway 115. Upon re-registration with gateway 115, the status of module 201 may be set to "current" and queued messages for module 201 may be processed.

In various embodiments, one or more messages may be queued and/or otherwise stored on gateway 115. Messages queued on gateway 115 may be encrypted via a third encryption key, for example a storage encryption key associated with gateway 115. Queued messages may be marked for automatic or manual processing. Messages marked for automatic processing may be processed when the associated module 201 returns to "current" status. Messages marked for manual processing may be processed via a system administrator or other manual process. Messages may be kept in a queue for a predetermined period of time, for example three days. Messages which have been in a queue longer than a predetermined period of time may be archived.

As discussed above, in various embodiments, module 201 may have a status associated therewith, for example "pending", "whitelisted", "current", "suspended", "disabled", and the like. A whitelisted module 201 has been placed on a whitelist but has not registered with gateway 115. A current module 201 has registered with gateway 115 and its encryption key is up-to-date. A pending module 201 has registered with gateway 115 and a key change command has been sent to module 201, but a key change acknowledgement has not yet been received from module 201. A suspended module 201 has registered with gateway 115 and a key change command has been sent to module 201, but a key change acknowledgement has not been received from module 201 within an allowed time, within a predetermined number of requests, and the like. A disabled module 201 was once registered with gateway 115, but has been disabled by an administrator or other supervisory entity associated with gateway 115, for example in response to an unpaid bill, a report of a lost mobile device, repeated entry of an incorrect password, and the like.

When module 201 is pending, messages may be queued. When module 201 is whitelisted, messages may be queued. When module 201 is current, messages may be processed. When module 201 is suspended, messages may be queued. When module 201 is disabled, messages may be flagged as invalid and/or deleted. Moreover, module 201 may be associated with any appropriate status, and messages associated with module 201 may be queued, processed, deleted, and the like, in any suitable manner to enable secure communications between module 201 and gateway 115.

A message sender can run reports to determine which messages have been received and/or read/opened. Moreover, server 15 and/or gateway 115 may be configured to store various information related to a user, for example a "mirror" or duplicate copy of one or more items of information stored on a users phone (e.g. personal information, credit card information, identification information, financial information, health records, and the like), records of user messages sent and received, and the like. Because server 15 and/or gateway 115 may track, monitor, and/or store each message in and out of server 15 and gateway 115 (and whether the message was delivered and opened, and the like), such tracking of information can be used for compliancy reports (e.g., under the Sarbanes-Oxley Act or Federal Information Security Management Act), audit trail evidence, internal company control of information within company (e.g., through information technology) or in and out of company, fraud risk assessment and detection, or any other desired use. Since gateway 115 tracks delivery of every message, gateway 115 can be configured to resubmit a message that has not been delivered (e.g., due to error or any other reason). Gateway 115 can be configured to set the duration between resubmission of a message to a predetermined period of time or based on the status of the message (e.g., received, opened, and the like).

Figure 9:
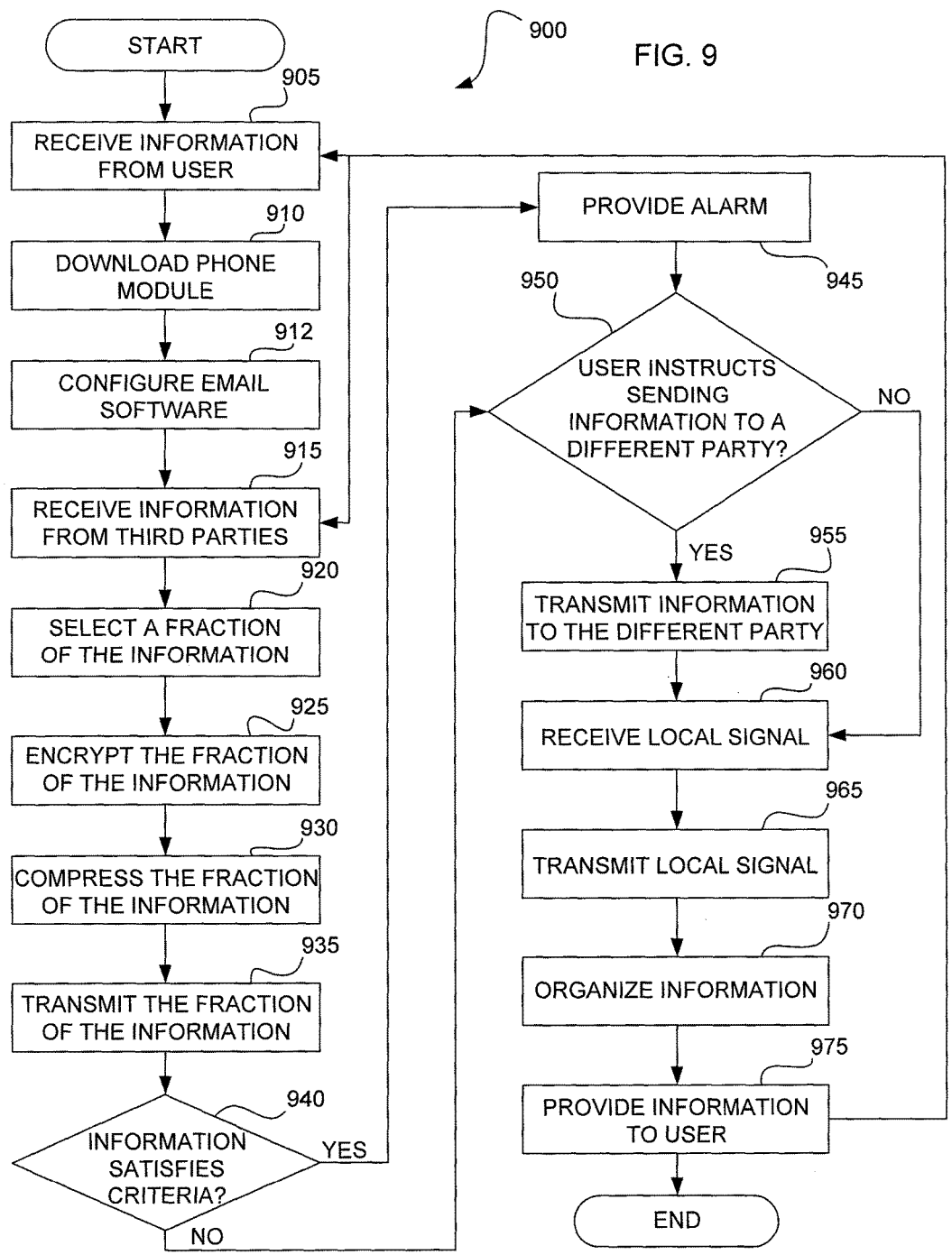
FIG. 9 is a flowchart illustrating examples of various methods, including, for instance, methods of managing information for at least a plurality of users using the Internet and mobile phones of the users.
Figure 10:
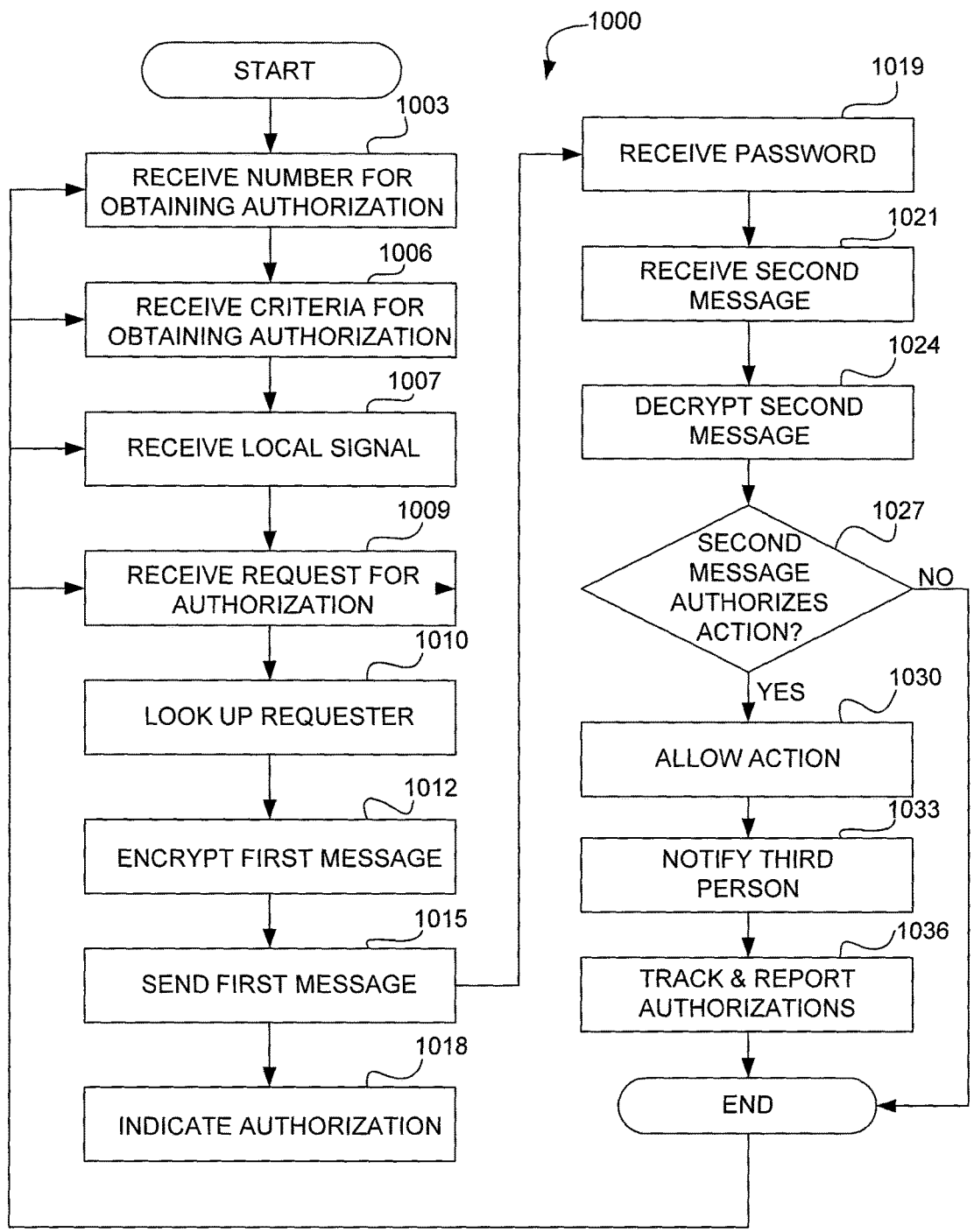
FIG. 10 is a flowchart illustrating examples of various methods, including, for instance, methods of authorizing actions, methods of authenticating transactions, and methods of authenticating access, in many embodiments, using mobile phones.

The present disclosure also provides various methods, including, for example, methods of managing information for a number of users, methods of authorizing actions, methods of authenticating transactions, methods of authenticating access, and methods of alarming as to proximity to a location. FIGS. 9 and 10 illustrate examples of such methods, and different methods in accordance various embodiments may include a selection of the operations or acts shown in FIGS. 9 and 10, described herein, or both, which may be performed or accomplished in the order presented, or in many embodiments, in a different order.

Turning now to FIG. 9, this figure is a flowchart illustrating examples of various methods, including, for instance, methods of managing information for a number of users using the Internet and mobile phones of the users. Many embodiments have some but not all of the acts shown in FIG. 9. In certain embodiments, method 900 includes receiving information from a user (act 905). This may include, in some embodiments, at least for some of the users, receiving a first set of personal information (e.g., of the user) from the user through at least one of the Internet and the mobile phone of the user.

For example, user 23 shown in FIG. 1 may access website 65 through computer 13 and the Internet 10, may open an account, and may enter information, select options, etc. Information that may be entered or selected may include, for example, names of financial institutions, account numbers, names of airlines, frequent flyer numbers, names of insurance companies, insurance policy numbers, driver's license numbers, passport information, and the like. In some cases, this personal information may be complete, while in other cases, the first set of personal information may include information to facilitate receipt or completion of information from one or more third parties (e.g., 31 to 33), such as by identifying the third parties, accounts, and the like.

Further, in some embodiments, the first set of personal information includes identification of information that is important to the user, which may include one or more criteria for alarming. Such a criteria (e.g., received in act 905) may be entered by the user or selected from one or more menus, for example. The criteria may include, for instance, an election to receive an alarm if a withdrawal, debit, or charge from a financial account exceeds a threshold that is entered or selected by the user. In some embodiments, the criteria (e.g., received in act 905) may include a selection or indication of whether the user is to receive alarms throughout the day, or only during certain hours of the day, as another example, which may vary depending upon the nature of the alarm or the particular threshold. Other examples of alarms include whether travel departure times, departure locations, or the like, have changed, whether bills are due, whether insurance coverage has expired, whether stock prices have changed, whether weather conditions or forecasts, or other environmental conditions meet a certain criteria, whether a document or credential is about to expire, whether someone has requested a particular action or access, whether children have traveled into a region of concern, etc.

In certain embodiments, method 900 further includes downloading a mobile phone module (act 910). In some embodiments, for example, for multiple users, the user instructs the server (e.g., 15) or selects at a website (e.g., 65) to download a mobile phone module, for example, second software module 72, 77, or both, shown in FIG. 1. In a particular embodiment, for instance, second software module 72 is downloaded from first software module 61 through the Internet 10 and mobile phone network 40 to mobile phone 41, upon instruction by user 21. In other embodiments, software module 72 may be downloaded to mobile phone 43, for example, through the Internet 10, and computer 13, for instance, through a USB port or a wireless network. In other embodiments, software module 72, 77, or both, may be loaded onto the phone at a store where the mobile phone was purchased, or at an establishment of the entity that controls server 15, that operates website 65, or that provides a service or system of managing information for a number of users.

In a number of embodiments, and in the particular embodiment shown in FIG. 9, method 900 includes receiving information from third parties (act 915). In some embodiments, for example, for each of multiple users, this act (915) includes receiving a second set of personal information of each user from at least one third party, for instance, through a network (e.g., the Internet 10). In many embodiments, this act (915) may be performed or accomplished, for a particular user, after receiving personal information (act 905) from that particular user, which may identify the third party, provide information with which the third party can identify the particular user, identify particular information that the particular user authorizes or requests be provided from the third party, identify bank accounts, etc.

In many embodiments, the user may directly request a third party to send the information. For example the user may visit a third party website (e.g., via the Internet 10), login to the third party website and provide information to the third party through the website to identify the user in system 100 (FIG. 1), which would also indicate the user's willingness for the third party to send the information. In various embodiments, the information received from the third parties (e.g., in act 915) may include one or more account balances, one or more descriptions of account transactions (e.g., an amount of a withdrawal, which may include, who the withdrawal is to), flight information, changes in flight information, insurance information, loyalty information, passwords, pass codes, calendar entries, navigational information, account numbers, bank card numbers, location information concerning regions of concern, etc.

In certain embodiments, method 900 further includes selecting a fraction of the information (act 920). In some embodiments, for example, a fraction of the information received from the third parties (e.g., in act 915) may be selected, for example, by the first software module 61. As used herein, "selecting a fraction" of certain information means selecting less than all of that information. For example, particular subsets or nuggets of the information may be selected. In some embodiments, the fraction of the information may be selected (e.g., in act 920) using a criteria that has been predefined (e.g., in module 61). In some embodiments, the fraction of the information may be selected (e.g., in act 920) using the criteria (e.g., received in act 905).

In various embodiments, in act 920, particular information is selected that is considered to be of particular importance or concern to the user. Examples include changes in departure time, status, or departure location for a flight that the user is booked on, withdrawals from an account that exceed a threshold, account balances, etc. In particular embodiments, for each of a more than one of the users, for instance, act 920 may include selecting a fraction of the second set of personal information described herein, while in various embodiments, act 920 may include selecting a fraction of the first set of personal information instead, or in addition.

Various embodiments include encrypting the fraction of the information (act 925). The information that is encrypted may be the fraction of the information that is selected in act 920, for example. In some embodiments, a fraction of the second set of personal information is encrypted (e.g., in act 925), for example. Information may be encrypted (e.g., in act 925), for instance, to maintain its confidentiality. Information may be encrypted (e.g., in act 925), for example, using PGP (pretty good privacy), public-key cryptography, asymmetric key encryption, or the like, as examples.

Further, various embodiments include compressing the fraction of the information (act 930). The information that is compressed may be the fraction of the information that is selected in act 920, for example. In some embodiments, a fraction of the second set of personal information is compressed (e.g., in act 930), for instance. Information may be compressed (e.g., in act 930), for example, to make it easier, quicker, or less expensive to transmit, store, or both.

In different embodiments, information may be compressed (e.g., in act 930), encrypted (e.g., in act 925), or both, in either order. In some embodiments, method 900 further includes, for each of multiple users, before the transmitting of the fraction of the second set of personal information (e.g., act 935), for example, to the user's mobile phone, at least one of encrypting (e.g., act 925) the fraction of the second set of personal information (e.g., selected in act 920), and compressing (act 930) the fraction of the second set of personal information (e.g., selected in act 920). In certain embodiments, the encrypting (e.g., act 925), and the compressing (act 930), for example, of the fraction of the second set of personal information (e.g., selected in act 920), may be repeated, for instance, along with other acts, as described herein.

In certain embodiments, method 900 also includes transmitting information (act 935). Such information may include, for example, the fraction of the second set of personal information (e.g., selected in act 920). In various embodiments, the receiving (act 905), for example, of the first set of personal information, the receiving (act 915), for example, of the second set of personal information, the selecting of the fraction (act 920), and the transmitting of the fraction (act 935), are all performed by the first software module 61 residing on server 15 connected to the Internet 10. And in some embodiments, the first software module 61 further forms the (at least one) Internet website 65. In some embodiments, methods include, for example, for each of multiple users, transmitting the fraction (e.g., selected in act 920) of the second set of personal information to the user's mobile phone, for example, through the mobile phone network (e.g., network 40 shown in FIG. 1) for storage on the user's mobile phone, for instance, using second software module 72 (e.g., residing on the phone).

In this embodiment, method 900 further includes evaluating whether information satisfies one or more criteria (act 940). Such criteria may be, as described herein, or provided or selected by the user (e.g., in act 905). If the information (e.g., the fraction of the information selected in act 920, transmitted in act 935, or both) satisfies the criteria (e.g., for alarming, for instance, as determined in act 940), then an alarm may be provided (act 945). In some embodiments, the method includes, for each of multiple users, for example, using the second software module, providing an alarm to the user (act 945) if at least a portion of the fraction of the second set of personal information satisfies the criteria. Such an alarm (e.g., of act 945) may be audible, visual, or, for example, in the form of a vibration. In some embodiments, a sound or vibration may be produced by the mobile phone of the user (e.g., in act 945), and the reason for the alarm may be displayed on the screen of the phone, for instance. In some embodiments, the default ring tone of the phone or an existing phone ring setting may be used for the alarm (e.g., in act 945), as examples.

In some embodiments, the user may be prompted to acknowledge the alarm or the description of the reason for the alarm, or may be asked to make a response or take an affirmative action to provide consent, for example, for the reason for the alarm or an event described in the description. For example, if the reason for the alarm is that a withdrawal has been made from the user's bank account, the mobile phone may ring or vibrate. The user may then open the phone or press a button on the phone to acknowledge the alarm. The phone may then display the amount of the withdrawal, for example, along with a description of the account, and of the transaction. In some embodiments, the user may be asked to make a selection to provide consent to the withdrawal, for instance. In another scenario, the phone may ring to provide an alarm that the user's flight has been delayed, as another example. The user may open the phone to acknowledge the alarm, and a brief description of the delay, and new estimated departure time, may be provided on the screen of the mobile phone, for instance. Other examples are described herein.

In some such methods, for example, for each of a number of the users, the first set of personal information (e.g., received in act 905) includes an identification of at least one financial account, the second set of personal information (e.g., received in act 915) includes an identification of deposits into the account, withdrawals from the account, and a balance of the account, and, the providing of an alarm (act 945) includes at least one of alarming if a withdrawal exceeds a first threshold identified within the criteria (e.g., received in act 905), and alarming if the balance of the account drops below a second threshold identified within the criteria. As used herein, such a "withdrawal" may be a debit from, or a charge to, the account, as examples.

As another example, in some methods, for each of a plurality of the users, the first set of personal information (e.g., received in act 905) includes at least one of travel information (e.g., frequent flyer information such as a frequent flyer identification number) and an identification of at least one of a common carrier (e.g., an airline) and a travel agent. Further, in some embodiments, the second set of personal information (e.g., received in act 915) includes travel itinerary, which may include identification of a departure time and a departure location, for example. And the providing of an alarm (act 945) may include alarming if there is a change in at least one of the departure time and the departure location, in some embodiments. In many embodiments, if the information (e.g., the fraction of the information selected in act 920, transmitted in act 935, or both) does not satisfy the criteria (e.g., for alarming, for instance, as determined in act 940), then an alarm may not be provided, and act 945 may be skipped, at least for that particular iteration of method 900.

In various embodiments, method 900 further includes transmitting information to a different party (act 955). In many such embodiments, the user may (e.g., first) select, or otherwise provide instructions or commands to send certain information to the third party (evaluated in act 950). In particular, in some embodiments, (e.g., in the order indicated or in another order), at least for several of the users, method 900 may include, upon instruction by the user (e.g., evaluated in act 950), transmitting (e.g., in act 955) at least a portion of the second set of personal information (e.g., received in act 915, selected in act 920, transmitted in act 935, or a combination thereof) to a different party mobile phone. In some embodiments, this may be accomplished through the mobile phone network (e.g., 40) for storage on the different party mobile phone, for instance, for access by the different party.

Referring to FIG. 1 for an example, user 21 may provide an instruction or command (e.g., in act 950), for instance, through user 21's mobile phone 41, to send at least a portion of the information received (e.g., in act 935), to different user 22, specifically, via mobile phone 42. In different embodiments, mobile phone 41 may send the portion of the information to mobile phone 42, for example, through mobile phone network 40, or mobile phone 41 may instruct server 15 or first software module 61 to send the portion of the information to mobile phone 42, for instance, through the Internet 10, mobile phone network 40, or both, as examples. In some embodiments, delivery may be certified, or delivery may be tracked and the sender may be notified when delivery has been accomplished, or alternatively, when delivery has been unsuccessful.

In some embodiments, the first software module 61 receives a command (e.g., in act 950) from the user (e.g., 21), for instance, through mobile phone network 40, and upon the receipt of the command (e.g., in act 950), transmits (e.g., in act 955) at least a portion of the nuggets (e.g., 78) or fraction of the personal information to the different party (e.g., 22) through the Internet 10. In some embodiments, the system (e.g., system 100) may send the particular information, fraction thereof, or nuggets in different ways (e.g., in act 955), depending on whether the different party is a user of system 100 [e.g., has visited website 65 and elected to have their personal information managed by system 100, or has downloaded (e.g., act 910) or otherwise received, or has installed, the second software module 72 on their mobile phone].

In some embodiments, the user (e.g., 21) may select (e.g., in act 950) at least a portion of the personal information that is stored on the mobile phone (e.g., 41), select or enter (e.g., in act 950) an identifier of at least one of a different party (e.g., 22) and a different party mobile phone (e.g., 42), and elect (e.g., in act 950) to send (e.g., in act 955) the at least a portion of the personal information to the different party mobile phone (e.g., 42). In many embodiments, the first software module 61 evaluates whether the different party mobile phone (e.g., 42) contains a copy of the second software module 72, and if the different party mobile phone (e.g., 42) contains a copy of the second software module 72, then the first software module 61 sends (e.g., in act 955) the portion of the personal information to the copy of the second software module 72 on the different party mobile phone (e.g., 42), for example, through the mobile phone network 40 (e.g., by SMS). In some embodiments, delivery may be certified, or a notification message may be sent (e.g., by SMS to user 21) when delivery has been accomplished, or alternatively, after a certain amount of time or number of attempts when delivery has been unsuccessful.

In particular embodiments, for example, the portion of the second set of personal information (e.g., transmitted in act 955) includes a travel itinerary, for instance. Thus, in some embodiments, a user is able to conveniently send their travel itinerary to another person. In FIG. 9, in many embodiments, if the user does not instruct particular information to be sent to a different party, then the act of transmitting information to a different party (act 955) is omitted, at least for that iteration of method 900.

Still referring to FIG. 9, in many embodiments, method 900 further includes receiving a local signal (act 960), transmitting a local signal (act 965) or both. As used herein, a local signal is a signal that is transmitted and received without going through the main transmitter that the mobile phone uses for placing telephone calls and without going through the main receiver that the mobile phone uses for receiving telephone calls. In addition, a local signal does not go through the mobile phone network (e.g., 40). For example, a local signal from mobile phone 42 may be transmitted by local transmitter or communications device 82 and received (i.e., directly) by reader or communications device 88, or vice versa. Examples of local signals include near field communication (NFC) signals and Bluetooth communication signals, for example, that use transmitters, receivers, or both (e.g., device 82), on the mobile phone that are separate from the transmitter and receiver that are used for telephone conversations.

In particular embodiments, method 900 further includes, for each of multiple users, using signal receiving hardware (e.g., device 82 shown in FIG. 1) located on the user's mobile phone (e.g., 42), and using the second software module (e.g., 72), under the control of the user (e.g., user 22), receiving (e.g., in act 960) a local signal from a transmitter (e.g., device 88) within proximity to the mobile phone (e.g., 42). Further, some embodiments include, for example, for each of a number of the users, using local signal transmitting hardware (e.g., device 82) located on the user's mobile phone (e.g., 42), and using the second software module (e.g., 72), under the control of the user (e.g., 22), transmitting a local signal (e.g., in act 965) that includes at least a portion of at least one of the first set of personal information (e.g., received in act 905) and the second set of personal information (e.g., received in act 915) to a reader (e.g., device 88) within proximity to the mobile phone (e.g., 42). As used herein, "proximity", in this context, means within ten (10) feet, and "close proximity" means within one (1) foot.

In particular embodiments, for example, for each of several of the users, the first set of personal information (e.g., received in act 905) includes at least one of loyalty information and identification of at least one of a merchant and a service provider, and at least one of the first set of personal information (e.g., received in act 905) and the second set of personal information (e.g., received in act 915) includes the loyalty information. Further in some such embodiments, the local signal (e.g., transmitted in act 965) includes at least a portion of the loyalty information, and the transmitting of the local signal (e.g., act 965) includes transmitting the at least a portion of the loyalty information to at least one of the merchant and the service provider. Such a merchant and service provider are examples of the third parties 31 to 33 shown in FIG. 1, for example. Thus, a user (e.g., 22) may be able to use their mobile phone (e.g., 42) to store and provide loyalty information, for example, a COSTCO membership, membership to a health club, a SAFEWAY card, etc. In some embodiments, insurance information may be handled in such a manner, or similarly.

Local signals (e.g., between devices 82 and 88) may also (or instead) be used to make purchases or payments. In certain embodiments, as an example, for each of multiple users, the first set of personal information (e.g., received in act 905) includes at least one of bank card information and an identification of at least one of a bank and a bank card provider. Such a bank or a bank card provider may be further examples of the third parties 31 to 33 shown in FIG. 1, for instance. In some embodiments, at least one of the first set of personal information (e.g., received in act 905) and the second set of personal information (e.g., received in act 915) includes the bank card information, the local signal (e.g., transmitted in act 965) includes the bank card information, and the transmitting of the local signal (e.g., in act 965) includes transmitting the bank card information to at least one of the merchant and the service provider to make or authorize a payment, as examples. As used herein, the phrase "bank card" includes, for example, credit cards and debit cards, whether or not issued by a bank.

In some embodiments, for instance, using near field communications, a user (e.g., 22) can swipe his or her phone (e.g., 42, or specifically, device 82) past an NFC reader (e.g., device 88) to communicate the user's bank card number or information for payment for goods or services, thus eliminating the need to carry or present the bank card.

In certain embodiments, method 900 further includes organizing certain information (act 970), for example, information that is handled by system 100. For example, in many embodiments, the second software module 72 organizes (act 970), at the mobile phone (e.g., 41), the fraction (e.g., nuggets 78, 79, or both) of the second set of personal information (e.g., selected in act 920 and transmitted in act 935), which may include, in various embodiments, where applicable, decrypting the information, decompressing the information, making the fraction of the second set of personal information accessible to the user (act 975), for instance, on the user's mobile phone, or a combination thereof. In some embodiments, for each of multiple users, the second software module (e.g., 72) organizes (act 970) the fraction of the second set of personal information based on topic and makes the fraction of the second set of personal information (e.g., nuggets 78, 79, or both) accessible (act 975) to the user (e.g., 21), for instance, based on the topic of the information (e.g., in folder or folders 76).

In various embodiments, some or all of the acts of method 900 may be repeated. For example, in some embodiments (e.g., for each of some or all of the users) method 900 may involve repeating, at least a number of times, the receiving (act 915), for example, of the second set of personal information, the selecting of the fraction (act 920), and the transmitting of the fraction act 935). In many embodiments, where applicable, the encrypting (act 925), compressing (act 930), providing of an alarm (act 945), transmitting of information to a different party (act 955), receiving or transmitting (or both) of local signals (acts 960, 965, or both), the organizing of the information (act 970), the providing of the information to the user (act 975) or a combination thereof, may be repeated, as appropriate. Further, in some embodiments, the receiving of information from the user (act 905) may be repeated, but may be repeated less often than certain other acts, such as the receiving of information from third parties (act 915), for instance.

In many embodiments (e.g., for each of multiple users), the repeating includes (e.g., as part of act 970) replacing at least a portion of the fraction of the second set of personal information that is stored on the user's mobile phone, while maintaining the organization of the information, for instance, based on the topic of the information. Further, in various embodiments, for each of more than one of the users, the repeating includes (e.g., as part of act 970) synchronizing at least a portion of the fraction of the second set of personal information that is stored on the user's mobile phone with corresponding personal information that was already stored on the mobile phone, while maintaining the organization of the information based on the topic of the information. As used herein, "synchronizing" of information includes both replacing and appending the information, while sorting or maintaining a sorted organizational structure based on topic. Topics may include, for example, travel information, account information (which may be sorted for different accounts), bank card information, loyalty information, insurance information, etc.

In various embodiments, a user (e.g., 22) may be able to use a mobile phone (e.g., 42) to gain access to a physical space, such as an elevator, floor or area of a building, parking garage, etc. Access may be obtained, in some embodiments, for example, by passing the phone (e.g., 42) by or over a reader (e.g., communications device 88), transmitting a local signal (e.g., in act 965), for example, using near field communication (NFC). In some embodiments, for instance, user 22 selects the desired code or number on phone 42, and then rubs phone 42 against the reader or device 88 or passes phone 42 over or by device 88. In certain embodiments, user 22 may provide or select the code by name, for example, "elevator", which may be selected from a menu on mobile phone 42 or input as a voice command, for instance.

In some embodiments, phone 42 may then transmit (e.g., in act 965) a local signal containing a code that the reader (e.g., device 88) will understand, for example, to identify user 22. In such embodiments, phone 42 may have local transmitter or communications device 82, which may be an NFC antenna, for example. In some embodiments, an NFC antenna (e.g., local transmitter or device 82) may be retrofitted onto a preexisting phone 42 by replacing a back or battery cover of the phone with a cover having an antenna, circuitry, or both. In other embodiments, an NFC antenna (e.g., local transmitter or device 82) may be an original equipment component of phone 42, for example.

Some embodiments may use (e.g., for local transmitter or communications device 82) Bluetooth communication for particular functions in addition to or instead of NFC. For example, Bluetooth may be used for access to parking areas, and a user carrying a phone may be given access in some embodiments without a need to open the car window. Other embodiments may use WiFi or other forms of communication such as infrared, bar codes, or the like. And in some embodiments, transponders may be used. In addition to providing access, such use of mobile phones and local signals may be used to track who has accessed particular areas, track movement of employees or other people, verify that employees are working quickly enough, verify that employees or others are traveling at safe speeds, track work or break times, etc., which may be published in one or more reports.

In some embodiments, a user (e.g., 22) may make selections, identify desired actions, provide assent, or perform other affirmative acts, by passing the phone (e.g., 42) by a reader (e.g., device 88) or a combination of several readers. For example, a user in a store may obtain information on a particular product by passing the user's phone by a particular reader (e.g., device 88). Or, in some embodiments, a user may identify potential gifts for a bridal registry or identify a large item to be picked up at the register, as other examples. Further, in particular embodiments, a user may be able to subscribe, in such a manner, to particular advertisements, for example, for a particular type of product or from a particular source. Further, phone 42 may be able to be used in a similar manner, in some embodiments, by passing phone 42 past reader or device 88, to show membership (e.g., to COSTCO or to a gym or country club) to obtain frequent flyer miles, to get discounts that are provided to holders of loyalty cards, or the like. In other embodiments, a user may make affirmative acts in other ways, for example, responding to questions displayed on a phone by pressing one or more buttons, for example, on the phone.

In some embodiments, a phone may provide identification of the user. For example, phone 42 may contain and provide user 22's driver's license number, social security number, credit card number, account number, address, phone number, employee ID number, birth certificate, proof of citizenship, proof of legal residency, security clearance, passport number, visa number, criminal record, credentials, badge number, or the like, for example, through transmitter or local communications device 82. For example, in particular embodiments, in an airport, the phone may indicate a higher level of security which may permit the user to bypass of some or all of security. In addition, in certain embodiments, if a phone is lost or stolen, the authorized user may be able to wipe the phone of personal information, locate the phone, disable the phone, or a combination thereof, for example, with another phone or through website 65, for example. Such an action may be accomplished by sending instructions to the phone (e.g., through mobile phone network 40), and in the case of locating the phone, instructing the phone to provide its GPS coordinates, other location information, or both. In some embodiments, this may require entering at least one code or password, for instance. Further, it may be possible, in some embodiments, to reload the information back onto the phone, or onto a new or other phone, from an archive, for instance, at website 65.

In some embodiments, the mobile phone (e.g., software module 72 on phone 41) may prevent the user (e.g., 21, or another user who might not be authorized) from accessing module 201 or module 72 if the software (e.g., 72) or the phone (e.g., 41) has not been used for a specified period of time (for example, one minute, two minutes, and the like), if the user has failed to provide the correct password for the software (e.g., 72), if a remote lock command has been received by phone 41, and the like. Access to module 201 and/or module 72 may afterward be restored, for example via entry of the correct password. In other embodiments, the software (e.g., software module 72 on phone 41) may provide the GPS coordinates of the phone (e.g., to module 61 on server 15) at regular intervals, upon accessing or exiting the software (e.g., 72), upon accessing the phone, upon sending a secure message, upon turning the phone off, upon turning the phone on, upon running out of battery charge, or a combination thereof, as examples. In various embodiments, GPS coordinates or other location data may be transmitted as a secure SMS message from module 72 on phone 41 to module 61 on server 15. Moreover, a delivery acknowledgement, an open acknowledgement, and/or the like, may also include GPS coordinates, timestamp information, cell tower triangulation information, and/or the like.

In a number of embodiments, a mobile phone may contain insurance information, as an example of a topic of personal information, which may include, for example, proof of insurance (e.g., automobile or health insurance), coverage, payment dates, preferred providers, contract terms, and the like. In some embodiments, the user (e.g., 21 to 23) may be reminded (e.g., provided an alarm in act 945) to make payments, obtain expanded coverage, make or keep an appointment, or the like, via the phone (e.g., 41 to 43). For instance, in some embodiments, a user may be prompted (e.g., provided an alarm in act 945) through the phone to authorize payment, for example, for insurance, utilities, mortgage or lottery ticket payments, rent, credit card payments, various bills, etc. In another example, a user may be reminded (e.g., provided an alarm in act 945) to obtain automobile insurance for another country when traveling into or near that country, and in some embodiments, it may be possible to purchase such insurance over the phone, obtain proof of insurance on the phone, or both, as examples.

As described herein, specific embodiments include, among other things, ways to communicate information to other electronic devices, and, in certain embodiments, ways to affirmatively make selections. In some embodiments, the electronic device or reader (e.g., device 88) may query the phone (e.g., 42) for the particular information that is needed, a handshake routine may be followed, or both. In some embodiments, an affirmative act of assent may be required, at least for certain functions, for example, to authorize a transaction or payment, or to authorize access. Such an act of assent may include, in some embodiments, for example, user 22 entering a personal identification number (PIN) or a password into a graphical user interface or keyboard on the mobile phone, providing a signature on a touch pad, providing a biometric, passing the phone (e.g., 42) by an NFC reader (e.g., device 88), or the like.

Further, in some of these embodiments, for yet another example, the first software module (e.g., module 61) includes programming instructions to receive (e.g., in act 905) instructions from the user identifying at least one threshold for alarm (e.g., used in act 940) for at least a portion of the particular information (e.g., nugget 78). In some of these embodiments, at least one of the first software module (e.g., 61) and the second software module (e.g., 72) includes programming instructions to compare (e.g., in act 940) at least a portion of the particular information to the threshold. And in some such embodiments, at least one of the first software module (e.g., 61) and the second software module (e.g., 72) includes programming instructions to provide an alarm (e.g., in act 945) to the user if the particular information passes the threshold (e.g., in act 940).

As mentioned, in some embodiments, certain methods of managing information for users using the Internet and mobile phones involve extracting information from e-mails and sending the information to the mobile phones. Particular such methods include (e.g., as or within act 915), an act of receiving e-mails, for instance, from third parties. For example, in some embodiments, for each of multiple users (e.g., users 21 to 23), method 900 includes an act of receiving at an information sorting software module (e.g., 67), a plurality of (e.g., select) e-mails containing information about the business of the user, wherein the user has caused the select e-mails to be sent to the information sorting software module. A user may, for example, cause (e.g., select) e-mails to be sent to an information sorting software module (e.g., 67) through the entering or selection of information (e.g., in act 905) or by downloading or enabling software module or plug-in 17, as examples.

Such examples of method 900 may also include, for each of numerous users, using the information sorting software module (e.g., 67), an act of searching at least two of the select e-mails for at least one of keywords and identifying numbers, and also for each of multiple users, using the information sorting software module (e.g., 67), an act of extracting the particular information from the select e-mails (e.g., act 920). As used herein, this act of extracting particular information does not mean or include forwarding or sending (e.g., in act 935) the whole e-mail. Rather, a portion (i.e., less than all) of the information within the e-mail is extracted (e.g., in act 920) to be sent (e.g., in act 935).

In a number of embodiments, such examples of method 900 also include, for each of numerous users (e.g., users 21 to 23 shown in FIG. 1), sending (e.g., in act 935) the particular information to the user's mobile phone (e.g., phone 41 of user 21) through a mobile phone network (e.g., 40) for storage on the user's mobile phone (e.g., 41) and access by the user (e.g., 21). In some embodiments, the particular information that is sent may be, contain, or be similar to, the nuggets (e.g., 78 and 79, and may be stored, for example, within folder 76, by module 77, for example). In some embodiments, software module 67 on server 15 may be a sorting software module, and may perform or initiate the acts of receiving the e-mails (e.g., act 915), searching for keywords or identifying numbers (or both) and extracting the particular information (e.g., in act 920), and in some embodiments, transmitting or sending (e.g., act 935) the particular information. In some embodiments, the particular information may be the same or similar to the fraction of the information described herein, for example, with reference to acts 920 to 935.

In many embodiments, method 900 also includes acts of repeating, for example, multiple times, the searching (e.g., part of act 920), the extracting (e.g., part of act 920), and the sending (e.g., act 935). Various embodiments of such methods may be performed in various orders and may include additional acts. For example, in some embodiments, method 900 may include, (e.g., for each of more than one of the users 21 to 23), after the extracting of the particular information (e.g., in act 920), and before the sending of the particular information (e.g., in act 935), for example, to the user's mobile phone (e.g., 41 to 43), acts of encrypting the particular information (act 925), compressing the particular information (act 930), or both. In some embodiments, the information sorting software module (e.g., 67), extracts the particular information (e.g., in act 920) only from a fraction of the select e-mails. In such embodiments, the e-mails may be searched for keywords or identifying numbers (or both) (e.g., in act 920, or in a previous operation), and the particular information may be extracted or selected (e.g., in act 920) only from the e-mails that have those keywords or identifying numbers.

Further, in some embodiments, for multiple users, before the receiving of the (e.g., select) e-mails (e.g., in act 915), method 900 also includes an act of configuring the user's e-mail handling software module (act 912). For example, the user's e-mail handling module may be configured to automatically forward incoming e-mails from at least one particular third party (e.g., at least one of third parties 31 to 33) to information sorting module 67. In such embodiments, the select e-mails mentioned herein may include (or be) the incoming e-mails from the (at least one) particular third party (e.g., one or more of third parties 31 to 33). As an example, plug-in module 17 may be added to MICROSOFT OUTLOOK on computer 13 of user 23, and may provide functionality to automatically forward e-mails that are sent to an e-mail account of user 23 from particular senders to module 67 (e.g., via the Internet 10).

In other embodiments, a user's e-mail handling module may be configured, or a plug-in or software module may be added (e.g., module or plug-in 14), that will search e-mails for keywords or identifying numbers (or both), select the particular information, perform tasks associated with act 920 or even acts 920 to 935, or a combination thereof, as examples, which may result in a select set of e-mails, the particular information, a fraction of the information, nuggets of information, or the like. In such embodiments, the user's computer (e.g., computer 13 of user 23), or software running on the computer (e.g., module or plug-in 14 on computer 13), may perform tasks described herein for software module 67. In some such embodiments, software module 67 may not be needed. In other embodiments, on the other hand, some or all of such tasks may be performed at server 15, software module 61, or software module 67, as examples. In different embodiments, tasks described herein as being performed by modules 14, 17, and 67, may in other embodiments be described by others of such modules.

Moreover, some examples of method 900 further include, for various of the users (e.g., 21 to 23), for example, before the receiving of the select e-mails (e.g., in act 915), instructing (e.g., in act 905) at least one particular third party (e.g., of 31 to 33) to send e-mails containing information about the business of the user to the information sorting module (e.g., 67). These select e-mails may include (or be), for example, e-mails containing information about the business of the user. In various embodiments, the users (e.g., 21 to 23) may provide these instructions through the Internet 10 (e.g., user 23 may provide these instructions via computer 13), through their mobile phones (e.g., 41 to 43), or both. In addition, in various embodiments, users (e.g., 21 to 23) may provide these instructions through module 61 or website 65, or directly to the third parties (e.g., 31 to 33), for example, through the Internet 10, mobile phone network 40, or both.

In some embodiments, as another example, the searching of the e-mails (e.g., in act 920 or otherwise) includes (e.g., for each of numerous users), searching for e-mails from at least one particular sender (e.g., from one particular e-mail address), and the extracting of the particular information (e.g., in act 920) includes extracting the particular information only from the e-mails from the at least one particular sender.

In particular embodiments, (e.g., for each of multiple users), method 900 may include acts of receiving instructions (e.g., in act 905) from the user (e.g., one of users 21 to 23), and identifying at least one criteria or threshold for alarm for at least a portion of the particular information. In some such embodiments, after the extracting of the particular information (e.g., act 920), method 900 may include comparing (e.g., in act 940) at least a portion of the particular information to the criteria or threshold for alarm, and providing an alarm (e.g., in act 945) to the user (e.g., one of users 21 to 23) if the particular information satisfies the criteria or passes the threshold, as examples.

For instance, in some such methods, (e.g., for each of various users), the particular information includes financial account information including an amount of a withdrawal or a debit from an account, and the threshold is an amount of the withdrawal or debit beyond which the alarm is provided (e.g., in act 945). In another example, (e.g., for each of a number of the users), the particular information includes travel information including a departure time or a departure location (or both), and an alarm is provided (e.g., in act 945) if (e.g., as determined in decision activity 940) there is a change in the departure time or the departure location (or both). In specific embodiments, for example, the travel information includes flight information, for instance, including the departure time and a departure gate, and the alarm is provided (e.g., in act 945) if there is a change in either the departure time or the departure gate.

Still other embodiments include, (e.g., for multiple users 21 to 23), upon instruction by the user (e.g., user 21), transmitting (e.g., act 955) at least a portion of the particular information to a third party (e.g., 22) mobile phone (e.g., 42) for instance, through mobile phone network 40, for storage on the third party mobile phone (e.g., 42), for access by the third party (e.g., user 22). In some such embodiments, the at least a portion of the particular information (e.g., transmitted in act 955) does not include a complete e-mail (e.g., an e-mail received by user 21 or by module 67, and forwarded to user 22). As an example, in some embodiments, the (at least a portion of the) particular information includes a travel itinerary (e.g., of user 21). Thus, user 21 can easily send his travel itinerary (or other of the particular information) to another person, to facilitate such communication.

Turning now to FIG. 10, this flowchart illustrates, among other things, various methods of authorizing an action and various methods of authenticating access, as examples. Most of the various acts of method 1000 may be performed, for example, in an automated process, for instance, by server 15, module 61, or both, shown in FIG. 1. In various embodiments, method 1000 may be performed by a company or business, for instance, as a service for other companies or businesses, or the like.

In various embodiments, in various methods of authorizing an action, method 1000 includes receiving (act 1003), for example, from a person having authority to authorize the action, an identification of a first phone number for obtaining authorization for the action. Such a person having authority to authorize the action may be, for example, one of users 21 to 23 shown in FIG. 1. In some embodiments, the person having authority to authorize the action may provide the phone number (e.g., received in act 1003) through their computer or mobile phone, for example. For instance, if user 23 is the person having authority to authorize the action, user 23 may provide the phone number (e.g., received in act 1003) of phone 43 via phone 43 or via computer 13 and website 65.

In some embodiments, the person having authority to authorize the action may enter or key in the phone number directly, while in other embodiments, the person (e.g., user 23) may enter or select a name, for example, or other identifier or indicia, which may be used (e.g., in act 1003, for instance, by server 15 or module 61) to look up the appropriate phone number (e.g., of phone 43). In some embodiments, the person having authority to authorize the action may select the phone number, for example, from a menu, or the number may be read automatically from the person's phone or from a caller ID feature or service when the phone is used. As used herein, all such are examples of acts (e.g., 1003) of receiving, from a person having authority to authorize the action, an identification of a first phone number for obtaining authorization for the action.

In various embodiments, method 1000 also includes an act (1009) of receiving, for instance, from a person seeking the action, a request for authorization of the action. In different embodiments, acts 1003 and 1009 may occur in either order, including, for example, the order shown in FIG. 10. In different embodiments or different situations, the person seeking the action (e.g., who requests authorization in act 1009) and the person having authority to authorize the action (e.g., who provides the number in act 1003) may be the same person, or may be different people (e.g., of users 21 to 23).

After the receiving of the identification of the first phone number (e.g., in act 1003), and after the receiving of the request for authorization (e.g., act 1009), in various embodiments, method 1000 also includes an act (1015) of sending a first message, for example, through a mobile phone network (e.g., 40 shown in FIG. 1) to a first mobile phone, for instance, having the first phone number. In such embodiments, the first message (e.g., of act 101015) may include a description of the action for which authorization is requested, for example. In some embodiments, the first phone message is sent (e.g., in act 1015) automatically, meaning herein that other than making the request for authorization (e.g., received in act 1009), and providing the number and any criteria (e.g., received in one or both of acts 1003 and 1009), no human interaction is involved (i.e., between acts 1009 and 1015).

In addition, after the sending of the first message (e.g., after act 1015), method 1000 includes an act (1021) of receiving, for example, from the first mobile phone, (i.e., having the first phone number) a second message, which may authorize the action. In various embodiments, the second message (e.g., received in act 1021) may be the result of the person who controls the phone taking an affirmative action to indicate authorization of the action (act 1018). Act 1018 may be performed, by one of users 21 to 23 shown in FIG. 1, for example.

In some embodiments, the first message (e.g., of act 1015) includes at least one menu and at least one prompt to authorize the action by making a selection from the menu. The person who controls the phone may take an affirmative action to indicate authorization of the action (act 1018) by making a selection from the menu, for example. In some embodiments, authorization is indicated (act 1018) and the second message authorizing the action is sent (e.g., which is received in act 1021) by pressing, for example, a single button on the mobile phone, after the first message (e.g., sent in act 1015) is received by the mobile phone. As used herein, "pressing a single button" does not include such actions such as opening a flip phone, scrolling to view a message, or pressing "send". In other words, when determining how many buttons have been pressed, opening a flip phone, scrolling to view a message, or pressing "send", are not counted.

In some embodiments, the first message (e.g., sent in act 1015), the second message (e.g., received in act 1021), or both, are SMS messages. One or both (e.g., of the first and second messages sent in act 1015 and received in act 1021, respectively) may be transmitted (e.g., sent and received) through the mobile phone network (e.g., 40 shown in FIG. 1). Further, in some embodiments, the first message, (e.g., sent in act 1015), the second message (e.g., received in act 1021), or both, are voice message, as further examples, which may be computer generated, interpreted using voice recognition software, or both, as examples. In some embodiments, the first message (e.g., sent in act 1015), may be a voice message, while the second message (e.g., received in act 1021), is an SMS message. Other embodiments may have other combinations.

In various embodiments, method 1000 also includes an act (1027) of evaluating whether the second message (e.g., received in act 1021) authorizes the action. If so, then (in act 1030) the action may be allowed, facilitated, or performed, as examples. Some embodiments include an act of allowing the action (act 1030) only if the second message is received (e.g., in act 1021) and the second message authorizes the action (e.g., as determined in act 1027). Some embodiments further include repeating the receiving of the request for authorization of the action (e.g., act 1009), the sending of the first message (e.g., act 1015), and the receiving of the second message (e.g., act 1021). These acts may be repeated, for example, for requests for different actions, requests for the same action for different people, requests for the same action or same person at different times, etc.

Further still, some of these embodiments further include an act (1012) of encrypting the first message, for example, before the sending of the first message (e.g., act 1015), for instance, to the first mobile phone. Some embodiments also (or instead) include an act (1024) of decrypting the second message, for example, after the receiving of the second message (e.g., act 1021), for instance, from the first mobile phone. In such embodiments, the first mobile phone may decrypt the first message and encrypt the second message, as examples. In some embodiments, compression and decompression may also (or instead) be utilized.

In some embodiments, prior to the receiving of the request for authorization of the action (e.g., act 1009), the first phone number is received (e.g., in act 1003) through an Internet website (e.g., website 65 via the Internet 10 shown in FIG. 1), the mobile phone network (e.g., 40), or both. Some embodiments further include an act (1006) of receiving, for instance, through an Internet website (e.g., website 65 via the Internet 10) or a mobile phone network (e.g., 40), or both, for example, from each of numerous persons having authority to authorize the action, an indication of a criteria for obtaining authorization for the action, for instance, for that particular person. Such a criteria may be typed in or entered verbally by the person, or may be selected by the person from one or more menus, for example. In some embodiments, act 1006 may be similar to act 905 shown in FIG. 9 and described herein. Further, in some embodiments, act 1003 may be included within act 1006 or vice versa, or acts 1003 and 1006 may be performed in another order.

As an example, in some embodiments of method 1000, act 1006 includes receiving, for instance, from the person having authority to authorize the action, through at least one of the Internet website (e.g., website 65 via the Internet 10 shown in FIG. 1) and the mobile phone network (e.g., 40), an identification of time limits for sending the first message (e.g., in act 1015). In many such embodiments, the sending of the first message (e.g., act 1015) may be performed only in accordance with the time limits. For example, in some embodiments, the person may not want to be prompted for certain kinds of authorization during certain nighttime hours, and may enter one or more criteria or make selections accordingly.

In a number of embodiments, the person who controls the phone (e.g., who is in a position to indicate authorization in act 1018) is, in fact, or is intended to be, the person having authority to authorize the action (e.g., from whom the number was received in act 1003, criteria was received in act 1006, or both). In other embodiments, the person who controls the phone is, in fact, or is intended to be, a person who is authorized by the person having authority to authorize the action (e.g., from whom the number was received in act 1003, criteria was received in act 1006, or both). Further, some embodiments provide certain assurances that the person who controls the phone is the correct person.

For example, in some embodiments, the second message (e.g., received in act 1021) includes a password or an authorization code which has been memorized by the person having authority to authorize the action and keyed into the first mobile phone (e.g., in act 1018) after receiving the first message (e.g., sent in act 1015) and before sending the second message (e.g., received in act 1021). As another example, certain embodiments include, for example, in the first message (e.g., in act 1015), an act of asking a personal question about the person having authority to authorize the action who is expected to be in control of the mobile phone. Such embodiments may also include, in the second message (e.g., in act 1021), an act of receiving a present answer to the personal question. Such embodiments may further include (e.g., in act 1027) an act of comparing the present answer to a previous answer to the personal question provided (e.g., in act 1006), for instance, by the person having authority to authorize the action.

In a number of embodiments, the first message (e.g., sent in act 1015) identifies the person seeking the action. And in some embodiments, the first message (e.g., sent in act 1015) also (or instead) identifies the action being requested (e.g., in act 1009). Such information may be valuable, for example, in embodiments or situations where the person requesting the authorization (e.g., in act 1009) is different than the person who has the authority to authorize the action (e.g., that provided the number received in act 1003, to which the first message was sent in act 1015, who indicates the authorization in act 1018, etc.). In some embodiments, on the other hand, the first mobile phone is controlled by the person seeking the action (e.g., who requests the authorization received in act 1009), and in some embodiments, the person seeking the action (e.g., who requests the authorization received in act 1009) is the same person having authority to authorize the action (e.g., in act 1003, act 1018, or both).

Moreover, some embodiments further include an act (e.g., within act 1006) of receiving, from the person having authority to authorize the action, for instance, through the Internet website (e.g., website 65 via the Internet 10 shown in FIG. 1) or the mobile phone network (e.g., 40), or both, an identification of a second phone number for advising a third person of the action (e.g., the action for which a request is received in act 1009, which is allowed in act 1030, or both). Some such embodiments include an act (e.g., 1033), for example, after receiving the request for authorization (e.g., in act 1009), of automatically sending the first message, the second message, a third message, or a combination thereof (e.g., in act 1033), to the second phone number. The act (1033), of notifying the third person, may include, for example, sending a description of the action for which authorization is requested, identifying the person requesting the action (e.g., in act 1009), or both, as examples.

In various embodiments, method 1000 further includes act 1036 of tracking the authorization granted for the action over time, which may include reporting results of the tracking. For example, a report may be issued which may indicate which authorizations were requested (e.g., in act 1009), when authorizations were requested, who requested such authorizations, whether and when authorizations were granted (e.g., in act 1018), and whether or when actions were allowed (e.g., in act 1030). In some embodiments, such a report or data may be provided (e.g., in act 1036) to or through the (e.g., first or second) mobile phone, for example, as SMS messages or nuggets of information described herein, as examples.

In some embodiments, information may be provided via a local signal (received in act 1007). Act 1007 may be similar to act 960 shown in FIG. 9 and described herein with reference thereto. A local signal may be received (e.g., in act 1007), for example, via local communications devices 88 and 82 shown in FIG. 1 and described herein with reference thereto, wherein device 88 is receiving and device 82 is transmitting. A local signal may be received (e.g., in act 1007), via NFC, for instance, and may be received (e.g., in act 1007) when the mobile phone is passed by a reader (e.g., device 88).

In different embodiments, different types of actions are requested (e.g., in act 1009), authorized (e.g., in act 1018), and allowed (e.g., in act 1030). Some embodiments are limited to particular types of actions. For example, some actions involve providing access, physical or otherwise, and some embodiments involve transfer of funds or money from one entity or account to another, for instance. As a specific example, in some embodiments, the action is granting of computer access to electronically stored information, and the person seeking the action (e.g., requesting the authorization in act 1009) is seeking the computer access to the electronically stored information. Embodiments of method 1000 may be used to provide computer access, for example, instead of a password, if a password has been forgotten, or in addition to a password, for example, to provide an added level of security in case an unauthorized user has obtained the password. In some such embodiments, the first message (e.g., of act 1015) may include a description of the computer access or electronically stored information for which authorization is requested.

In another example, the action is granting of physical access to a controlled space and the person seeking the action (e.g., requesting the authorization in act 1009) is seeking the physical access to the controlled space. Physical access may be controlled, for example, to a building, part of a building, a floor of a building, a room, an enclosure, a compound, a storage area, a parking area, a road, furniture such as a desk or filing cabinet, a safe, etc. In such embodiments, physical access may be allowed (e.g., in act 1030), for example, by electronically unlocking or opening a door, gate, or compartment, by allowing an elevator to reach a particular floor, etc. In such embodiments, the first message (e.g., of act 1015) may include a description of the room, floor, building, space, etc., for which authorization for access is requested.

In another specific example, in particular embodiments, the action (e.g., requested in act 1009, authorized in act 1018, allowed in act 1030, or a combination thereof) is (or includes) a financial transaction, the first message (e.g., sent in act 1015) includes an amount of the transaction, and the second message (e.g., received in act 1021) includes an authorization (e.g., from act 1018) of the transaction. Some such embodiments include (e.g., in act 1006), receiving from the person having authority to authorize the action, for example, through an Internet website (e.g., website 65 via the Internet 10 shown in FIG. 1) or a mobile phone network (e.g., 40), or both, an identification of a threshold monetary value of transactions. In some such embodiments, the first message is sent (e.g., in act 1015) for transactions exceeding the threshold, and transactions below the threshold are approved or authorized without sending the first message (e.g., without acts 1012 through 1027).

Further, in some embodiments, the transaction is (or includes) a withdrawal or a debit from a bank account and the person having authority to authorize the action is an authorized user of the account. Thus, in some embodiments, a user (e.g., 21 to 23 shown in FIG. 1) can elect (e.g., in selecting or indicating the criteria that is received in act 1006) to be notified via their phone (e.g., 41 to 43) of large withdrawals or debits (e.g., in act 1015), but not to be bothered (e.g., by a first message sent in act 1015) with smaller (e.g., routine) withdrawals or debits. Furthermore, in a number of embodiments, the user must authorize (e.g., in act 1018) the larger transactions, thus protecting the user, the bank (or other financial institution), or both from losses resulting from unauthorized withdrawals or debits.

In some embodiments, the first message (e.g., sent in act 1015) may include the balance of the account, and even where debits or withdrawals have been authorized, method 1000 may help the user to avoid overdrawing the account. And in some embodiments, the user can choose the threshold amount above which authorization is required. As used herein, accounts held at credit unions and other businesses that receive deposits of funds from various customers, hold the funds in accounts, and return the funds to the customers upon request, are considered to be "bank accounts".

In another example, in particular embodiments, the transaction (e.g., requested in act 1009, authorized in act 1018, allowed in act 1030, or a combination thereof) is (or includes) a bank card expenditure made at a point of sale for a purchase of goods or a payment for services. In some such embodiments, the person having authority to authorize the action is an authorized user of the bank card. In some such embodiments, the bank card has a bank card number, and the method further comprises, for example, before the sending of the first message (e.g., in act 1015), an act of receiving the bank card number from the first mobile phone via a local signal transmitted from the first mobile phone (e.g., where the local signal is received in act 1007).

In certain embodiments, as another example, the transaction (e.g., requested in act 1009, authorized in act 1018, allowed in act 1030, or a combination thereof) is (or includes) an expenditure made from a credit or debit account at a point of sale for a purchase of goods or a payment for services, the person having authority to authorize the action (e.g., user 22) is an authorized user of the account, the account has an account indicia, and the method further includes, before the sending of the first message (e.g., act 1015), an act of receiving (e.g., act 1007) the account indicia from the mobile phone (e.g., 42) via a local signal transmitted from the mobile phone (e.g., from communication device 82). As used herein "account indicia" includes credit card numbers, debit card numbers, and combinations of letters, numbers, symbols, or a combination thereof, that identifies an account from which a user can make credit or debit charges using the indicia.

In further examples, in some embodiments, the transaction (e.g., the approval of which is the action requested in act 1009, authorized in act 1018, allowed in act 1030, or a combination thereof) is (or includes) an expenditure made from a credit or debit account at a point of sale for a purchase of goods or a payment for services, the person having authority to authorize the action is an authorized user of the account, and the second message (e.g., received in act 1021) includes an authorization code which has been memorized by the person having authority to authorize the action and keyed into the first mobile phone after receiving the first message (e.g., sent in act 1015) and before sending the second message (e.g., received in act 1021). The keying in of the authorization code may constitute, or be included within, the act of indicating authorization (act 1018), for example.

In addition, in some embodiments, the transaction (e.g., the approval of which is the action requested in act 1009, authorized in act 1018, allowed in act 1030, or a combination thereof) is (or includes) an expenditure made from a credit or debit account at a point of sale for a purchase of goods or a payment for services, the person having authority to authorize the action is an authorized user of the account, the account has an account indicia, and the second message (e.g., received in act 1021) includes the account indicia. In an example of such an embodiment, a customer provides a merchant with his phone number, either verbally or by keying it into a key pad, as examples. Then the merchant sends or causes to be sent the first message (e.g., in act 1015) to the customer's mobile phone. Then the customer presses one or more buttons on the phone to indicate authorization of the transaction (e.g., act 1018), and the phone sends the second message (e.g., received in act 1021) to the merchant, along with the customer's credit or debit card number to be charged.

In other embodiments, the customer's phone number may be received by the merchant via a local signal (e.g., in act 1007) when the customer passes his mobile phone by a local receiver (e.g., reader or device 88 shown in FIG. 1). And in other embodiments, the acts of sending the first message (1015), receiving the second message (1021), or both, may be performed by a service provider rather than directly by the merchant. In some embodiments, the second message (e.g., received in act 1021) is (or includes) an SMS message received through the mobile phone network (e.g., 40) and method 1000 further includes, before the act of sending of the first message (e.g., act 1015), an act of receiving from the person seeking the action, or from the first mobile phone, the first phone number. In different embodiments, or different situations, the person seeking the action may provide the phone number verbally, through a keyboard, or by passing the phone by a reader (e.g., device 88), as examples.

Other methods of authenticating a transaction that are illustrated by FIG. 10 include (at least) the act of receiving through an Internet website (e.g., 65) or a mobile phone network (e.g., 40) (or through both), from each of multiple users (e.g., 21 to 23), for instance, an indication of a criteria for the user for obtaining authorization for transactions (act 1006). Such embodiments may also include, for each of more than one of the users (e.g., 21 to 23), an act of sending a first automated message (e.g., act 1015), for example, through mobile phone network (e.g., 40) to a mobile phone (e.g., 41 to 43) of the user, the message containing an amount of the transaction and requesting an affirmative action (e.g., in act 1018) to indicate authorization of the transaction. And such methods may also include, for instance, for each of at least a number of the users (e.g., 21 to 23), receiving from the mobile phone (e.g., 41 to 43) of the user, a second message (e.g., in act 1021) indicating that the user (e.g., 21 to 23) of the mobile phone has taken the affirmative action (e.g., in act 1018) to indicate authorization of the transaction.

Such an affirmative action (e.g., in act 1018) may be pressing a button, making a selection from a menu, entering a voice command, entering a password or authorization number, etc. Various examples of actions that may be allowed (e.g., in act 1030) in different embodiments are described herein. In a number of different embodiments, such acts may be combined in various combinations or with other acts or features (or both) described herein.

In addition to other things, FIG. 10 also illustrates various methods of authenticating access. In particular examples, such embodiments of method 1000 include, (e.g., in the order illustrated, or in another suitable order) various acts. Some such embodiments include, for example, the act of receiving from a person seeking access (e.g., from one of users 21 to 23 shown in FIG. 1), identification indicia for the person seeking the access (e.g., in act 1009). In various such embodiments, the identification indicia may be or include the name of the person, a user ID or identification number for the person, or the phone number for the person, as examples.

Some embodiments include, for example, after the act of receiving the identification indicia (e.g., act 1009), and before the act of sending of the first automated message (e.g., act 1015), an act (1010) of looking up the requester (e.g., the person who made, or allegedly made, the request for authorization in act 1009). In particular embodiments, this (e.g., act 1010) may involve looking up the identification indicia (e.g., received in act 1009) in a database (e.g., in storage 64), and obtaining from the database a phone number for the mobile phone of the person having authority for the access (e.g., to which the first message is sent in act 1015).

In embodiments where the identification indicia includes the phone number for the mobile phone of the person having authority for the access (e.g., to which the first message is sent in act 1015), the act of looking up the requester (e.g., act 1010) may involve verifying that the phone number corresponds to that of a (or the) person having authority for access. In embodiments where the request for authorization (e.g., received in act 1009) includes more than one indicia, the act of looking up the requestor (1010) may include verifying that some or all of the indicia are consistent, correspond to the same person, are correct, etc.

In a number of embodiments, method 1000 may also include an act of sending a first (e.g., automated) message (e.g., act 1015), for example, through mobile phone network 40 shown in FIG. 1, to a mobile phone of a person (e.g., identified in act 1009 or 1010) having authority for the access. In such embodiments, "automated" means that the first message is sent (e.g., in act 1015) by machines, for example, by one or more computers, servers, software, or the like. For example, in some embodiments, the first message is sent (e.g., in act 1015) by server 15, software module 61, or both, shown in FIG. 1, in response to receiving the request for authorization (e.g., in act 1009). In some embodiments, the first (e.g., automated) message is sent (e.g., in act 1015) to the phone number of the person identified in act 1010 as having authority for the access.

In some of these embodiments, the act of sending the first message (e.g., act 1015) includes or consists of sending the first message (e.g., through mobile phone network 40) to a mobile phone of the person seeking the access. In other words, the person seeking access and the person having authority for access are, or are assumed to be, the same person, in some embodiments. On the other hand, in other embodiments, the person seeking the access is a first person, the person having authority for the access is a second person (i.e., a different person). In many such embodiments, the first message (e.g., sent in act 1015) includes an identification of the first person who is seeking the access. Such an identification may be, or include, part or all of the indicia (e.g., received in act 1009), or that is obtained (e.g., in act 1010) with reference thereto.

In some embodiments, the first automated message (e.g., sent in act 1015) includes an identification of the access requested and a request for an affirmative action to indicate authorization of the access. In other embodiments, the first automated message (e.g., sent in act 1015) includes a password. And in some embodiments, the first automated message (e.g., sent in act 1015) includes an identification of the access requested, a request for an affirmative action to indicate authorization of the access, and a password.

Many such embodiments of method 1000 also include the act of receiving the password (act 1019), for example, from the person seeking the access. Further, many embodiments include the act of receiving, for example, from the mobile phone of the person having authority for the access, a second message (e.g., act 1021) indicating, for example, that the person having authority for the access has taken the affirmative action to indicate authorization of the access. Some embodiments include act 1019 but not act 1021 (e.g., wherein the first message, sent in act 1015, includes a password, but not a request for a response or a second message), some embodiments include act 1021 but not act 1019 (e.g., wherein the first message, sent in act 1015, includes a request for a response or a second message, but not a password), and some embodiments include both act 1019 and act 1021 (e.g., wherein the first message, sent in act 1015, includes a request for a response or a second message, and a password).

In a specific example, a number of embodiments involve sending the first automated message (e.g., act 1015) through the mobile phone network (e.g., 40) to the mobile phone of the person having authority for the access, wherein the first automated message contains the password. Such methods may also include receiving the password from the person seeking the access (act 1019). In some such embodiments, for example, the person seeking the access is seeking computer access to electronically stored information.

In a particular example, if a user (e.g., 23) attempts to log into a computer (e.g., 13) or a system (e.g., a personal area of website 65), but has forgotten his password, then the computer (e.g., 13) or system (e.g., module 61) may ask the user (e.g., 22) to identify himself, for example, by entering his name, user ID, phone number, or other identification indicia (e.g., in act 1009). The computer (e.g., 13) or system (e.g., software module 61) may then look up (e.g., in act 1010) the user's phone number in a database (e.g., in storage 64), or verify that the user's (e.g., 23) phone number is in the database, and then send the first message (e.g., in act 1015) to the user (e.g., to his mobile phone 43) with the password. The user (e.g., 23) then receives the password on their mobile phone (e.g., via a SMS message, a voice message, or the like) and enters the password into the computer (e.g., 13) or system (e.g., website 65).

In different embodiments, such a password may be the original password, a temporary password, or a one-time use password, as examples. In other embodiments, instead of using such a process only when a password is lost or forgotten, the process may be used every time a person logs in, randomly, at regular intervals (e.g., of time or numbers of log ins), when an unauthorized user is suspected, in addition to requiring a password (e.g., for added security), or the like.

For additional security, for example, some embodiments further include the acts of asking the person seeking the access a personal question (e.g., in act 1015), for example, about the person having authority for the access (which may be the same person, in some embodiments). Such a method may also include an act of receiving from the person seeking the access (e.g., in act 1021) a present answer to the personal question. Some of these embodiments also include the acts (e.g., within act 1027, a similar act occurring before act 1021, or act 1019) of comparing the present answer to a previous answer to the personal question provided (e.g., in act 1006) by the person having authority for the access, and proceeding to allow the action (e.g., in act 1030) or to send the first automated message containing the password (e.g., in act 1021) only if the present answer matches the previous answer.

In some such embodiments, the first automated message (e.g., sent in act 1015) contains the personal question and the second message (e.g., received in act 1021) contains the present answer, for example. Such a personal question may be, or include, as examples, "what is your mother's maiden name?", "what is your pet's name?", or "what is your favorite color?", or a combination or alternate selection thereof. Such questions may provide an added level of security, in some embodiments.

Certain embodiments of method 1000 include the specific act of sending the first automated message (e.g., in act 1015) through the mobile phone network (e.g., 40) to the mobile phone of the person having authority for the access, wherein the first message contains the identification of the access requested (e.g., received in act 1009) and the request for an affirmative action to indicate authorization of the access. These embodiments may also include the specific act of receiving (e.g., in act 1021), from the mobile phone of the person having authority for the access, the second message (e.g., indicating that the person having authority for the access has taken the affirmative action to indicate authorization of the access). Such an affirmative action may be, for example, making a selection from a menu, pressing a button on the phone, making a voice command, or the like.

For example, in some embodiments, the first (e.g., automated) message (e.g., received in act 1015) includes at least one menu and at least one prompt to authorize the access by making a selection from the menu. In some such embodiments, the second message (e.g., received in act 1021) either authorizes the access, or does not authorize the access (e.g., as determined in act 1027) based upon which menu selection is made. In some such embodiments, failure to make a menu selection at all either results in the second message not being sent, or the second message being sent after a period of time indicating that the affirmative action has not been taken.

Some of these embodiments further include the acts of receiving a present password (e.g., when the request for authorization is received in act 1009, in act 1019, or in the second message in act 1021) from the person seeking (e.g., in act 1009) the access. Such methods may also include an act of comparing (e.g., within act 1027, a similar act occurring before act 1021, in act 1010, or in act 1019) the present password to a previous password stored in memory (e.g., in storage 64), and proceeding to provide the access (e.g., allow the access or action in act 1030) only if the present password matches the previous password (e.g., as evaluated in act 1027). In different embodiments, the password may be received (e.g., when the request for authorization is received in act 1009, in act 1019, or in the second message in act 1021) through a local key pad or key board, through the user's mobile phone, verbally (e.g., using voice recognition software), etc.

Many different embodiments include other features or aspects, including those described herein. As some specific examples, in many embodiments, the first message (e.g., sent in act 1015), the second message (e.g., received in act 1021), or both, are SMS messages. Such messages may be received through mobile phone network 40, for example. Further, some methods further include the acts of encrypting (e.g., act 1012) the first automated message (e.g., before the sending, in act 1015, of the first automated message to the mobile phone of the person having authority for the access). Embodiments that include a second message (e.g., received in act 1021), may include (e.g., in addition to or instead of act 1012) an act of decrypting (e.g., act 1024) the second message (e.g., after the receiving, in act 1021) of the second message from the mobile phone of the person having authority for the access). Further, some of these methods further include the act of receiving, for example, through Internet website 65, mobile phone network 40, or both, for instance, from each of at least a number of persons who have authority for access, an indication of a criteria for obtaining authorization for access for the person (e.g., in act 1006).

In some embodiments, the access that is being sought (e.g., in act 1009) is physical access. For example, in a number of embodiments, the act of sending the first automated message (e.g., act 1015) includes, or consists of, sending the first automated message through the mobile phone network (e.g., 40) to a mobile phone of the person seeking the access (e.g., as requested in act 1009), and the person seeking the access is seeking (e.g., in act 1009) physical access to a controlled space. In other words, the person seeking the access (e.g., as requested in act 1009) and the person having authority for the access (e.g., in act 1003, 1006, 1021, or a combination thereof) are the same person, and that person is seeking physical access. Such physical access may be, for example, physical access to enter a building or a floor or area of a building, or access to move a vehicle into a controlled space. Further examples of physical access are described elsewhere herein.

Further, in certain embodiments, the receiving of the identification indicia for the person seeking the access (e.g., in act 1009) involves receiving a near-field communications signal from a mobile phone of the person seeking the access. For instance, user 22 may pass her phone 42 past NFC reader or communications device 88. In so doing, mobile phone 42 may transmit the indicia (e.g., of act 1009) to device 88, which may be in communication with server 15, software module 61, or both, for example via the Internet 10. In different embodiments, such a NFC signal may also indicate the access or authorization requested (e.g., in act 309), or the selection of reader or device 88 may serve to indicate which access or authorization is requested (e.g., in act 309).

Figure 2:
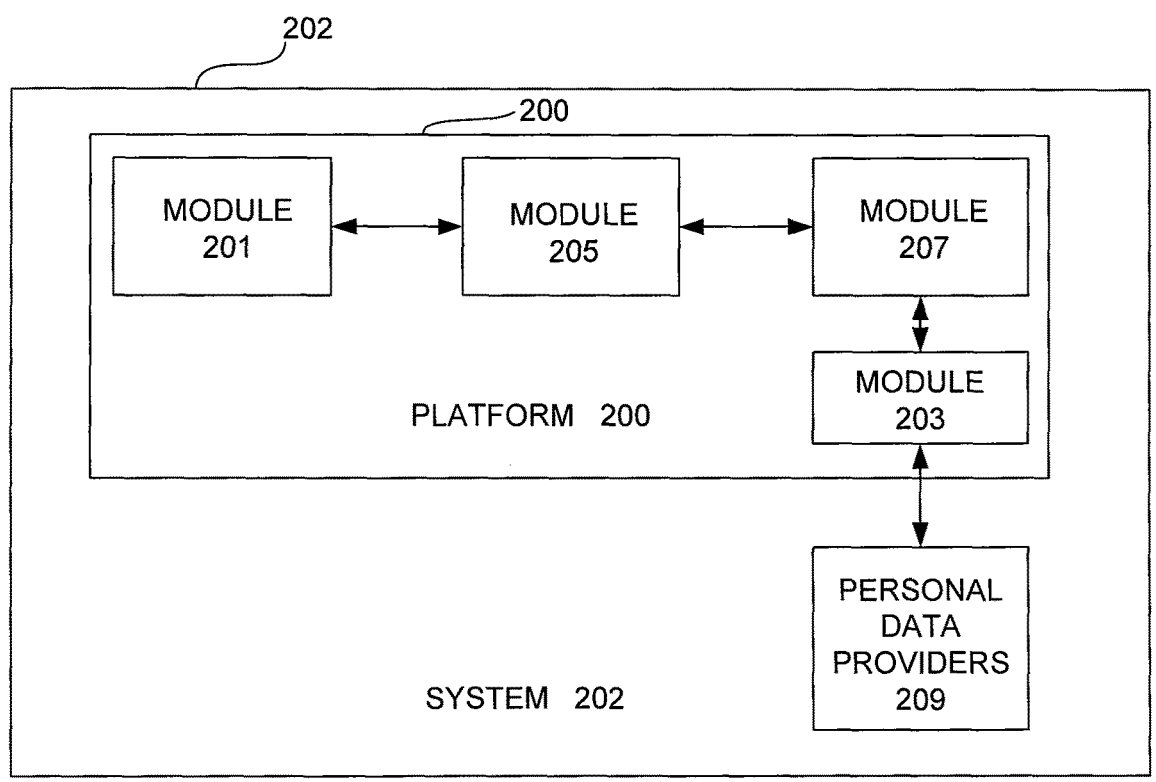
FIG. 2 is a block diagram illustrating particular examples of systems of managing and disseminating information and/or messages for a number of users.
Figure 11:
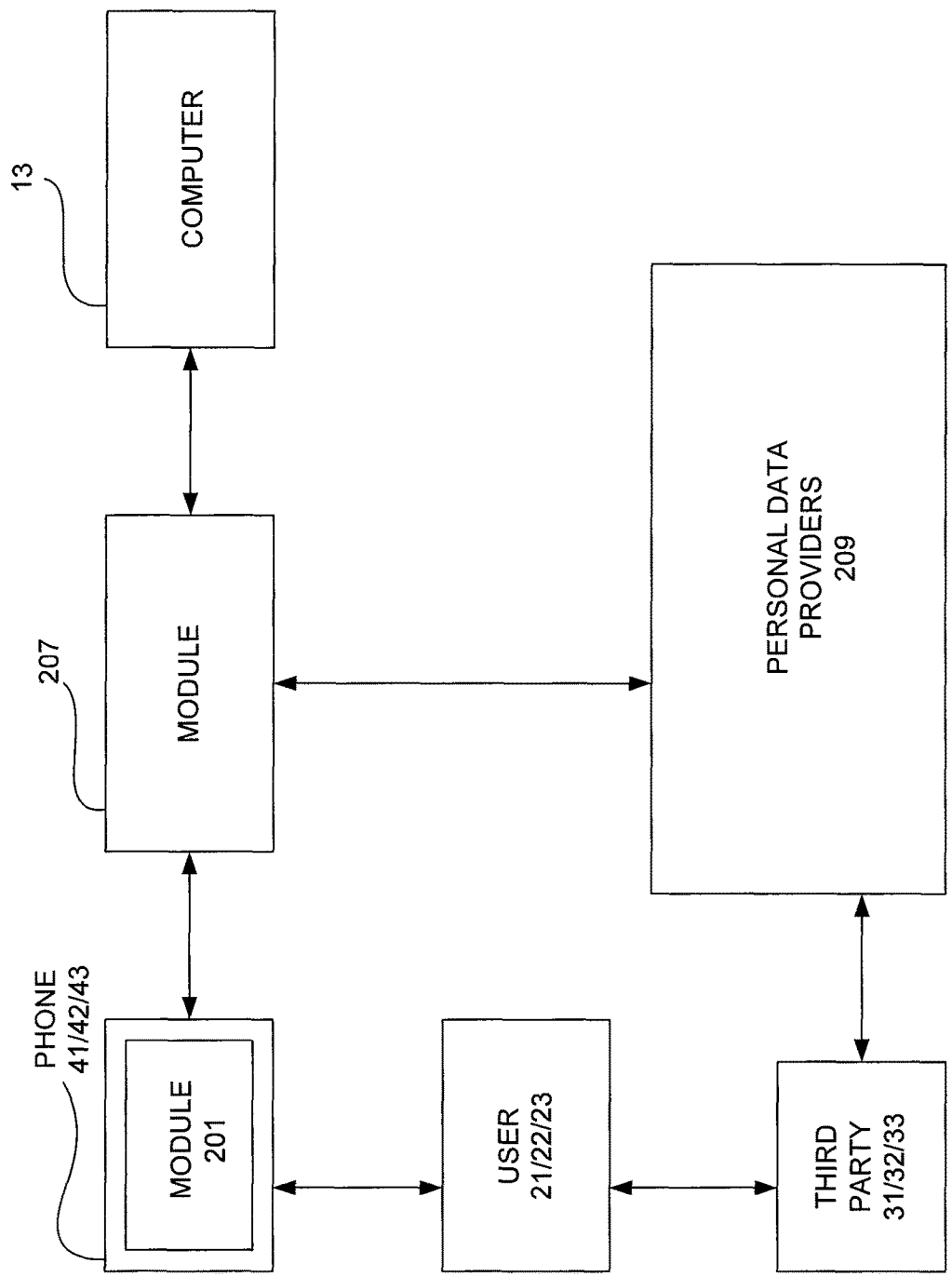
FIG. 11 is a block diagram illustrating particular examples of systems of managing and disseminating information for a number of users.

Referring now to FIGS. 1, 2, and 11, in a particular embodiment provided as an example, system 202 manages personal information and/or enables secure communication for any number of users, and includes a SECURE MOBILE INFORMATION MANAGEMENT™ (SMIM) platform 200 and Personal Data Providers 209. SMIM platform 200 is an example of a technology platform for system 100 which enables mobile phone users (e.g., 21 to 23) to have access to certain personal information via their mobile phone (e.g., 41 to 43), in some embodiments, even when there is no signal or internet connection for the cell phone (e.g., from mobile telephone network 40). In this embodiment, SMIM platform 200 includes one or more blocks of code configured to provide the framework and foundation of system 100 and encompasses functionality from defining standards under which development takes place to defining security, to communication between components and various core software applications.

In certain embodiments, SMIM platform 200 includes module 201 (e.g., MICRO AGENT™ module or MICRO AGENT TECHNOLOGY™ (MAT) module) and module 203 (e.g., WEB SERVICES module or CELLTRUST WALLET WEB SERVICES™ module). In this example of an embodiment, module 201 runs on mobile phones, and is an example of the second software module 72, or a portion thereof, and module 203 is an example of first software module 61, or a portion thereof. In this example, module 203 is a block of code or software that runs on server 15 and that communicates with or exchanges data with module 201 on the phones, website 65, and secure storage 64, for example. Module 203 may be a communication layer between module 201, website 65, and storage 64, for instance. Module 203 may provide or allow authentication, communication, protocol definition, auditing of the integrity of data, prevention of unauthorized access, and so on, and may allow access to website 65 from the Internet 10. Module 201 allows users 21, 22, and 23 to create, send, receive, and store secure SMS and MMS messages via phones 41, 42, and 43.

Module 203 also, in various embodiments, allows third parties (e.g., 31 to 33) or Personal Data Providers 209 (e.g., banks, airlines, merchants, health care providers, and the like) to communicate with a customer (for example, to update their customer's accounts or personal information on storage 64, website 65, and/or secure areas thereof, to exchange electronic medical records in a HIPAA-compliant manner, to provide flight information and/or booking, and so forth). Module 201 or second software module 72 provides a user interface, local storage, synchronization, and alerts components, in this embodiment on one or more of phones 41 to 43. Further, in certain embodiments, a user interface, within mobile phone 41 or second software module 72, may gather information from the user (e.g., 21) and provide information back to the user. For example, Personal Data Providers 209 include financial institutions, airlines, retailers, or merchants. Module 203 allows Personal Data Providers 209 to update customer accounts or personal information such as bank account information and statements, flight information, credit card information and charges.

In some embodiments, local storage (e.g., folder 76 on mobile phone 41) enables the application (e.g., second software module 72) to store information (e.g., nuggets 78 and 79 of information) on the phone (e.g., 41), which may provide for faster access, reduce dependence on the network (e.g., mobile phone network 40, the Internet 10, or both), and may reduce the total cost of ownership by limiting the amount of data communication through mobile phone network 40 that takes place (e.g., at the expense of user 21). In some embodiments, the data (e.g., nuggets 78 and 79) on the phone (e.g., 41) is synchronized with data on server 15 to ensure that the user (e.g., 21) has access to updated information both on their phone (e.g., 41) and on the web (i.e., Internet 10, which may be accessed, at least by user 23, through computer 13, for instance).

In certain embodiments, data is compressed, encrypted, or both, for communication with the mobile phone or device (e.g., between module 201 and module 203 or between the first software module 61 and the second software module 72). In addition, in some embodiments, alerts may provide substantially real time notification of various events or activities that can be sent to a phone (e.g., 41) running module 201 (an example of module 72, or a portion thereof). For example, alerts may inform the user of an important or critical event such as a large withdrawal from their account or a flight cancellation, flight changes, gate changes, or the like. In addition, in some embodiments, module 207 provides a middle tier between users (e.g., 23) operating on their computers (e.g., 13) and module 205, module 201, or both. In some embodiments, module 203 may provide information (e.g., from Personal Data Providers 209) to module 207, which may then be provided to module 205, module 201 (e.g., on the mobile phones), or both.

Further, in certain embodiments, module 207 (an example of part of first software module 61 or part of website 65) is a web application that enables users (e.g., 21 to 23) to access and modify various information, such as their personal information, such as their card information for example, on the web (e.g., through the Internet 10 and web site 65). In some embodiments, module 207 uses module 205 to communicate and synchronize users' information with their mobile phone. In a number of embodiments, module 203, module 207, module 205, or a combination thereof, can also be used by third parties (e.g., 31 to 33) or Personal Data Providers 209 to send, receive, or both, information to (or from) mobile phones (e.g., 41 to 43) running module 201 (e.g., second software module 72). For example, a bank such as WELLS FARGO™ bank may be able to send alerts to their customers' mobile phones (e.g., 41 to 43) and to provide them with the latest bank account information, for instance. Another example (e.g., of a third party 31 to 33) is an airline such as SOUTHWEST AIRLINES™, which may send their customers (e.g., 41 to 43) up-to-the-minute gate and cancellation information, as appropriate.

In a particular example of an embodiment, SMIM platform 200, which includes embodiments of first software module 61 and second software module 72, provides functionality and features that include substantially secure storage of cards and information, including, for example, credit cards, bank cards, identification cards such as a driver's license to identify a person, loyalty cards, for instance, for grocery stores such as SAFEWAY™, and ALBERTSONS™, and retail stores such as The GAP™, and STARBUCKS™, frequent flyer programs, rewards programs, membership cards, video clubs, library cards, insurance cards, for instance, health, auto, or life, and login and password information, and the like. Various embodiments may provide a combination of the items or information described herein or (e.g., any information or data) that is typically found or has been known to have been carried in a person's wallet or purse, for example, or equivalent functionality.

Further, some embodiments include central, secured, and backed up storage, for example, through module 61, server 15, or both. In various embodiments, a user (e.g., 21 to 23) may enter the data once (e.g., into their phone 41 to 43, into website 65, etc.) and may use such information, for example, as long as it remains current. In addition, in particular embodiments, a user (e.g., 21 to 23) may be able to easily replace a particular phone (e.g., user 21 may be able to replace mobile phone 41), a carrier or service provider (e.g., of mobile phone network 40), or both, without re-entering personal information. Further, in this particular embodiment, a user (e.g., 21 to 23) may have access to their personal information from virtually anywhere (e.g., through their mobile phone).

In addition, particular embodiments that provide alerts to inform users of important changes, are configurable. In some such embodiments, the user (e.g., 21 to 23) may select which nuggets of information or changes are important to them such that the user should be alerted when the information is updated (e.g., immediately) and which should be stored for later review, for instance. Certain embodiments may provide immediate or near-immediate notification. Specifically, in some embodiments, a message may pop up on the mobile phone (e.g., 41 to 43) to alert the user (e.g., 21 to 23) of an event. In this embodiment, users can then bring up MICRO AGENT, or second software module 72, for detailed information about the event.

In some embodiments, a user can use module 201, or second software module 72 to take an immediate action. For example, if the user is informed of a large withdrawal from their account, the user may be able to use module 201, or second software module 72 to inform the bank (which may be one of the third parties 31 to 33 or a Personal Data Providers 502, for example) of possible fraud or mistake. Hence, in this particular embodiment, banks or other financial institutions may be able to limit their liability or reduce their losses by immediately putting the account under investigation. In various embodiments, users may take control of their data by putting their personal information in SMIM platform 200 or system 100. In many embodiments, users' personal information is not stored on an employers' server where the employer controls the information and has the ability, or even the legal right, to access it. Further, in some embodiments, users (e.g., 21 to 23) can change jobs without the need for re-entering their data over again.

Moreover, certain embodiments may use mobile phones (e.g., 41 to 43) to provide certain identification card functions. For example, mobile phone 42 may be used to identify user 22. Personal information stored on a mobile phone, on server 15, or both, may include a driver's license number, a social security number, a passport number, visa information, security clearance information, credentials, a birth certificate, a green card, a work permit, a military ID, access cards, membership cards, elevator cards, copy cards, etc. In some embodiments, if cards or the phone are lost, destroyed, or stolen, a user may replace some or all access cards with a mobile phone. In various embodiments, a user may use a mobile phone to access a parking garage, an office building, secure labs, or other areas, for example. Further, in some embodiments, a user may use SMIM platform 200, module 205 (e.g., Secure Mobile Services), or first software module 61 to locate employees, for example, immediately or within a certain time period. User 22 may be located, for example, by determining the location of the cell that phone 42 is within, by using GPS information from phone 42, or a combination thereof.

In a number of embodiments, SMIM platform 200 or system 100 may be used in a retail sales environment. For example, in some embodiments, user 22 may use mobile phone 42 to retrieve product information about a product using a local signal such as Near Field Communication or Bluetooth, for example. In some embodiments, a user may use a phone to look up a location of a product, receive a coupon as the user enters a store, receive daily specials, store product information and price for price comparisons, or a combination thereof. In some embodiments, a user may send friends or family, for example, gift cards from a mobile phone, and a recipient may be able to redeem the gift certificate using their mobile phone. In certain embodiments, SMIM platform 200 or system 100 may also allow users to purchase products in stores by payment with a phone, for example, charging a credit card, debit card, or the like. In particular embodiments, SMIM platform 200 or system 100 also allows for secure communication between module 201 or second software module 72 and the website (e.g., 65) as well as secure SMS communication, for example, for transmitting sensitive information rather than text messaging using clear text.

Yet another embodiment includes or combines a phone with key card. An example is an apparatus for communicating a code, that includes a component for a mobile phone (or a mobile phone that includes the component) wherein the component includes a passive code configured to be read by a reader when the phone is passed in close proximity to the reader. In many of these embodiments, the reader is an apparatus, for example, as opposed to a person. The reader of this embodiment may be similar to communications device 88 shown in FIG. 1 and described herein, and may be a card reader configured to read passive codes from cards, for example, or similar thereto.

In certain embodiments, for example, the passive code comprises a magnetic code and the reader is configured to read magnetic codes or the passive code comprises a bar code and the reader comprises a bar code reader. In some embodiments, the passive code is substantially unchangeable. As used herein, "substantially unchangeable" means that a typical user cannot change the passive code in a manner that is more convenient than replacing the component or the phone. Thus, a user cannot change their code on a whim, which a person reading the code may rely on, for example, to identify the user. Although not necessarily fool proof, in some of these embodiments, changing the passive code of a specific phone or component to copy the passive code of a different phone would be at least as difficult as making a duplicate of someone else's credit card, as a further example.

As used herein, "passive" or "passively" means to not be powered by the battery or electrical system of the phone or electrically connected to the phone (or another battery or electrical system). Further, as used herein, in this context, the "component" of the phone excludes disposable packaging for the phone (that may contain a bar code for product sales or tracking purposes, for example). Further, in some embodiments, the component is comprises a back of the mobile phone, a battery cover of the mobile phone, a battery for the mobile phone or a case for the mobile phone, as examples.

Further, in some embodiments, the mobile phone has a phone number and the passive code comprises the phone number of the mobile phone. Further, in some embodiments, for another example, the passive code comprises a number that is unique to the component from all other components for mobile phones and all other mobile phones. In other embodiments, the passive code may comprise or include the name of the user, an indicia for the user, an indicia for an account, a portion thereof, or a combination thereof, as examples.

Various embodiments may also include a method to replace a back of a phone with a key card. Another example comprises a method of eliminating a need to carry a card. This method includes providing or obtaining a mobile phone having a component (or at least providing or obtaining a component for a mobile phone), wherein the component is configured to passively produce a code configured to be read by a reader (e.g., device 88) when the mobile phone, that includes the component, is passed in close proximity to the reader. Some embodiments may require only proximity instead of close proximity, for example, using Bluetooth. Such a method may include obtaining or providing components having one or more aspects described above for the example of the apparatus for communicating a code. Particular embodiments include providing the component as a replacement part for a preexisting mobile phone that previously did not have an ability to passively produce such a code.

Other embodiments comprise various methods to use a phone with a key card. An example of such an embodiment comprises a method of identifying people, that includes the acts of providing or obtaining at least one reader (e.g., device 88) configured to read a passive code from an apparatus containing the code that is passed within (e.g., close) proximity to the reader, permitting people who whish to be identified to pass their mobile phones (e.g., 42) within close proximity to the reader (e.g., device 88), wherein the people (e.g., 22) who wish to be identified have the passive code located on their mobile phones (e.g., 42). Such methods may also include an act of using the passive code, as read by the reader (e.g., device 88), to identify the people (e.g., 22).

Such a method may be employed by a merchant, a service provider, an employer, a land lord, a manufacturer, a company, a school, or a government agency, for example. Further, such a method may include obtaining or providing components having one or more aspects described above for the example of the apparatus for communicating a code. In some embodiments, such a method may be used in combination with, or as part of, other methods described herein. In some embodiments, such a method or system may be used for a particular purpose, or for more than one purpose.

In particular embodiments, for each of multiple people, the identity of the person is used to authorize an expenditure from a credit or debit account at a point of sale for a purchase of goods or a payment for services. In various embodiments, for each of numerous people, the identity of the person is used to authorize physical access to a controlled space. Further, in some embodiments, for each of at least two of the people, the identity of the person is used to authorize computer access to electronically stored information. Even further, in some embodiments, the method further includes at least one other means for identifying the people. Such other means may be one of the means described herein, or known in the art, for example.

Still another embodiment comprises a method of eliminating a need to carry a card. This example of a method includes replacing an old component of a mobile phone with a new component. In some embodiments, the new component includes at least one of a back, a battery cover, a battery, and a case for the mobile phone, as examples. In some embodiments, the new component includes a magnetic code area configured to produce a magnetic code to be read by a card reader (e.g., device 88) when the phone is passed in close proximity to the card reader. Other embodiments may use a bar code.

Another embodiment comprises another method of eliminating a need to carry a card. Such a method may include configuring a mobile phone with a component, wherein the component comprises at least one of a back, a battery cover, a battery, and a case for the mobile phone, wherein the component includes a code configured to be read by a card reader (e.g., device 88) when the phone is passed in close proximity to the card reader. Other embodiments include a method or phone that communicates a code using near-field communication, for example, wherein the code is stored on the phone, selected by the user, and transmitted via a NFC transmitter (e.g., device 82). Different uses are described herein wherein the codes are sent to the phone via the mobile phone network (e.g., 40) from a server (e.g., 15) or that collects the codes from third parties (e.g., 31 to 33) through the internet 10, for example.

Referring now to FIGS. 1 and 12, in some embodiments, an agent 1203 uses one or more of an assigned short code (or long code) and a generic assigned identification (ID) (e.g., a keyword) for selling items. The short code and generic assigned ID may be advertised through magazines, web/Internet, or other means/media, as examples. Short codes are also referred to as short numbers, dedicated short codes, shared short codes, or Common Short Codes (CSC) (e.g., special telephone numbers that can be used to address SMS and Multimedia Messaging Service (MMS) messages from phone 41, 42, or 43). For example, the generic assigned ID includes a keyword sent in a message to the short code (or long code), the requested item sent in a message to the short code (or long code), or a generic assigned ID for a particular item sent in a message to the short code (or long code). Each agent 1203 or server 15 can have one or more of a unique short code, generic assigned ID, and keyword. For example, server 15 or each agent 1203 can be assigned a unique short code. If server 15 is assigned a unique short code, then server 15 can act as the merchant or agent 1203 by assigning a unique keyword to each merchant or agent 1203. When the user orders an item, the keyword used by the user identifies the particular agent 1203 to order and purchase the item from. In another example, if each agent 1203 is assigned a unique short code, then agent 1203 can act as the merchant itself. Different short codes or long codes can belong to different third parties 31, 32, or 33. The communication between module 201 and each third party 31, 32, and 33 is encrypted using a different key. Furthermore, third parties 31, 32, and 33 can specify their own encryption algorithm, key generation algorithm, and duration between changes in their encryption key.

For example, server 15 or agent 1203 may store information or have access to one or more servers. User 21 sends a keyword (e.g., 1234) to a short code (e.g., 54321) via phone 41. In this example, user 21 sends an SMS message or MMS message for item 1234 to short code 54321 via phone 41. Since short code 54321 is assigned to server 15 (or agent 1203), server 15 has information stored on item 1234 (e.g., server 15 has a nugget of predefined information on item 1234 stored, which can be customized depending on the request or purchase made by user 21). Server 15 provides the nugget of information on item 1234 to user 21 by replying to the SMS message or MMS message user 21 previously sent to short code 54321. Server 15 has an SMS gateway 115 with a nugget of predefined information associated with each keyword (e.g., "item 1234", "ABCD", or any other keyword), so that it can easily return the specific information user 21 requests. For example, the nugget of information can include one or more of order information (e.g., number), confirmation information (e.g., number), alerts, or other information.

A keyword can be any combination of commands or requests. Second software module 72 can configure automated command options (e.g., predefined keywords for user 21 to have menu driven options (such as preconfigured and defined keywords for user 21 to select from)). Server 15 and/or agent 1203 are notified that user 21 requests information on or wants to purchase item 1234. Server 15 or agent 1203 request confirmation of the order and charges (or use of pre-paid credits) from user 21 and provide information on item 1234 to user 21 by sending an SMS message or MMS message to user 21 via the internet, an SMS gateway (or MMS gateway) 115, and phone 41. For example, server 15 or agent 1203 sends user 21 an SMS message requesting confirmation for a purchase of goods for a charge of $25.

First software module 61 of server 15 is recorded on a computer-readable medium and includes programming instructions to receive information about one or more agents 1203 to create one or more agent accounts. In an exemplary embodiment, with continued reference to FIGS. 1 and 12, agent 1203 receives an agent account at server 15 or a vendor 1205 (e.g., merchant, third party, or other entity) directly or via server 15. In this exemplary embodiment, the agent account enables agent 1203 to perform the following tasks via server 15: create an SMS or MMS message for a particular item, customize the message, activate and de-activate a message, configure the message, purchase SMS, email credits, or MMS credits, and view reports. The agent account can be set-up and configured in various ways depending on the needs of agent 1203.

Agent 703 creates an SMS or MMS message for a particular merchant for the generic assigned ID (or a keyword) via server 15. For example, agent 1203 can purchase one or more generic assigned IDs from server 15. Agent 1203 customizes the message for specific keywords relevant to the information requested by users 21, 22, and/or 23 via server 15. Agent 1203 activates and/or de-activates a message depending on the circumstances via server 15. Agent 1203 configuring the message via server 15 includes deciding if an SMS or MMS or email should be sent to agent 1203 every time a user (e.g., prospective buyer) requests information, and responding to the user's request for information by further requesting that the user provide an email address to send further information to the email address provided by the user. If the user provides an email address, then server 15 can send the user an SMS message, email, or MMS message with more detailed information. For example, server 15 can send a link (e.g., WAP push) to the user via an SMS message or MMS message with such information (e.g., such as a message with a link to a WAP address). Server 15 can also communicate with phone 41, 42, or 43 of the user and by using location based services provide information about other lotteries in a particular area (state, region, or other area) based on the global positioning system of phone 41, 42, and 43 at any instance in time, or any other location specific information the user may desire. Agent 1203 purchases SMS or MMS credits from server 15 and can make the SMS or MMS credits available for users 21, 22, and/or 23 to use. Agent 1203 viewing reports include identifying the number of prospective buyers, phone numbers of the prospective buyers, and other relevant information.

Prospective users 21, 22, and/or 23 may use phone 41, 42, or 43 (such as a mobile phone or cell phone in some embodiments) to retrieve information by sending an SMS message, MMS message, or text message, for example, to the short code (or long code) and type a generic assigned ID as the text for the message. For example, agent 703 may include information on how to send a message including the generic assigned ID for an item (e.g., ABCDE), a request for the item, or any other identifying or requested information to the short or long code (e.g., 65203). SMS gateways can be used for sending and receiving SMS messages (or MMS gateways can be used for sending and receiving MMS messages). For example, in FIG. 1, an SMS gateway 115 (or an MMS gateway 115) is typically between phone network 40 and internet 10 or internet 10 and server 15 or a part of server 15. Server 15, phone 41, 42, or 43, and/or third parties 31, 32, and/or 33 can send or receive SMS or MMS messages via such an SMS gateway 115 or MMS gateway 115 in a secure manner. Gateway 115 may include the following modules that communicate with each other so that server 15, phone 41, 42, or 43, and/or third parties 31, 32, and/or 33 can send or receive SMS or MMS messages via such an SMS gateway 115 or MMS gateway 115 in a secure manner: SMS/MMS module, campaign module, account module, contact module, reporting module, scheduling module, template module, subscription module, coupon module, media module, multi-channel gateway module, and the like. Moreover, gateway 115 may comprise any suitable modules configured to allow secure creation, transmission, delivery, storage, and/or reporting regarding secure and/or conventional messages. If mobile broadband cards (or a laptop wireless Internet access card) is used with a mobile device (phone 41, 42, or 43), then phone network 40 can be used for communication (with or without access to the Internet).

In some embodiments, once server 15 receives the SMS or MMS message, server 15 retrieves information about the item, and in some embodiments, server 15 may format the information, attach a personal or generic message from agent 1203, or both, and send the information to users 21, 22, and/or 23. Server 15 receives a request for information from user 21, 22, and/or 23 via the SMS or MMS message, where the information depends on at least one of the short code, long code, and a generic assigned ID associated with the item. Server 15 communicates with third parties 31, 32, and/or 33 (e.g., a merchant or merchant server, agent 1203, or an EBAY™ server) to obtain the item requested by user 21, 22, and/or 23. For example, server 15 communicates with third parties 31, 32, and/or 33 to retrieve the information. Communication between server 15 and third parties 31, 32, and/or 33 can be through a HTTP/HTTPS protocol and/or Web Service over an internet connection. Server 15 requests information from a merchant server using the item number as the keyword. The merchant server responds to the request by server 15 by providing data corresponding to the particular item. Server 15 extracts the relevant information (e.g., cost, number, and any other desirable information). This relevant information is formatted to a package of information that is often less than 160 characters if it is to fit in one SMS message. Server 15 can format the information (e.g., taking the SMS or MMS message information in a desirable format (e.g., limited number/type of characters) and converting the information into a more desirable format). Server 15 can attach a message (e.g., from agent 1203) and send the information requested by user 21, 22, and/or 23 to phone 41, 42, and/or 43 of user 21, 22, and/or 23 through a mobile phone network. Agent 1203 has the ability to access server 15 via web (the Internet) and modify the information in some embodiments.

Figure 13:
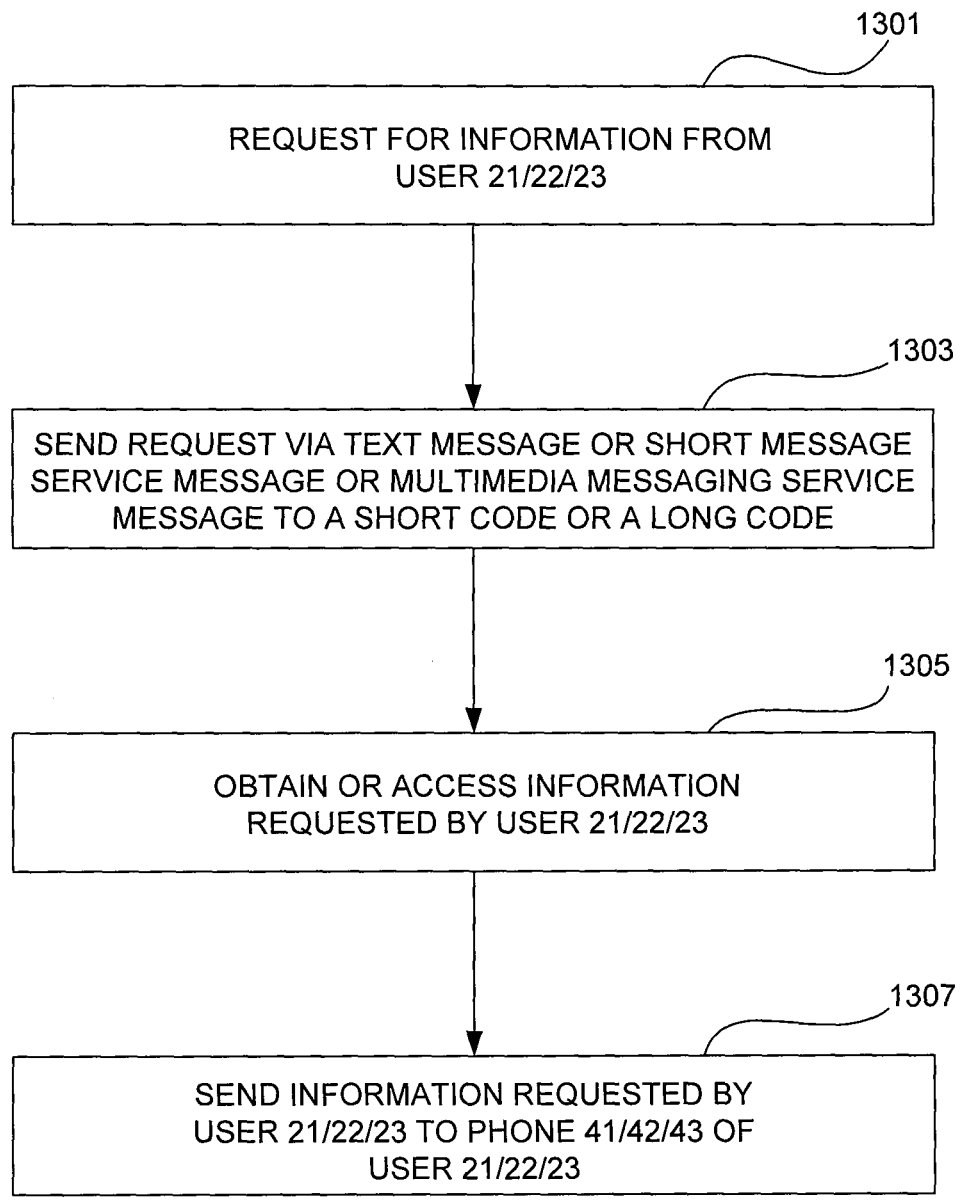
FIG. 13 illustrates a flowchart illustrating examples of various methods of using server 15 to communicate with one or more of users 21, 22, and 23 to provide information to users 21, 22, and 23.

FIG. 13 illustrates a flowchart illustrating examples of various methods of using server 15 to communicate with one or more of users 21, 22, and 23 to provide information to users 21, 22, and 23. Server 15 receives a request for information from one or more of users 21, 22, and 23 (act 1301). Users 21, 22, and 23 send the request for information via at least one of a text message, multimedia messaging service message, and an SMS message sent to at least one of a short code and a long code (act 1303). The information requested by users 21, 22, and 23 depends on a generic assigned identification associated with information requested by users 21, 22, and 23. Server 15 communicates with one or more third parties 31, 32, or 33 to obtain the information requested by users 21, 22, and 23 or otherwise has access to the information requested by users 21, 22, and 23 (e.g., within server 15) (act 1305). Server 15 sends the information requested by users 21, 22, and 23 to one or more phones 41, 42, 43 of users 21, 22, and 23 via at least one of a text message, a MMS message, and an SMS message through phone network 40 (act 1307).

In one exemplary embodiment and with further reference to FIG. 1, a second software module 72 (described below) for running on phone 41, 42, and/or 43 of user 21, 22, and/or 23 is recorded on a computer-readable medium and includes programming instructions to communicate with one or more merchant servers or agent 1203 to request and receive information on, order, and purchase items using phone 41, 42, and/or 43 of user 21, 22, and/or 23. Second software module 72 also includes programming instructions to request, receive, and transmit information.

Agent 1203 can configure messages and view reports via communication with server 15. Agent 1203 can change the information provided to server 15. Agent 1203 can configure its profile or environment with server 15 to alert agent 1203 if any of users 21, 22, or 23 request specific information, send a message to a short or long code, or otherwise communicate with server 15. Some embodiments include one or more of the following features: prospective users (e.g., users or buyers) can register on the web to receive updates through SMS, MMS, or email about items/products; agents can automatically send their contact information through email, MMS, or SMS to prospective buyers; and agents can offer a service to SMS, MMS, or email prospective buyers when an item becomes available that match the buyer's profile (e.g., brands, services, availability in certain areas, or any other desired feature).

With further reference to FIG. 1, website 65 may include a main or home page (or more than one such page) to which new users and new third parties may be directed. New users may be directed to this page or pages or to website 65 by search engines, advertisers, brokers, agents, or the like, as examples. Users (e.g., 21 to 23) may be assigned (or asked to elect) user names, user ID's, passwords, and/or the like, which they may use to access secure areas or pages of website 65, for example, where their personal information may be entered, displayed, updated, and/or the like. In some embodiments, security of such areas may be provided, for example, using novel systems and methods which may be described herein, for instance. In some embodiments, these secure areas may include information entered by third parties (e.g., 31, 32, and 33). Further, in some embodiments, third parties (e.g., 31 to 33) may have their own secure areas (e.g., that are password protected, or protected as described herein), for example, within website 65 or on server 15 or another server, in which the third parties (e.g., some or all of 31, 32, and 33) may be able to enter, view, update, or a combination thereof, information for a number of users.

In some embodiments, the first software module 61 filters the personal information and selects nuggets of the personal information which the first software module 61 sends to the mobile phone (e.g., 41) of the appropriate user (e.g., 21). As used herein, a "nugget of information" is a discrete piece of information that is a subset of the total information. Nuggets of information may be in digital form, for example, and may be in text form, in the form of numbers or values, or a combination thereof, as examples. In some embodiments, nuggets may include pictures, text, graphics, or the like, as further examples. These nuggets may be sent, for example, through mobile phone network 40, for instance, and may be sent as text, MMS messages, or SMS messages, for instance. In some embodiments, server 15 may access mobile phone network 40 through the Internet 10, for example.

In various embodiments, a second software module 72, is operating (e.g., independently) on more than one of the mobile phones (e.g., 41 to 43, although module 72 is shown only on phone 41). Further, in this embodiment, the second software module 72 is configured to receive the nuggets of the personal information of the user (e.g., 21) from the first software module 61 through the Internet 10 and through mobile phone network 40, and to store the personal information on mobile phone 41 so that the personal information may later be accessed by user 21, for example, even when mobile phone 41 is not connected to mobile phone network 40. User 21 may access the personal information, for instance, by viewing folder 76 containing nuggets 78 and 79, which may be organized by subject matter, for example. One such subject may be financial information, for example, which may include account balances, transaction records, and the like, and another such subject, in some embodiments, may be travel information, as another example, which may include, for example, flight departure times and locations, and the like. Other examples of subjects are described herein, and include insurance information, bank card information, medical records, appointments, and the like.

In some such embodiments, for multiple users (e.g., 21 to 23), second software module 72 is downloadable by the users from first software module 61 to the mobile phones (e.g., 41 to 43), for example, through website 65, through the Internet 10, through mobile phone network 40, or a combination thereof. Further, in some embodiments, for many of the users (e.g., 21 to 23), first software module 61 includes instructions to search some or all of the e-mails received for or to the users (e.g., 21 to 23) for keywords, identifying numbers, or both, and to select the nuggets (e.g., 78 and 79) of the personal information from the e-mails using the keywords, identifying numbers, or both. For example, software module 61 may search e-mails received for a specific user (e.g., 21, 22, or 23) for account numbers, flight numbers, names of third parties (e.g., one or more of 31, 32, and 33), etc., and may extract nuggets of information pertaining thereto. In some embodiments, software module 61 may search all e-mails (e.g., sent to particular users), while in other embodiments, only e-mails from certain sources, or certain e-mail addresses may be searched.

In addition, in some such embodiments, for many or all of the users, second software module 72 contains instructions to allow the user (e.g., 21) to select at least a portion of the personal information that is stored on the mobile phone (e.g., select nugget 78), select or enter an identifier of at least one of a different party (e.g., 22) and a different party mobile phone (e.g., 42), and elect to send the personal information (e.g., nugget 78) to the different party mobile phone (e.g., 42). Examples of such a different party are other users, for instance, for user 21, users 22 and 23 may be different parties, and their phones 42 and 43 may be different party mobile phones. Examples of such an identifier include the name of the different party, the phone number for the different party, a user identification number, etc. In many embodiments, for multiple users, the first software module 61 further contains instructions to evaluate whether the different party mobile phone has certain functionality or contains a copy of particular software, such as second software module 72.

In some such embodiments, if the different party mobile phone contains a copy of the second software module 72, for example, then the first software module 61 may send the (at least a) portion of the personal information to the copy of the second software module 72 on the different party mobile phone, for instance, through mobile phone network 40, the Internet 10, or both. On the other hand, in some embodiments, if the different party mobile phone does not contain a copy of the second software module 72, for example, or in some cases other software having adequate equivalent functionality, then the first software module 61 may send the (at least a) portion of the personal information to the different party mobile phone, in another form, for instance, in the form of a standard e-mail or text message.

In other embodiments, software module 72 may send the information directly to the different party rather than having the first software module (e.g., module 61) do it. In some embodiments, for more than one of the users, the first software module 61 further contains instructions to receive a command from the user (e.g., from user 21), for instance, through mobile phone network 40, and upon the receipt of the command, to transmit at least a portion of the nuggets of the personal information to a different party (e.g., to user 22 or 23, or specifically, in some embodiments, to their phones 42 or 43), for example, through the Internet 10.

In addition, in some embodiments, for many or all of the users, first software module 61 contains instructions to receive a command from the user (e.g., one of users 21 to 23), for instance, through mobile phone network 40, to dispute a financial transaction for a particular account described in the nuggets of the personal information. In particular embodiments, for example, upon the receipt of the command, first software module 61 may contain instructions to transmit a dispute of the transaction to a manager of the particular account through a network, such as Internet 10, for example. The manager of the account may be third party 33, for example, and may be a bank or financial institution, for instance. Such a dispute of the transaction may be transmitted to the third party (e.g., 33) in the form of an e-mail or a text message, for example, sent via the Internet 10, mobile phone network 40, or both, while in other embodiments, a dispute of a transaction may be sent through a private or financial network, as another example.

In various embodiments, software module 72, software module 61, and/or various other components may be configured to support a particular application and/or user group, for example mobile banking, entry of health care information, domain registration, airline check-in, intra- and intergovernment agency communication, enterprise communication, and the like.

Further, in some embodiments, some or all of the mobile phones (e.g., 41 to 43) may be configured to transmit, receive, or both, local signals. For example, mobile phone 42 includes local transmitter, receiver, antenna, or a combination thereof, local communication device 82, which, in this embodiment, communicates with reader or local communication device 88. In different embodiments, device 88 may read signals, send signals, or both. Communications devices 82 and 88 may exchange signals in one or both directions through near-field communications, a personal area network, Bluetooth, bar codes, WiFi, or the like, as examples.

Various embodiments provide for extracting particular information from a user's e-mails and sending that information to the user's mobile phone. Referring to FIG. 1, particular embodiments include, for example, various systems for managing information for multiple users (e.g., 21 to 23) using the Internet 10 and mobile phones (e.g., 41 to 43) of the users (e.g., 21 to 23). In many embodiments, the system includes a first software module 67 for sorting information. Such a software module 67 may be recorded on a computer readable medium, for instance, such as a hard drive, random access memory (RAM), read only memory (ROM), a disk, a memory stick, or the like, as examples. Such a software module 67 may be located on server 15, for example, and may be, or be part of, module 61, for instance, as shown. In some embodiments, first software module 67 includes programming instructions to receive multiple e-mails containing information about the business of the user (e.g., one of users 21 to 23). These e-mails may be all or a select portion of e-mails that have been sent to the particular user's (e.g., one of users 21 to 23) e-mail address, for example, via Internet 10.

The information about the business of the user may be, or include, as examples: personal information; financial information; travel information; information concerning financial accounts, financial transactions, expenditures, purchases, savings, loans, etc.; or other information described herein or known in the art. Further, information about the business of the user may concern the user's personal affairs or the affairs of a business that is owned, controlled, managed, invested in, or an employer of the user, as additional examples. In some embodiments, fewer than all (i.e., select) e-mails sent to the particular user (e.g., one of users 21 to 23) may be received (e.g., at first software module 67). For example, in some embodiments, only e-mails sent from one or more particular senders or entities (e.g., from some or all of third parties 31 to 33), or one or more particular e-mail addresses, may be received (i.e., select e-mails), by module 67. Such senders (e.g., some or all of third parties 31 to 33) may include, for example, banks, financial institutions, card providers, airlines, travel agents, etc., or other examples of third parties 31 to 33 described herein, which may have been selected by the user (e.g., one of users 21 to 23) in certain embodiments.

In some embodiments, first software module 67 includes programming instructions to search some or all of the (e.g., select) e-mails for keywords or identifying numbers (or both), as examples, and to extract particular information from the select e-mails. Examples of such keywords and identifying numbers include account numbers, frequent flyer numbers, flight numbers, words like "balance", "withdrawal", "debit", "delayed", "gate", "flight", "cancelled", or the like. Such particular information may include, for instance, account balances, amounts of withdrawals or debits from, or deposits to, accounts, amounts of bank card billings, travel information such as departure times, departure locations, status of flights, etc. In various embodiments, the first software module 67 also includes programming instructions to send the particular information to the user's (e.g., one of users 21 to 23) mobile phone (e.g., the appropriate one of phones 41 to 43) through, for instance, mobile phone network 40, the Internet 10, or both.

Various embodiments also include second software module 77 for running (e.g., that is running) on the user's mobile phone (e.g., the appropriate one of phones 41 to 43). Second software module 77 may include programming instructions to store (e.g., in folder 76) the particular information on the user's mobile phone (e.g., the appropriate one of phones 41 to 43), and provide access to the particular information by the user (e.g., one of users 21 to 23). Such a second software module 77 may be recorded on a computer readable medium, for instance, such as a hard drive, random access memory (RAM) read only memory (ROM), a disk, a memory stick, or the like, as examples.

In some embodiments, second software module 77 may be stored or recorded on a server (e.g., server 15), for downloading onto the user's mobile phone (e.g., the appropriate one or more of phones 41 to 43). In a number of embodiments, second software module 77 may be recorded on memory within the user's mobile phone (e.g., the appropriate one of phones 41 to 43), for example. Such a second software module 77 may be, for example, part of software module 72 shown in FIG. 1 on mobile phone 41. The particular information may be, include, or be included within, for example, the nuggets 78, 79, or both, for instance, as described herein.

Some such embodiments also include a third software module 17 (e.g., recorded on a computer-readable medium) configured for running on the user's computer (e.g., computer 13 of user 23), (or that is actually running on the user's computer) that includes programming instructions to search for e-mails from at least one particular sender (e.g., from one or more of third parties 31 to 33) and to send the e-mails from the at least one particular sender, for example, through the Internet 10, to first software module 67. In various embodiments, module 17 may forward e-mails to module 67, and in different embodiments, the e-mails may be kept as new, marked as read, or marked as forwarded on the user's computer (e.g., computer 13 of user 23), or may be deleted or erased therefrom. In certain embodiments, third software module 17 may be a plug-in for an e-mail management application, such as MICROSOFT OUTLOOK, for example.

Further, in some embodiments, first software module 67 or 61 includes programming instructions to encrypt the particular information before sending the particular information to the user's mobile phone (e.g., 41). In some embodiments, second software module 77 or 72 includes programming instructions to decrypt the particular information. Even further, in some embodiments, first software module 67 or 61 includes programming instructions to compress the particular information before sending the particular information to the user's mobile phone (e.g., 41). And in some embodiments, second software module 77 or 72 includes programming instructions to decompress the particular information. Decryption and compression may be used together or separately in different embodiments.

Additionally, in certain embodiments, first software module 67 or 61 includes programming instructions to receive instructions from the user (e.g., user 21) identifying at least one threshold for alarm for at least a portion of the particular information. In particular such embodiments, first software module 67 or 61 or second software module 77 or 72 (or a combination thereof) includes programming instructions to compare at least a portion of the particular information to the threshold. Furthermore, in some embodiments, first software module 67 or 61 or second software module 77 or 72 (or a combination thereof) includes programming instructions to provide an alarm to the user if the particular information passes the threshold. Such an alarm may be, for example, in a manner described herein, such as an audible alarm a light or display, a vibratory alarm, or a combination thereof.

In some embodiments, for example, for one or more of multiple users (e.g., users 21 to 23), the particular information includes financial account information, which may include, for instance, amounts of withdrawals or debits from an account, such as a financial or bank account. In certain embodiments, the (e.g., at least one) threshold may be, or include, the amount of a withdrawal or debit, for example, and first software module 67 or second software module 77 (or both) may include programming instructions to provide an alarm to the user [e.g., the appropriate one (or more) of users 21 to 23] if a withdrawal or a debit (or both) exceeds the threshold. In another example, in some embodiments, for each of a number of the users (e.g., users 21 to 23), the particular information includes travel information, which includes a departure time, a departure location (e.g., a departure gate), or both. In some such embodiments, first software module 67 or second software module 77 (or both) includes programming instructions to provide an alarm if there is a change in the departure time or the departure location (or both), as examples. In other embodiments, alarms may be provided for other thresholds or other criteria.

Further, in a number of embodiments, for one or more of the users (e.g., users 21 to 23), second software module 77 contains programming instructions to allow the user (e.g., user 21) to select at least a portion of the particular information that is stored on the mobile phone (e.g., 41), select or enter a third party mobile phone number (e.g., the phone number of user 22), and elect to send at least a portion of the particular information to the third party mobile phone (e.g., to mobile phone 42 of user 22). In some embodiments, at least for many users (e.g., user 21), first software module 67 further contains instructions to evaluate whether the third party mobile phone (e.g., mobile phone 42 of user 22) contains a copy of second software module 77, module 72, or both. In some such embodiments, if the third party mobile phone (e.g., mobile phone 42 of user 22) contains a copy of second software module 77, for example, then first software module 67 may send the portion of the personal information to the copy of second software module 77 on the third party mobile phone (e.g., mobile phone 42 of user 22) for example, through mobile phone network 40, the Internet, or both.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present invention. Thus, different embodiments may include different combinations, arrangments and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present invention, as set forth in the following claims.

We claim:

1. A short messaging service (SMS) system or multimedia messaging service (MMS) system configured for secure communications, the system comprising:
    a software module configured to run as a user application on a mobile device, wherein the software module is configured to encrypt an SMS or MMS message via a first encryption; and
    a gateway comprising a server computer configured to communicate with the mobile device, wherein the gateway is configured to receive the encrypted message from the mobile device;
    wherein the software module or the mobile device has a phone number associated with it and is configured for registration with the gateway using an SMS or MMS message;
    wherein the registration comprises with the gateway verifying a phone number associated with the SMS or MMS message received from the software module against a whitelist; and
    wherein the whitelist comprises a list of approved phone numbers.

2. The system of claim 1, wherein:
    the gateway is configured to decrypt the encrypted message received from the mobile device.

3. The system of claim 2 wherein the gateway is configured to re-encrypt the decrypted message via a second encryption.

4. The system of claim 1, wherein the gateway includes a profile comprising predefined configuration settings for the software module, wherein the gateway may apply the profile to the software module by sending one or more SMS or MMS profile messages to the software module, and wherein the profile in the one or more profile messages is configured to prevent overriding of the predefined configuration settings on the software module.

5. The system of claim 1, further comprising synchronizing information stored on the mobile device with information at the gateway, wherein the synchronizing comprises at least one of replacing and appending information in the message.

6. The system of claim 1, wherein:
    the software module is configured to communicate with the gateway via a dedicated short code, wherein the short code comprises a special telephone number configured to receive a short message service (SMS) message or a multimedia messaging service (MMS) message.

7. The system of claim 1 wherein the software module on the mobile device is configured to play a ringtone identifying the priority of the encrypted message when the encrypted message includes a header identifying the priority of the encrypted message.

8. The system of claim 1 wherein the software module on the mobile device is configured to register with more than one gateway.

9. The system of claim 1 wherein the registration with the gateway comprises inputting the unique identification code provided by a gateway administrator.

10. The system of claim 1 wherein the gateway is configured for use on a Global System for Mobile Communications (GSM) network.

11. The system of claim 1 wherein a second gateway is configured for use on a code division multiple access (CDMA) network.

12. The system of claim 1 wherein at least one of the software module and the mobile device is configured with a unique identification code provided to a user for input to the gateway via the mobile device.

13. A method of securing short messaging service (SMS) or multimedia messaging service (MMS) system communications, the method comprising:
    registering a mobile device with a gateway using an SMS or MMS message, wherein the gateway checks a phone number associated with the SMS or MMS message against a a preapproved whitelist of phone numbers authorized to register with the gateway and registers the mobile device if it is on the whitelist;
    during the registration of the mobile device with the gateway, encrypting, with a software module configured to run as a user application on the mobile device, an SMS or MMS message;
    transmitting the encrypted message to the gateway;
    decrypting, at the gateway, the encrypted message;
    re-encrypting, at the gateway, the decrypted message; and
    transmitting the re-encrypted message to the recipient and transmitting a delivery confirmation to the mobile device once the re-encrypted message is transmitted to the recipient.

14. The method of claim 13, wherein the message is encrypted at the mobile device via a first encryption, and wherein the decrypted message is re-encrypted at the gateway via a second encryption different from the first encryption.

15. The method of claim 13, further comprising:
transmitting, to the mobile device, an open confirmation responsive to the re-encrypted SMS message being accessed by a recipient.

16. The method of claim 13, wherein the gateway include a profile comprising predefined configuration settings for the software module, wherein the gateway may apply the profile to the software module by sending one or more SMS or MMS profile messages to the software module, and wherein the profile in the one or more profile messages is configured to prevent the mobile device from overriding the predefined configuration settings on the software module.

17. The method of claim 13, further comprising synchronizing information stored on the mobile device with information at the gateway, wherein synchronizing comprises at least one of replacing and appending information in the message.

18. The method of claim 13, wherein:
the software module is configured to communicate with the gateway via a dedicated short code, wherein the short code comprises a special telephone number configured to receive a short message service (SMS) message or a multimedia messaging service (MMS) message.

19. The method of claim 13, further comprising dividing, at the mobile device, the encrypted message into at least two encrypted sub-messages, wherein the at least two encrypted sub-messages are configured according to an SMS or MMS protocol for transmittal to the gateway.

20. The method of claim 19, further comprising assembling, at the gateway, the at least two encrypted sub-messages to reconstitute the encrypted message.

21. The method of claim 13, further comprising updating, at the mobile device, an encryption key associated with the mobile device, wherein the updating is responsive to a key update command transmitted by the gateway.

22. The method of claim 21, further comprising queuing, at the gateway, at least one message associated with the mobile device, wherein the queuing is responsive to a key update command transmitted by the gateway.

23. The method of claim 22, further comprising processing, at the gateway, the at least one queued message, wherein the processing is responsive to a key change acknowledgement message transmitted from the mobile device to the gateway.

24. The method of claim 13 wherein the decrypting, at the gateway, further comprises determining a recipient of the encrypted message.

25. The method of claim 13 wherein the software module on the mobile device is configured to register with more than one gateway.

26. The method of claim 13 wherein the gateway is configured for use on a Global System for Mobile Communications (GSM) network.

27. The method of claim 13 wherein a second gateway is configured for use on a code division multiple access (CDMA) network.

28. The method of claim 13 wherein registering the mobile device with the gateway comprises configuring the mobile device with a unique identification code provided to a user for input to the software module for delivery to the gateway.

29. A communication system for securely delivering a message to a mobile device, the system comprising:
a first software module configured as a gateway, wherein the gateway comprises a server including a computer, wherein the first software module is configured to encrypt at least one of a short messaging service (SMS) message and a multimedia messaging service (MMS) message for delivery to the mobile device; and
a second software module configured to run as a user application on the mobile device, wherein the second software module is further configured to decrypt the encrypted message or data received from the first software module,
wherein the first software module is configured for evaluating whether the mobile device contains the second software module,
wherein the second software module on the mobile device is further configured for registration with the gateway via a secure SMS or MMS message;
wherein the registration with the gateway facilitates communication between the second software module and the gateway;
wherein the gateway is configured to compare a phone number associated with the second software module or the mobile device with a whitelist comprising a preapproved list of phone numbers for software modules or mobile devices that are authorized to register with the gateway; and
wherein the gateway is configured to register the second software module or the mobile device if the second software module or the mobile device is on the whitelist.

30. The system of claim 29, wherein the second software module comprises an encrypted address book.

31. The system of claim 29, wherein the registration of the second software module with the gateway uses a short messaging service (SMS) and the second software module is configured to be locked after a period of inactivity.

* * * * *